(12) United States Patent
Usman et al.

(10) Patent No.: US 11,731,077 B2
(45) Date of Patent: Aug. 22, 2023

(54) METHOD OF GAS SEPARATION USING METAL-ORGANIC FRAMEWORK MEMBRANE

(71) Applicant: King Fahd University of Petroleum and Minerals, Dhahran (SA)

(72) Inventors: Muhammad Usman, Dhahran (SA); Bassem Al-Maythalony, Dhahran (SA)

(*) Notice: Subject to any disclaimer, the term of this patent is extended or adjusted under 35 U.S.C. 154(b) by 0 days.

(21) Appl. No.: 17/857,244

(22) Filed: Jul. 5, 2022

(65) Prior Publication Data
US 2022/0355241 A1 Nov. 10, 2022

Related U.S. Application Data

(62) Division of application No. 16/059,165, filed on Aug. 9, 2018, now Pat. No. 11,478,744.

(51) Int. Cl.
| | | |
|---|---|---|
| *B01D 53/22* | (2006.01) | |
| *B01D 71/48* | (2006.01) | |
| *B01D 69/14* | (2006.01) | |
| *B01D 67/00* | (2006.01) | |
| *B01D 69/02* | (2006.01) | |

(52) U.S. Cl.
CPC ....... *B01D 53/228* (2013.01); *B01D 67/0032* (2013.01); *B01D 69/02* (2013.01); *B01D 69/141* (2013.01); *B01D 71/48* (2013.01); *B01D 2323/34* (2013.01); *B01D 2325/025* (2013.01)

(58) Field of Classification Search
CPC combination set(s) only.
See application file for complete search history.

(56) References Cited

U.S. PATENT DOCUMENTS

| | | |
|---|---|---|
| 7,637,983 B1 | 12/2009 | Liu et al. |
| 9,694,344 B2 | 7/2017 | Song |
| 2014/0033918 A1* | 2/2014 | Zheng .................. C08G 73/22 95/55 |

FOREIGN PATENT DOCUMENTS

| | | |
|---|---|---|
| CN | 102489183 B | 5/2015 |
| CN | 106178982 A | 12/2016 |
| WO | 2011/100501 A1 | 8/2011 |

OTHER PUBLICATIONS

Lim, et al. ; New CO separation membranes containing gas-selective Cu—MOFs ; Journal of Membrane Science, vol. 467, pp. 67-72 ; Oct. 1, 2014 ; 2 pages ; Abstract Only.

Cabrales-Navarro, et al. ; Molecular dynamics simulations of metal-organic frameworks as membranes for gas mixtures separation ; Journal of Membrane Sciences, vol. 482, pp. 241-250 ; Feb. 1, 2013 ; 2 pages ; Abstract Only.

Hou, et al. ; Formation of ultrathin, Continuous Metal Organic Framework Membranes on Flexible Polymer Substances ; Angew. Chem. Int. Ed. 2016, 3947-3951 ; 5 pages.

Hess, et al. ; MOF Channels within Porous Polymer Film: Flexible, Self-Supporting ZIF-8 Poly(ether sulfone) Composite Membrane ; Chemistry of Materials, Institute for Chemical and Bioengineering ; 2016 ; 7 Pages.

Liang, et al. ; Flexible self-supported metal-organic framework mats with exceptionally high porosity for enhanced separation and catalysis ; Journal of Materials Chemistry A, 2018, 334 ; 9 pages.

* cited by examiner

*Primary Examiner* — Thuan D Dang
(74) *Attorney, Agent, or Firm* — Obion, McClelland, Maier & Neustadt, L.L.P.

(57) ABSTRACT

A membrane including a polymer substrate having pore channels and a metal-organic framework disposed on the polymer substrate. Methods of producing the membrane are described. Methods of separating gases using the membrane are also provided.

12 Claims, 38 Drawing Sheets

METHOD OF GAS SEPARATION USING METAL-ORGANIC FRAMEWORK MEMBRANE

CROSS-REFERENCE TO RELATED APPLICATIONS

The present application is a Divisional of U.S. application Ser. No. 16/059,165, pending, having a filing date of Aug. 9, 2018.

BACKGROUND OF THE INVENTION

Technical Field

The present invention relates to a membrane with a metal-organic framework present on a porous polymer substrate. The present invention also relates to a method of making the membrane and a method of separating a mixture of gases with the membrane.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The environmental sustainability, cost and energy prospects associated with gas separation technology are inevitably accounting for renewed research interest in the field. In this regard, membrane gas separation technology is a good replacement to conventional technologies like absorption and cryogenic distillation which suffer from challenges such as energy inefficiency. Metal organic frameworks (MOFs) consisting of metal and organic linker are highly crystalline porous materials. These materials have received a lot of interest in gas storage [Trickett C A, Helal A, Al-Maythalony B A, Yamani Z H, Cordova K E, Yaghi O M. (2017) Nature Reviews Materials 2:17045, incorporated herein by reference in its entirety], gas separation [Al-Maythalony B A, Alloush A M, Faizan M, Dafallah H, Elgzoly M A A, Seliman A A A, Al-Ahmed A, Yamani Z H, Habib M A M, Cordova K E, Yaghi O M. (2017) ACS Applied Materials & Interfaces 9:33401-33407, incorporated herein by reference in its entirety], sensing [Koo W-T, Choi S-J, Jang J-S, Kim I-D. (2017) Scientific Reports 7:45074, incorporated herein by reference in its entirety], optical devices [Medishetty R, Zareba J K, Mayer D, Samoc M, Fischer R A. (2017) Chemical Society Reviews 46:4976-5004, incorporated herein by reference in its entirety] and catalysis [Dhakshinamoorthy A, Asiri A M, Garcia H. (2017) Chemical Communications 53:10851-10869, incorporated herein by reference in its entirety].

Particularly, MOFs demonstrate potential for separation of gases due to their controlled pore window, special affinity for different gases and controlled composition. However, many reported preparation procedures yield membranes with defects including cracking and finger voids between MOF particles and the support, inhibiting the successful preparation of a continuous intergrown MOF membrane for gas separation.

Synthesis of nanopore channels were previously attempted [Wojciech Starosta B S, Krzysztof Lyczko, Jan Maurin, Andrzej Pawlukojć, Lech Waliś, Marek Buczkowski. (2012) NUKLEONIKA 57:581-583; and Bozena Sartowskaa W S, Pavel Apelb, O. L Orelovitchb and I. Blonskayab. (2013) CTA PHYSICA POLONICA A 123, each incorporated herein by reference in their entirety], but such attempts were not successful in growing MOFs on nanoporous channels in a membrane.

In view of the forgoing, one objective of the present disclosure is to provide a membrane with a metal-organic framework disposed on a polymer substrate having pore channels, a method of preparing the membrane, and a method of utilizing the membrane in gas separation processes. Described herein is the first MOF-containing flexible membrane in which MOFs are grown in ionic nanopore channels of a polymer substrate. This approach could be used for preparing flexible MOF membranes.

BRIEF SUMMARY OF THE INVENTION

According to a first aspect, the present disclosure relates to a membrane comprising a polymer substrate having pore channels and a metal-organic framework comprising a metal ion and an organic ligand coordinated to the metal ion. The pore channels have an average diameter of 0.1-2 µm and an average length of 2-100 µm, the metal-organic framework is disposed on a wall surface of the pore channels and an outer surface of the polymer substrate, and the metal-organic framework is present at an amount of 0.1-50 wt % relative to a total weight of the membrane.

In one embodiment, the metal-organic framework has an average thickness of 100-2,000 nm.

In one embodiment, the metal ion is an ion of at least one metal selected from the group consisting of a transition metal, a post-transition metal, and an alkaline earth metal.

In one embodiment, the polymer substrate comprises at least one polyester selected from the group consisting of poly(ethylene terephthalate), poly(trimethylene terephthalate), poly(butylene terephthalate), poly(ethylene naphthalate), and poly(cyclohexylenedimethylene terephthalate).

In one embodiment, the wall surface of the pore channels and the outer surface of the polymer substrate are modified with carboxylate groups.

In one embodiment, the polymer substrate comprises poly(ethylene terephthalate).

In one embodiment, the organic ligand has at least two carboxylate groups.

In one embodiment, the organic ligand is benzene-1,3,5-tricarboxylate.

In one embodiment, the metal ion is an ion of at least one metal selected from the group consisting of Cu, Zn, Fe, Ni, Co, Mn, Cr, Cd, Mg, Ca, and Zr.

In one embodiment, the metal-organic framework comprises HKUST-1.

In one embodiment, the membrane has an ultraviolet visible absorption with an absorption peak of 500-800 nm.

In one embodiment, the membrane has a BET surface area of 100-500 m²/g.

According to a second aspect, the present disclosure relates to a method of producing the membrane wherein the wall surface of the pore channels and the outer surface of the polymer substrate are modified with carboxylate groups. The method involves (i) ion-irradiating a polymer substrate with heavy ions to form a polymer substrate having latent tracks, (ii) exposing the polymer substrate having latent tracks to a light to form a sensitized polymer substrate, (iii) etching the sensitized polymer substrate with an etchant to form a polymer substrate having pore channels, (iv) immersing the polymer substrate having pore channels in a first solution comprising the metal ion to form a metal ion coated polymer substrate, (v) immersing the metal ion coated polymer substrate in a second solution comprising the organic ligand to form a metal-organic framework coated polymer substrate, and (vi) alternating immersions in the first solution and the second solution for up to 200 cycles, thereby forming the membrane. The pore channels have an average diameter of 0.1-2 μm and an average length of 2-100 μm, and the wall surface of the pore channels and the outer surface of the polymer substrate having pore channels are modified with carboxylate groups.

In one embodiment, the heavy ions have a fluence of $10^3$-$10^{10}$ heavy ions per square centimeter and an average kinetic energy of 5-25 MeV per nucleon.

In one embodiment, the metal ion is present in the first solution at a concentration of 0.01-100 mM and the organic ligand is present in the second solution at a concentration of 0.01-100 mM.

In one embodiment, immersing the polymer substrate having pore channels in the first solution comprising the metal ion is performed at a temperature of 4-60° C. for 1-60 min per cycle.

In one embodiment, immersing the metal ion coated polymer substrate in the second solution comprising the organic ligand is performed at a temperature of 4-60° C. for 1-60 min per cycle.

In one embodiment, the etchant is a solution comprising sodium hydroxide at a concentration of 0.5-5 M.

According to a third aspect, the present disclosure relates to a method of recovering a first gas from a gas mixture comprising the first gas and a second gas. The method involves delivering the gas mixture into a feed side of a chamber containing the membrane of the first aspect that divides the chamber into the feed side and a permeate side, such that at least a portion of the first gas permeates the membrane, and recovering from the permeate side a stream enriched in the first gas compared to the gas mixture.

In one embodiment, the first gas is hydrogen, carbon dioxide, or both, and the second gas is at least one selected from the group consisting of oxygen, nitrogen, methane, ethylene, ethane, propylene, and propane.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
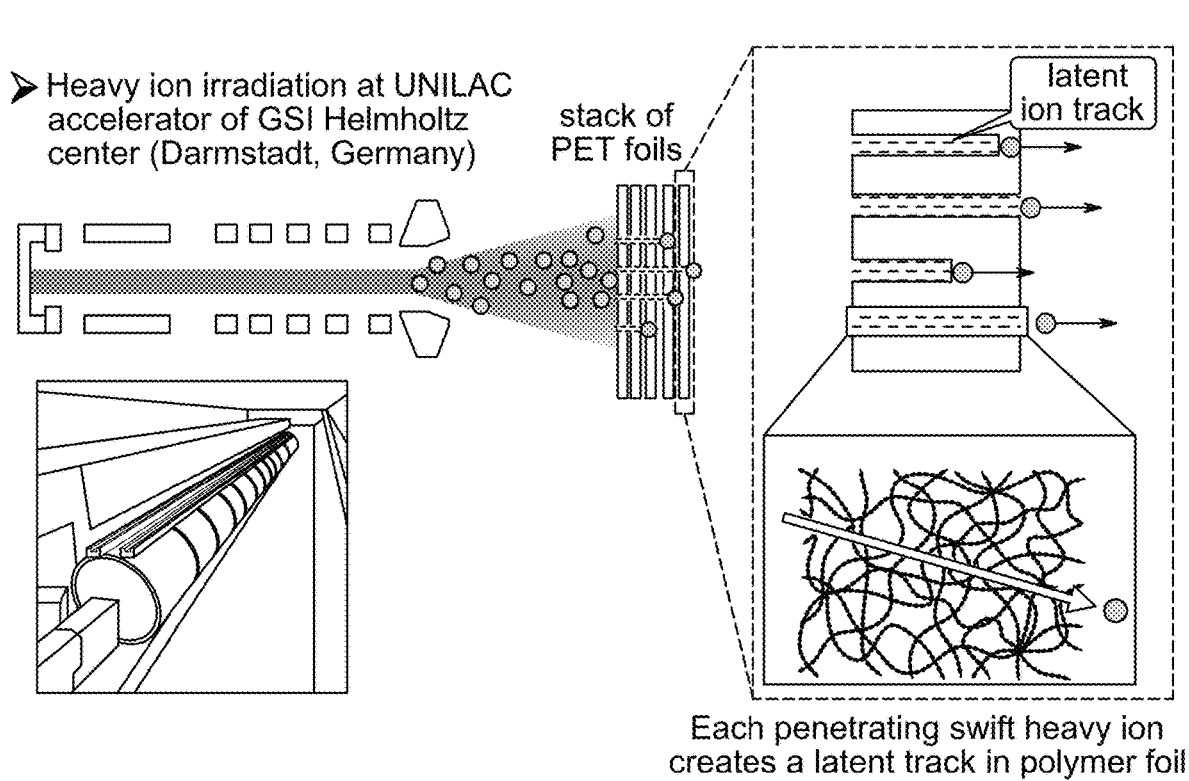
FIG. 1 is a schematic representation of the experimental setup of heavy ion irradiation and generation of ion tracks [Fleischer R L, Price P B, Walker. R M. 1975. *Nuclear tracks in Solids: Principles and Applications*. Berkeley: University of California Press; and Toimil-Molares M E. (2012) Beilstein J. Nanotechnol. 3:860-883, each incorporated herein by reference in their entirety].

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

It must be noted that, as used in the specification and the appended claims, the overall surface area of the polymer substrate primarily consists of the wall surface of the pore channels and the outer surface of the polymer substrate.

For polygonal shapes, the term "diameter", as used herein, and unless otherwise specified, refers to the greatest possible distance measured from a vertex of a polygon through the center of the face to the vertex on the opposite side. For a circle, an oval, an ellipse, and a multilobe, "diameter" refers to the greatest possible distance measured from one point on the shape through the center of the shape to a point directly across from it.

According to a first aspect, the present disclosure relates to a membrane comprising a polymer substrate having pore channels and a metal-organic framework comprising a metal ion and an organic ligand coordinated to the metal ion. The metal-organic framework may be present at an amount of 0.1-50 wt %, 0.5-40 wt %, 1-30 wt %, 5-20 wt %, or 10-15 wt % relative to a total weight of the membrane.

In one or more embodiments, the pore channels are present in the polymer substrate at a density of $10^2$-$10^7$/$mm^2$, $10^3$-$10^6$/$mm^2$, or $10^4$-$10^5$/$mm^2$. Depending on the size of the polymer substrate, it may have at least $10^2$ pore channels, at least $10^3$ pore channels, at least $10^4$ pore channels, at least $10^5$ pore channels, at least $10^6$ pore channels, at least $10^7$ pore channels, or at least $10^7$ pore channels. In one or more embodiments, the polymer substrate has at least 50%, at least 75%, at least 90%, or at least 95% of the total number of pore channels extending through the entire thickness of the polymer substrate. In at least one embodiment, a plurality of pore channels present does not extend through the entire thickness of the polymer substrate. In one or more embodiments, the pore channels have an average length of 2-500 μm, preferably 4-400 μm, preferably 6-300 μm, preferably 8-200 μm, preferably 10-100 μm, preferably 12-50 μm, preferably 15-25 μm.

In one or more embodiments, the pore channels are randomly arranged in the polymer substrate, i.e. distances between a pore channel and its neighboring pore channels are different. Alternatively, the pore channels are evenly arranged in the polymer substrate, i.e. a distance between a pore channel and all its neighbors is the same or substantially the same. The distance can be said to be substantially the same when the shortest distance is at least 80%, at least 85%, at least 90%, or at least 95% of the average distance and the longest distance is not more than 120%, not more than 110%, or not more than 105% of the average distance. The distance is measured from a center of a pore channel to a center of a neighboring pore channel and may be in a range of 1 nm to 1 μm, 10-800 nm, 50-600 nm, 100-400 nm, or 200-300 nm. Energy-dispersive X-ray spectroscopy, X-ray microanalysis, elemental mapping, transmission electron microscopy, scanning electron microscopy, and scanning transmission electron microscopy may be useful techniques for observing the arrangement of the pore channels in the polymer substrate.

The cross-section of the pore channels may be of any desired shape, such as a circle, an oval, an ellipse, a multilobe, and a polygon. In one or more embodiments, the openings of the pore channels have an average diameter of 0.01-3 μm, preferably 0.05-2.5 μm, preferably 0.1-2.0 μm, preferably 0.15-1.0 μm, preferably 0.2-0.8 μm, preferably 0.25-0.6 μm, preferably 0.3-0.4 μm. The wall surface (i.e. internal surface) of the pore channels may contain ridges, dimples, knurls, flutes, or other perturbations. The cross-section of the pore channels may be constant over the length of pore channels or may vary over the length. In a preferred embodiment, the pore channels are uniform throughout the entire thickness of the polymer substrate and are of a cylindrical shape. In another embodiment, the pore channels are conical-shaped or elongated oval-shaped (cigar-shaped).

The pore channels may be straight or substantially straight. In some embodiments, the pore channels may extend through the polymer substrate without intersecting one another. In some embodiments, pore channels present in the polymer substrate are separated from each other throughout their respective length. In at least one embodiment, the pore channels are parallel or substantially parallel to each other (e.g. forming a monolith-like structure). In another embodiment, pore channels in the polymer substrate are randomly oriented and may intersect (e.g., forming a sponge-like pore structure).

In one or more embodiments, the polymer substrate comprises a polyester. Suitable polyesters include those commonly prepared by condensation polymerization of hydroxyl-containing monomers and/or oligomers with poly-acid-containing monomers and/or oligomers. Exemplary hydroxyl-containing monomers useful in the preparation of the polyesters include aliphatic diols, e.g. ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, and 2-methyl-1,5-pentane diol, cycloaliphatic diols, e.g. 1,6-hexane diol, dimethanol decalin, dimethanol bicyclooctane, 1,4-cyclohexane dimethanol, triethylene glycol, and 1,10-decanediol. Examples of poly-acid-containing monomers that can be used to prepare the polyesters include isophthalic acid, terephthalic acid, 1,2-di(p-carboxyphenyl)ethane, 4,4'-dicarboxydiphenyl ether, 4,4'-bisbenzoic acid, 1,4-naphthalene dicarboxylic acid, 1,5-naphthalene dicarboxylic acid, decahydronaphthalene dicarboxylic acids, norbornene dicarboxylic acids, bicyclooctane dicarboxylic acids, 1,4-cyclohexanedicarboxylic acid, 1,4-hexylenedicarboxylic acid, adipic acid, azelaic acid, dicarboxyl dodecanoic acid, and succinic acid. The poly-ester counterparts of the aforementioned poly-acid-containing monomers and/or oligomers such as dimethyl terephthalate, dimethyl 2,6-naphthalenedicarboxylate may also be used in preparing the polyester through transesterification reactions.

Specific examples of polyesters include, but are not limited to, poly(ethylene terephthalate), poly(1,4-butylene terephthalate), poly(ethylene naphthalate), poly(trimethylene terephthalate), poly(butylene naphthalate), poly(1,3-propylene terephthalate), poly(1,4-cyclohexylenedimethylene terephthalate), poly(1,4-cyclohexylenedimethylene 1,4-cyclohexanedicarboxylate), poly(1,4-cyclohexylenedimethylene terephthalate-co-isophthalate), poly(cyclohexylenedimethylene-co-ethylene terephthalate), poly(butylene-co-poly(oxytetramethylene) terephthalate), poly(butylene-co-poly(oxyethylene) terephthalate), poly(1,4-cyclohexylene dimethylene co-ethylene terephthalate), and poly(ethylene-co-1,4-cyclohexylenedimethylene terephthalate). In a preferred embodiment, the polymer substrate comprises at least one polyester selected from the group consisting of poly(ethylene terephthalate), poly(trimethylene terephthalate), poly(butylene terephthalate), poly(ethylene naphthalate), and poly(cyclohexylenedimethylene terephthalate). In a more preferred embodiment, the polymer substrate comprises poly(ethylene terephthalate).

Polyesters that can be used herein as the polymer substrate further include polyacrylates such as poly(methyl methacrylate), poly(ethyl methacrylate), and other polymers which are cured forms of a resin composition comprising a methacrylate monomer including, without limitation, methyl methacrylate (MMA), 2-hydroxyethyl methacrylate (HEMA), isopropyl methacrylate, n-propyl methacrylate, isopropyl methacrylate, n-butyl methacrylate, isobutyl methacrylate, hydroxyethyl methacrylate, hydroxypropyl methacrylate, hydroxybutyl methacrylate, propylene glycol monomethacrylate, isobornyl methacrylate, methoxyethoxyethyl methacrylate, ethoxyethoxyethyl methacrylate, tetrahydrofurfuryl methacrylate, acetoxyethyl methacrylate, phenoxyethylmethacrylate, methacryloyloxyethyl phthalate (MEP), bisphenol A-glycidyl methacrylate (bis-GMA), urethane dimethacrylate (UDMA), triethylene glycol dimethacrylate (TEGDMA), ethoxylated bisphenol A dimethacrylate (bis-EMA), ethyleneglycol dimethacrylate, diethyleneglycol dimethacrylate, trimethyleneglycol dimethacrylate, glycerol dimethacrylate, trimethyolpropane trimethacrylate, tetraethyleneglycol dimethacrylate, 1,3-propanediol dimethacrylate, 1,4-butanediol dimethacrylate, 1,6-hexanediol dimethacrylate, 1,12-dodecanediol dimethacrylate, polyethyleneglycol dimethacrylate, bismethacryloyloxymethyltricyclo-[5.2.1]decane (TCDMA), trimethylolpropane trimethacrylate, 1,2,4-butanetriol trimethacrylate, pentaerythritol tetramethacrylate, diurethane dimethacrylate (DUDMA), and pyromellitic acid glycerol dimethacrylate (PMGDM), and mixtures thereof.

Conventional hydroxyl or carboxylate functionalized solid substrates are brittle and provide non-uniform growth of anchor agents thereby causing defects while handling and tightening during testing. Ionic channels in the cell membrane may facilitate the selective transportation of ionic species across the membrane. Considering the functional features and effectiveness of ionic channels, artificial ionic nanopore channels may be prepared in a polymer substrate using the swift heavy ion irradiation and chemical etching process. The chemical formation of MOF in the ionic nanopores may open the way to a new strategy for various applications of metal-organic materials.

The heavy ion irradiation and subsequent chemical etching process of the polymer substrate (e.g. polyethylene terephthalate (PET)) generates native carboxyl groups (—COOH) and hydroxyl groups (—OH) on the wall of nanopore polymer. These carboxyl groups are utilized for anchoring MOFs such as HKUST-1 [$Cu_3$(benzene-1,3,5-tricarboxylate)$_2$, or $Cu_3(btc)_2$]. HKUST-1 is known as potential candidate for gas storage, separation, catalytic performance and other characteristics including ionic and electrical conductivity properties [Soleimani Dorcheh A, Denysenko D, Volkmer D, Donner W, Hirscher M. (2012) Microporous and Mesoporous Materials 162:64-68, incorporated herein by reference in its entirety].

In a preferred embodiment, the wall surface (i.e. internal surface) of the pore channels and the outer surface of the polymer substrate are modified with carboxylate groups. The density of the number of carboxylate groups on the surfaces of the polymer substrate may range from 0.01-100/nm$^2$, preferably 0.1-10/nm$^2$, preferably 0.2-5/nm$^2$, preferably 0.4-4/nm$^2$, preferably 0.6-3/nm$^2$, preferably 0.8-2/nm$^2$, or about 1/nm$^2$. In another embodiment, the wall surface of the pore channels and the outer surface of the polymer substrate are modified with hydroxyl groups. Carboxyl and/or hydroxyl functionalities on a surface of the polymer substrate (e.g. polyester) may serve to increase the hydrophilicity of the substrate and thus enhance attachment of hydrophilic inorganic species and metal-organic frameworks to the substrate.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Cu, Zn, Fe, Ni, Co, Mn, Cr, Cd, Mg, Ca, and Zr. In a preferred embodiment, the at least one metal is Cu. The metal ion is preferably Cu(II).

Chemical species containing 1,3,5-benzenetricarboxylate linkers coordinated to small tetrahedral metals have been grown on alumina supports functionalized with —COOH, —OH and Au [Guerrero V V, Yoo Y, McCarthy M C, Jeong H-K. (2010) Journal of Materials Chemistry 20:3938-3943, Nan J, Dong X, Wang W, Jin W, Xu N. (2011) Langmuir 27:4309-4312, and Hurrle S, Friebe S, Wohlgemuth J, WO11 C, Caro J, Heinke L. (2017) Chemistry—A European Journal 23:2294-2298, each incorporated herein by reference in their entirety], copper net [Guo H, Zhu G, Hewitt I J, Qiu S. (2009) Journal of the American Chemical Society 131:1646-1647, incorporated herein by reference in its entirety], hollow ceramic fibers (HCFs) [Zhou S, Zou X, Sun F, Zhang F, Fan S, Zhao H, Schiestel T, Zhu G. (2012) Journal of Materials Chemistry 22:10322-10328, incorporated herein by reference in its entirety], anodic aluminum oxide (AAO) [Mao Y, Cao W, Li J, Sun L, Peng X. (2013) Chemistry—A European Journal 19:11883-11886, incorporated herein by reference in its entirety], copper hydroxide nanostrand (CHN) [Mao Y, shi L, Huang H, Cao W, Li J, Sun L, Jin X, Peng X. (2013) Chemical Communications 49:5666-5668, incorporated herein by reference in its entirety], polyvinylidene difluoride (PVDF) [Mao Y, Li J, Cao W, Ying Y, Sun L, Peng X. (2014) ACS Applied Materials & Interfaces 6:4473-4479, incorporated herein by reference in its entirety], stainless steel [Zhu H, Liu H, Zhitomirsky I, Zhu S. (2015) Materials Letters 142:19-22, incorporated herein by reference in its entirety], copper oxide [Guo Y, Mao Y, Hu P, Ying Y, Peng X. (2016) ChemistrySelect 1:108-113, incorporated herein by reference in its entirety], ionic liquid/chitosan (IL-CS) [Fernandez-Barquin A, Casado-Coterillo C, Etxeberria-Benavides M, Zuñiga J, Irabien A. (2017) Chemical Engineering & Technology 40:997-1007, incorporated herein by reference in its entirety]. However, none of the above mentioned support could provide a flexible membrane.

In the formation of a metal organic framework, the organic ligands must meet certain requirements to form coordination bonds, primarily being multidentate, having at least two donor atoms (i.e. O—, and/or N—) and being neutral and/or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two carboxylate groups. Preferably, the organic ligands are polycarboxylates including, but not limited to, di-, tri-, tetra-, and/or hexacarboxylates. In a most preferred embodiment, the metal organic framework of the present disclosure in any of its embodiments comprises benzene-1,3,5-tricarboxylate as the organic ligands. Benzene-1,3,5-tricarboxylate organic ligands have carboxylate groups, with each carboxylate groups forming a coordinative bond to the metal ions (e.g. Cu(II)) to produce a coordination network. Preferably, the metal-organic framework comprises HKUST-1.

It is equally envisaged that the metal organic framework of the present disclosure may be adapted to further comprise one or more additional organic ligands in addition to or in lieu of the benzene-1,3,5-tricarboxylate ligands including, but not limited to, bidentate carboxylates, tridentate carboxylates, tetradentate carboxylates, azoles, and neutral ligands. Exemplary suitable bidentate carboxylates include, but are not limited to carboxylates forms of oxalic acid (ethanedioic acid, HOOC—COOH), malonic acid (propanedioic acid, HOOC—(CH$_2$)—COOH), succinic acid (butanedioic acid, HOOC—(CH$_2$)$_2$—COOH), glutaric acid (pentanedioic acid, HOOC—(CH$_2$)$_3$—COOH), phthalic acid (benzene-1,2-dicarboxylic acid, o-phthalic acid, C$_6$H$_4$(COOH)$_2$), isophthalic acid (benzene-1,3-dicarboxylic acid, m-phthalic acid, C$_6$H$_4$(COOH)$_2$), terephthalic acid (benzene-1,4-dicarboxylic acid, BDC, p-phthalic acid, C$_6$H$_4$(COOH)$_2$), biphenyl-4,4'-dicarboxylic acid, BPDC, HOOC—(C$_6$H$_4$)$_2$—COOH), and the like. Exemplary tridentate carboxylates include, but are not limited to, carboxylates forms of 1,2,3-benzenetricarboxylic acid, 1,2,4-benzenetricarboxylic acid, citric acid (2-hydroxy-1,2,3-propanetricarboxylic acid, (HOOC)CH$_2$C(OH(COOH)CH$_2$(COOH), 1,3,5-tris(4-carboxyphenyl)benzene, and the like. Exemplary tetradentate carboxylates include, but are not limited to, carboxylates forms of 1,2,4,5-benzenetetracarboxylic acid, biphenyl-3,3',5,5'-tetracarboxylic acid, 1,2,3,4-cyclobutanetetracarboxylic acid, 1,2,3,4-butanetetracarboxylic acid, and the like. Exemplary azoles include, but are not limited to, 1,2,3-triazole (1H-1,2,3-triazole, C$_2$H$_3$N$_3$), pyrrodiazole (1H-1,2,4-triazole, C$_2$H$_3$N$_3$), and the like. Exemplary suitable neutral ligands included, but are not limited to, piperazine and 4,4'-bipyridine.

A particle is defined as a small object that behaves as a whole unit with respect to its transport and properties. The metal-organic framework of the present disclosure in any of its embodiments may be in the form of particles of the same shape or different shapes, and of the same size or different sizes. An average diameter (e.g., average particle diameter) of the particle, as used herein, refers to the average linear distance measured from one point on the particle through the center of the particle to a point directly across from it. The metal-organic framework particles may have an average diameter in a range of 10-200 nm, 50-150 nm, or 75-100 nm. The metal-organic framework particles may be agglomerated or non-agglomerated (i.e., the metal-organic framework particles are well separated from one another and do not form clusters). In one embodiment, the metal-organic framework particles are agglomerated and the agglomerates have an average diameter in a range of 1-20 µm, 2-15 µm, or 5-10 µm.

The metal-organic framework particles may be spherical or substantially spherical (e.g., oval or oblong shape). In some embodiments, the metal-organic framework particles are in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface). The metal-organic framework may be mesoporous or microporous. An average pore size of the metal-organic framework particle may be in a range of 0.1-10 nm, 0.2-5 nm, 0.4-3 nm, or 0.8-2 nm.

In one or more embodiments, the aforementioned metal-organic framework is disposed on the wall surface of the pore channels and the outer surface of the polymer substrate. The metal-organic framework may interact with the carboxylate groups on the wall surface of the pore channels and/or the outer surface of the polymer substrate through coordinate bonding. The metal-organic framework particles may also interact with the surfaces of the polymer substrate via van der Waals forces and/or π-π interactions (for polymer substrates containing aryl groups such as phenyl, naphthyl, anthracenyl and biphenyl). The metal-organic framework preferably covers greater than 90%, greater than 95%, greater than 96%, greater than 97%, greater than 98%, greater than 99%, greater than 99.5% of the wall surface of the pore channels of the polymer substrate. The metal-organic framework preferably covers greater than 90%, greater than 95%, greater than 96%, greater than 97%, greater than 98%, greater than 99%, greater than 99.5% of the outer surface of the polymer substrate. In one or more embodiments, the metal-organic framework has an average thickness of 50-4,000 nm, preferably 100-3,000 nm, preferably 200-2,500 nm, preferably 300-2,000 nm, preferably 400-1,800 nm, preferably 600-1,600 nm, preferably 800-1,400 nm, preferably 1,000-1,200 nm.

As used herein, UV-vis spectroscopy or UV-vis spectrophotometry refers to absorption spectroscopy or reflectance spectroscopy in the ultraviolet-visible spectral region. In one or more embodiments, the membrane has an ultraviolet visible absorption with an absorption peak in a range of 450-900 nm, preferably 500-800 nm, preferably 600-750 nm, preferably 680-720 nm, or about 700 nm. It should be noted that the absorption peak intensity of the membrane increases as the thickness of the metal-organic framework increases.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Surface area is a property of solids which is the total surface area of a material per unit of mass, solid or bulk volume, or cross sectional area. In most embodiments, BET surface area is measured by gas adsorption analysis, preferably N$_2$ adsorption analysis. In a preferred embodiment, the membrane has a BET surface area of 50-500 m$^2$/g, preferably 75-400 m$^2$/g, preferably 100-300 m$^2$/g, preferably 125-280 m$^2$/g, preferably 150-260 m$^2$/g, preferably 170-240 m$^2$/g, preferably 190-220 m$^2$/g, preferably 200-210 m$^2$/g.

Figure 14A:
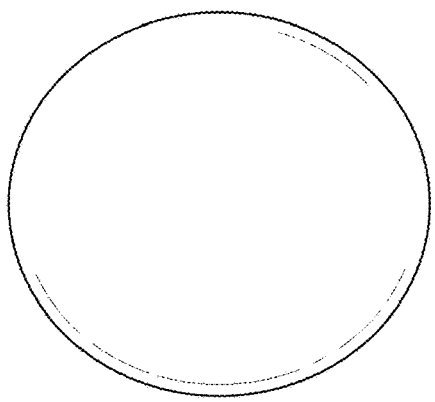
FIG. 14A is a photo showing the transparency nature of a membrane fabricated via 100 cycles of the LPE process.
Figure 14B:
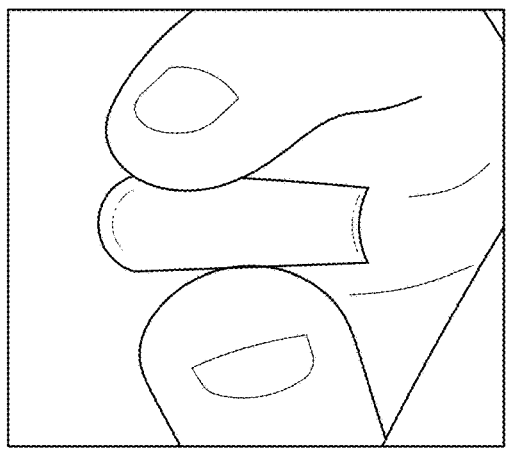
FIG. 14B is a first photo showing the flexibility of the sample in FIG. 14A.
Figure 14C:
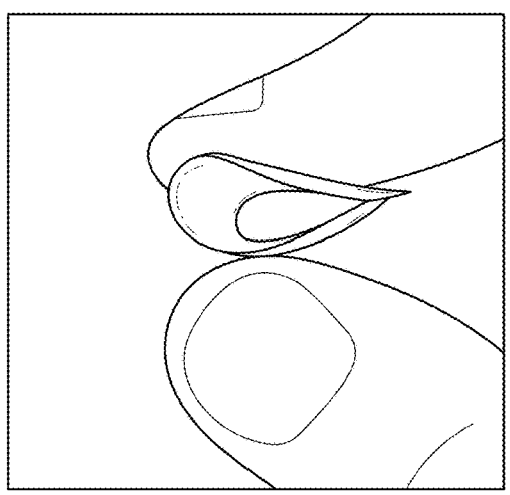
FIG. 14C is a second photo showing the flexibility of the sample in FIG. 14A.
Figure 15A:
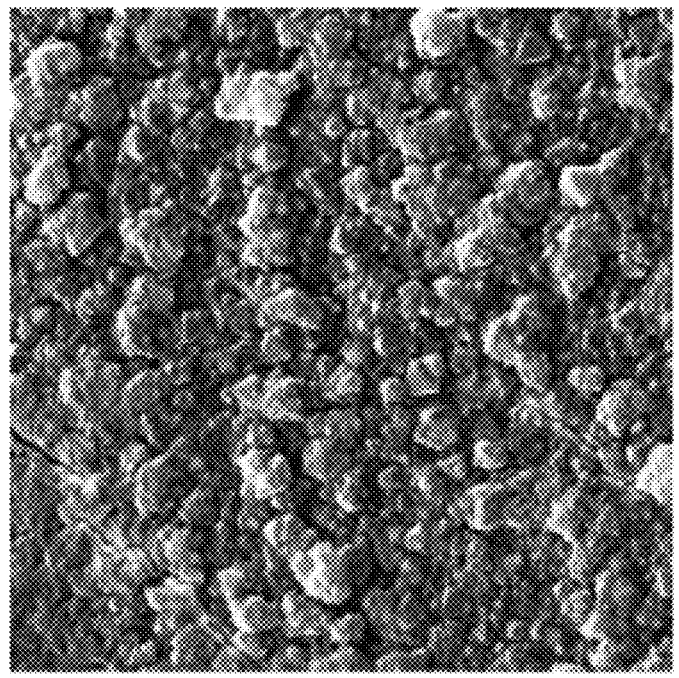
FIG. 15A is a scanning electron micrograph of a membrane after being soaked in toluene for 1 hour and then sonicated for 5 seconds.
Figure 15B:
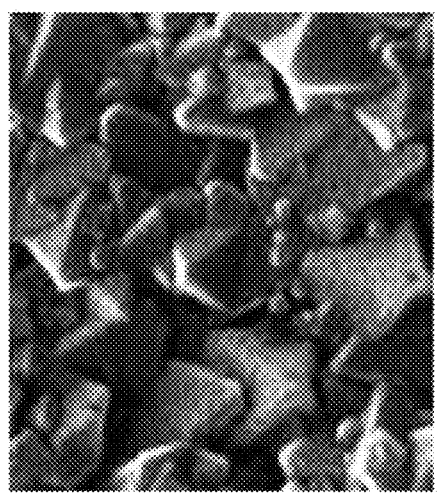
FIG. 15B shows a magnified view of the sample in FIG. 15A.
Figure 15C:
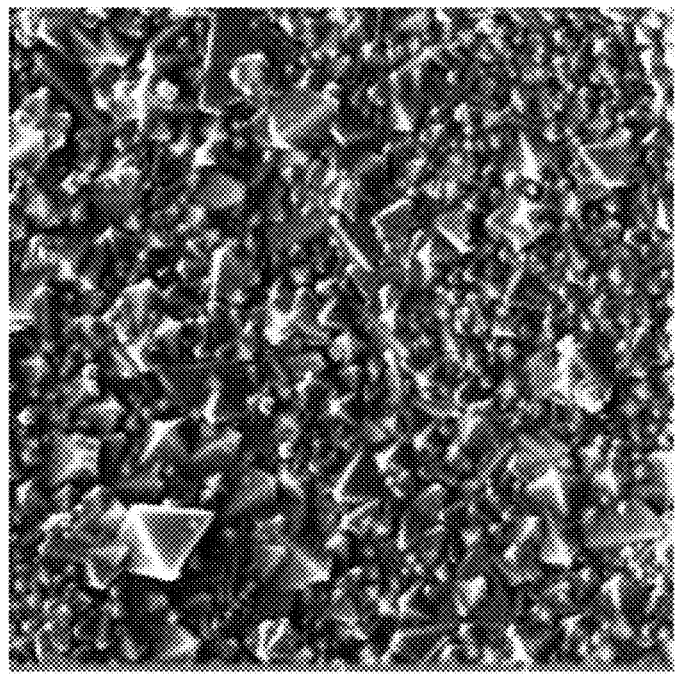
FIG. 15C is a scanning electron micrograph of a membrane after being soaked in toluene for 1 hour and then sonicated for 10 seconds.
Figure 15D:
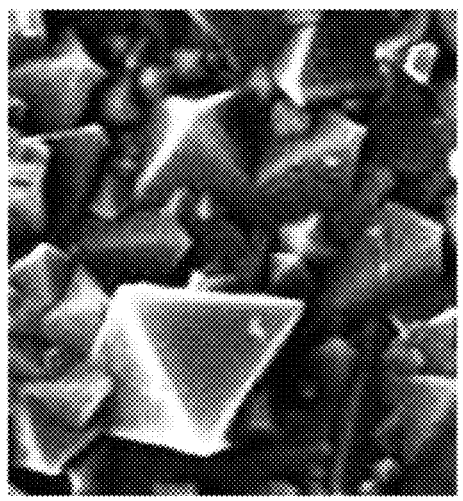
FIG. 15D shows a magnified view of the sample in FIG. 15C.
Figure 15E:
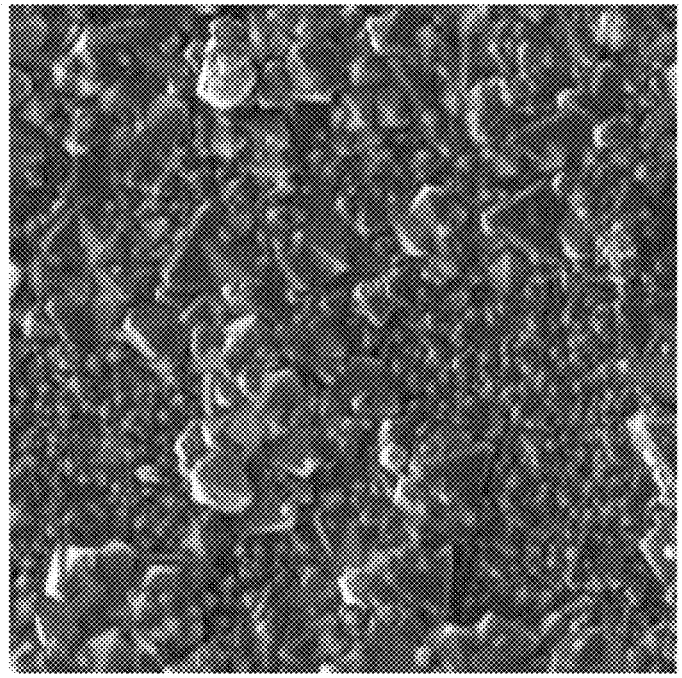
FIG. 15E is a scanning electron micrograph of a membrane after being soaked in toluene for 1 hour and then sonicated for 60 seconds.
Figure 15F:
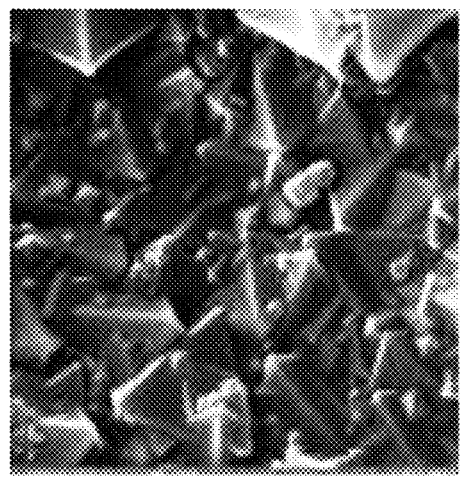
FIG. 15F shows a magnified view of the sample in FIG. 15E.
Figure 15G:
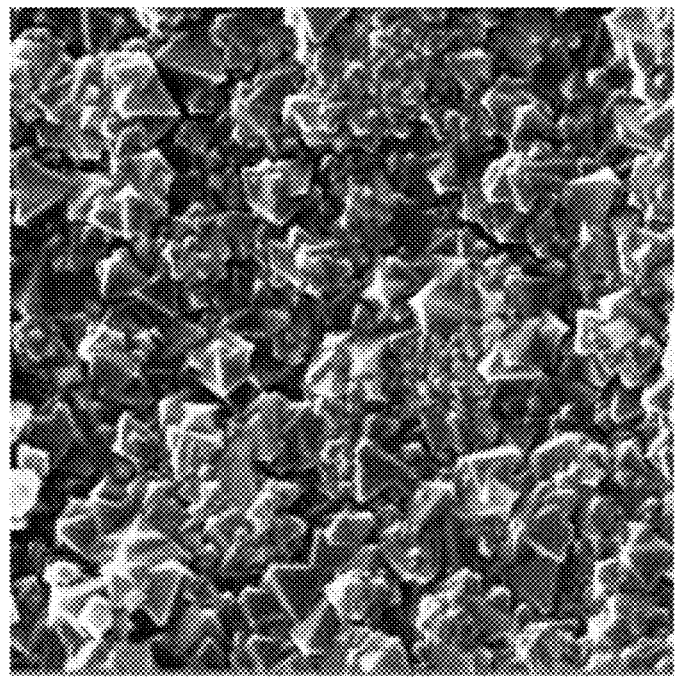
FIG. 15G is scanning electron micrograph of a membrane after being soaked in toluene for 1 hour and then sonicated for 300 seconds.
Figure 15H:
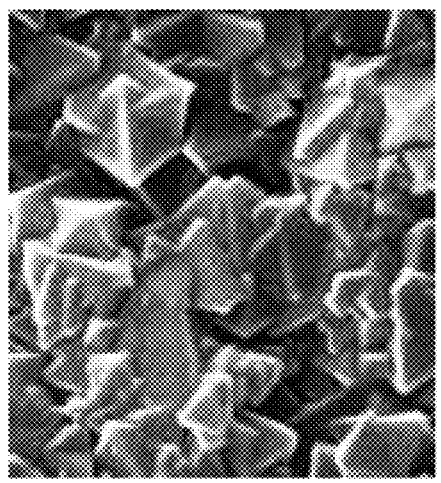
FIG. 15H shows a magnified view of the sample in FIG. 15G.

The membrane disclosed herein may be a thin film membrane, a flat sheet membrane, or a spiral membrane. The membrane may be in the form of various shapes, for example, flat (e.g., for a disc-shaped membrane), bent, curved (e.g., a cylinder shaped membrane), and rippled. As shown in FIGS. 14A, B and C, the membrane is relatively transparent and flexible. It can be flipped, bent, and/or curved without causing defects in the membrane structure. In one embodiment, the membrane is a thin film membrane and has a thickness of 10-500 µm, 50-400 µm, or 100-300 µm. In some embodiments where the membrane is disc-shaped, a diameter of the membrane may be 10-100 mm, 11-80 mm, or 12-50 mm. In some embodiments, the membrane is in a form of a rectangular sheet having a width of 2-110 cm, 10-70 cm, or 20-60 cm. A length of the rectangular sheet may range from 10 cm to 122 m, 100 cm to 50 m, 1 m to 20 m, or 5 m to 10 m.

The membranes may be freestanding or supported on or by a substrate. The substrate may be macroporous and may establish the lateral dimensions and shape of the membranes as they are being formed. Further, the substrate provides the finished membrane with structural stability. Examples of materials from which the substrate can be made are ceramics, glass, metals, and polymers. Exemplary ceramics include, without limitation, $\alpha\text{-}Al_2O_3$, $\gamma\text{-}Al_2O_3$, $\eta\text{-}Al_2O_3$, $\theta\text{-}Al_2O_3$, $\chi\text{-}Al_2O_3$, $\kappa\text{-}Al_2O_3$, $\delta\text{-}Al_2O_3$, silica, titania, magnesia, zirconia, and combinations thereof. Exemplary metals include, without limitation, gallium, germanium, stainless steel, titanium, and combinations thereof. Exemplary polymers include, without limitation, polysulfones, polyether sulfones, polyacrylonitriles, cellulose esters, polypropylenes, polyvinyl chlorides, polyvinylidene fluorides, polyaryl-ether ketones, polyamides (e.g., nylons), and polyesters. A wide variety of suitable substrates are either available commercially or may be prepared using techniques known to those of ordinary skill in the art. The substrate may be present in an amount of at least 10%, at least 20%, at least 30%, at least 40%, at least 50%, or at least 75% by weight based on a combined weight of the membrane and the substrate.

While the substrate may serve a filtering function by size exclusion, its filtering characteristics (if any) may be substantially more coarse than those of the membrane itself. In terms of pore size, the support can have pores with an average diameter in a range of 100 nm to 50 μm, 500 nm to 20 μm, or 1-10 μm in diameter. The pore sizes should be sufficiently large so that a permeate gas can pass through the support without reducing the permeability of the membrane. However, the pores should not be so large that the membrane will either be unable to bridge or form across the pores, or tend to fill up or penetrate too far into the pores, thus producing an effectively thicker membrane than the thickness described herein.

According to a second aspect, the present disclosure relates to a method of producing the membrane wherein the wall surface of the pore channels and the surface of the polymer substrate are modified with carboxylate groups. The method involves (i) ion-irradiating an initial polymer substrate with heavy ions to form a polymer substrate having latent tracks, (ii) exposing the polymer substrate having latent tracks to a light to form a sensitized polymer substrate, (iii) etching the sensitized polymer substrate with an etchant to form a polymer substrate having pore channels, (iv) immersing the polymer substrate having pore channels in a first solution comprising the metal ion to form a metal ion coated polymer substrate, (v) immersing the metal ion coated polymer substrate in a second solution comprising the organic ligand to form a metal-organic framework coated polymer substrate, and (vi) alternating immersions in the first solution and the second solution for up to 200 cycles, preferably 10-180 cycles, preferably 20-160 cycles, preferably 40-140 cycles, preferably 60-120 cycles, preferably 80-100 cycles, thereby forming the membrane.

Ion-irradiation may be performed using swift heavy-ion beams generated by large accelerator facilities, e.g. the universal linear accelerator (UNILAC) of GSI (Darmstadt, Germany), and the cyclotrons at GANIL (Caen, France), JINR (Dubna, Russia), CICLONE (Louvain la Neuve, Belgium), Lanzhou (China), and Brookhaven (USA). Exemplary heavy-ions useful in the currently disclosed ion-irradiation include, but are not limited to, $^{238}U$, $^{197}Au$, $^{206}Pb$, and $^{209}Bi$. In one or more embodiments, the heavy ions have an average kinetic energy of 5-25 MeV per nucleon, preferably 6-20 MeV, preferably 7-15 MeV, preferably 8-14 MeV, preferably 9-13 MeV, preferably 10-12 MeV, or about 11.4 MeV per nucleon.

Ion-irradiation of the initial polymer substrate with swift heavy-ion beams may result in the generation of damaged zones which are defined herein as latent tracks (see FIG. 1). These latent tracks are produced mainly due to the breakdown of chemical bonds, leading to the production of double and triple bonds via ionization and electric excitations during high energy ions interacting with the initial polymer substrate [Sun Y, Zhu Z, Wang Z, Jin Y, Liu J, Hou M, Zhang Q. (2003) Nucl. Instr. & Method. B 209:188-193, incorporated herein by reference in its entirety]. The applied heavy-ion fluence may be altered in order to vary the density of latent tracks in the substrate. Higher latent track densities may lead to overlaps in polymer substrate later produced. Moreover, outgassing of volatile fragments leads to a decrease in material density along the ion tracks. The amount of damage induced in the latent track may depend on the energy loss of the heavy ions along their passage through the initial substrate. In one or more embodiments, the heavy ions have a fluence of $10^3\text{-}10^{10}$ heavy ions per square centimeter, preferably a fluence of $10^4\text{-}10^9$, $10^5\text{-}10^8$, or $10^6\text{-}10^7$ heavy ions per square centimeter.

Track cores in polymer membranes having latent tracks are mainly composed of chemically active polymer fragments, which can undergo post-irradiation reactions, such as oxidation, photo-oxidation, etc. As a result, storage of the ion-irradiated polymer membranes in air leads to a significant increase in the rate of etching. Energy deposited by ultraviolet (UV) light may further increase the rate of etching and selectivity by breaking chemical bonds along the latent track. UV light illumination may increase the surface polarity and thus facilitate the etchant attack on the polymer substrate having latent tracks. In addition to etching rate enhancement, UV light illumination may lead to improvement in pore size distribution [Zhu Z, Maekawa Y, Liu Q, Yoshida M. (2005) Nucl. Instrum. Methods Phys. Res., Sect. B:61-67, incorporated herein by reference in its entirety]. Illumination with light at wavelengths longer than 320 nm increases the track etching rate ($V_T$, latent tracks area). Illumination with light at wavelengths shorter than 320 nm enhances both track etching rate ($V_T$) and bulk etching rate ($V_B$, undamaged area) of the polymer substrate. Latent tracks in a polymer membrane can also be effectively sensitized by the treatment with certain organic solvents [Dobrev D, Trautmann C, Neumann R. (2006) GSI Scientific Report:321, incorporated herein by reference in its entirety].

In a preferred embodiment, the polymer substrate having latent tracks is exposed to a light before etching. The light may be UV light having a wavelength of 200-400 nm, preferably 250-350 nm, more preferably 270-330 nm. The light source may comprise one or more wavelengths within the range of 200-400 nm. In certain embodiments, the light may be provided by a light source offering the photon energy necessary to sensitize the polymer substrate having latent tracks of the present disclosure in any of their embodiments. Exemplary light sources include, but not limited to, a black light lamp, a short-wave UV lamp, an incandescent lamp, a gas-discharge lamp, a UV LED, and a UV laser. The polymer substrate having latent tracks may be exposed to the light for 0.1-4 hours, 0.5-2 hours, or about 1 hour.

Light sensitized polymer membranes may be exposed to a suitable etchant solution. During the etching process, the damaged zone (latent ion tracks) in polymer membrane is removed and converted into a hollow pore. The geometry of the pore channels depends on the ratio of track etching rate ($V_T$, latent tracks area) to bulk etching rate ($V_B$, undamaged area). Latent ion tracks are converted into pore channels when the track etching rate is higher than the bulk etching rate [Apel P Y, Blonskaya I V, Oganessian V R, Orelovitch 0 L, Trautmann C. (2001) Nucl. Instrum. Methods Phys. Res., Sect. B 185:216-221, incorporated herein by reference in its entirety].

Figure 3:
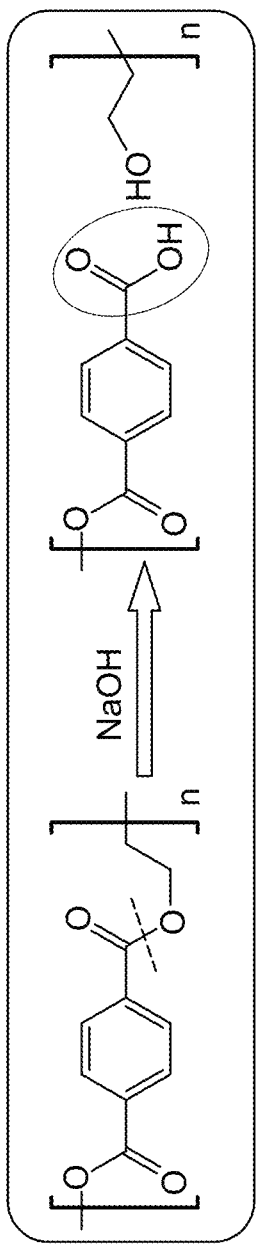
FIG. 3 shows the hydrolysis of ester bonds via chemical etching of tracks in a membrane.

For the case of PET (also known as polyester) membrane, the polymer is formed through a network of ester bonds via the condensation between terephthalic acid and ethylene glycol. The etchant (e.g. NaOH) primarily attacks these ester bonds. The alkali hydrolyses these partially charged ester bonds in the polymer chain, leading to the production of carboxyl (—COOH) and hydroxyl (—OH) groups on the surface (see FIG. 3) [Pasternak C A, Alder G M, Apel P Y, Bashford C L, Edmonds D T, Korchev Y E, Lev A A, Lowe G, Milovanovich M, Pitt C W, Rostovtseva T K, Zhitariuk N I. (1995) Radiat. Meas. 25:675-683; Maekawa Y, Suzuki Y, Maeyama K, Yonezawa N, Yoshida M. (2004) Chemistry Letters 33:150-151; Maekawa Y, Suzuki Y, Maeyama K, Yonezawa N, Yoshida M. (2006) Langmuir 22:2832-2837; Chen W, McCarthy T J. (1998) Macromolecules 31:3648-3655, each incorporated herein by reference in their entirety]. It was estimated that the density of carboxyl groups on the inner pore walls was ~1 group $nm^{-2}$. [Wolf-Reber A. (2002). Aufbau eines Rasterionenleitwertmikroskops. Stromfluktuationen in Nanoporen in: PhD Dissertation, Vol. PhD, Johann Wolfgang Goethe Universitat, Frankfurt am Main, Germany. Frankfurt am Main, pp. 3-89825-89490-89829, dissertation.de, incorporated herein by reference in its entirety]

In one or more embodiments, the polymer substrate having latent tracks is subjected to an etchant. Preferably, sodium hydroxide is used as the etchant. Exemplary additional alkalines that may be used in addition to, or in lieu of sodium hydroxide include, but are not limited to, potassium hydroxide, calcium hydroxide, magnesium hydroxide, lithium hydroxide, or mixtures thereof. When used in solution, the alkaline may be dissolved in water prior to etching the polymer substrate having latent tracks. In one embodiment, the etchant is a solution comprising sodium hydroxide at a concentration of 0.5-5 M, preferably 1-4 M, preferably 2-3M. Alternatively, an acidic etchant is used. Exemplary acidic etchants include, without limitation, hydrochloric acid, sulfuric acid, nitric acid, phosphoric acid, boric acid, hydrofluoric acid, hydrobromic acid, hydroiodic acid, perchloric acid, and the like.

A symmetric etching is performed by immersing the polymer substrate having latent tracks in an etchant where the concentration of the etchant and the temperature in the vicinity of the polymer substrate are kept approximately constant throughout the entire etching process. Conversely, an unsymmetrical etching may be carried out by exposing the polymer substrate having latent tracks to an environment where the concentration of the etchant and/or the temperature is different in the vicinity of the polymer substrate. In a preferred embodiment, a symmetric etching is performed on the polymer substrate having latent tracks through constant stirring of the etchant for a pre-set time according to a required pore diameter (e.g. the pore diameter grows linearly with etching time at a rate of about 4-5 nm per minute) at 20-80° C., preferably 30-70° C., preferably 40-60° C., or about 50° C. A polymer substrate having pore channels (e.g. a perforated substrate) may be collected after etching, soaked and/or washed with water. In one or more, the perforated polymer substrate has pore channels with an average diameter of 0.01-3 μm, preferably 0.05-2.5 μm, preferably 0.1-2.0 μm, preferably 0.15-1.0 μm, preferably 0.2-0.8 μm, preferably 0.25-0.6 μm, preferably 0.3-0.4 μm, and an average length of 2-500 μm, preferably 4-400 μm, preferably 6-300 μm, preferably 8-200 μm, preferably 10-100 μm, preferably 12-50 μm, preferably 15-25 μm, and the wall surface of the pore channels and the surface of the perforated polymer substrate are modified with carboxylate groups. Alternatively, a perforated polymer substrate having pore channels with varied cross-sections over the length of the pore channels (e.g. conical-shaped and elongated oval-shaped pore channels) may be prepared by unsymmetrical etching.

In one or more embodiments, the aforementioned metal ion is present in the first solution at a concentration of 0.01-100 mM, preferably 0.1-50 mM, preferably 0.5-10 M, preferably 1-5 M. In one or more embodiments, the aforementioned organic ligand is present in the second solution at a concentration of 0.01-100 mM, preferably 0.1-50 mM, preferably 0.5-10 M, preferably 1-5 M. Solvents used for the first and the second solutions may be chosen for their ability to completely dissolve the metal ion and the organic ligand and for ease of solvent removal in the membrane formation step. Exemplary solvents include alcohols, e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, and cyclohexanol, ethers such as diethyl ether, tetrahydrofuran, 1,4-dioxane, tetrahydropyran, t-butyl methyl ether, cyclopentyl methyl ether, and di-iso-propyl ether, ketones such as acetone, esters such as ethyl acetate and propyl acetate, hydrocarbons such as pentane and hexane, and chlorinated solvents such as dichloromethane and chloroform. Preferably, ethanol is chosen as the solvent.

Highly ordered MOF coatings can be prepared via liquid-phase epitaxy (LPE). This method has the advantages over other methods as it provides a well-defined thickness, orientation and absence of defects. Epitaxy refers to the deposition of a crystalline overlayer on a substrate. Liquid-phase epitaxy (LPE) is an epitaxial technique that uses solutions to grow crystals on a substrate. In one embodiment, the currently disclosed membranes are fabricated in a multi-step LPE process by alternating deposition of the metal ion and the organic ligand on the aforementioned polymer substrate having pore channels.

Alternating immersions in the first solution and the second solution may involve one or more of (i) immersing the polymer substrate having pore channels in the first solution comprising the metal ion for 1-60 minutes, 2-30 minutes, or 5-10 minutes at a temperature of 4-60° C., 10-40° C., 15-30° C., or about 22° C. to absorb a portion of the metal ion onto at least a surface of the polymer substrate (e.g. the wall surface of the pore channels and an outer surface of the polymer substrate), (ii) withdrawing the polymer substrate from the first solution, (iii) draining excess liquid from the polymer substrate (e.g. evaporating the solvent by drying in air for 1-10 minutes, 2-8 minutes, or 3-5 minutes), (iv) washing the polymer substrate with a solvent (e.g. ethanol) to form a metal ion coated substrate, (v) immersing the metal ion coated substrate in the second solution comprising the organic ligand for 1-60 minutes, 2-30 minutes, or 5-10 minutes at a temperature of 4-60° C., 10-40° C., 15-30° C., or about 22° C. to absorb a portion of the organic ligand onto at least a surface of the substrate (e.g. the wall surface of the pore channels and an outer surface of the polymer substrate), (vi) withdrawing the substrate from the second solution, (vii) draining excess liquid from the polymer substrate (e.g. evaporating the solvent by drying in air for 1-10 minutes, 2-8 minutes, or 3-5 minutes), (viii) washing the polymer substrate with a solvent (e.g. ethanol), (iv) repeating aforementioned steps on the same substrate for up to 200 cycles, preferably 10-180 cycles, preferably 20-160 cycles, preferably 40-140 cycles, preferably 60-120 cycles, preferably 80-100 cycles, thereby forming the membrane. Alternatively, the membrane may be prepared by a LPE process by placing the polymer substrate having pore channels in a growth solution comprising both the metal ion and the organic ligands.

According to a third aspect, the present disclosure relates to a method of recovering a first gas from a gas mixture comprising the first gas and a second gas. The method involves delivering the gas mixture into a feed side of a chamber containing the membrane of the first aspect that divides the chamber into the feed side and a permeate side, such that at least a portion of the first gas permeates the membrane, and recovering from the permeate side a stream enriched in the first gas compared to the gas mixture. The stream enriched in the first gas may be subjected to further processing steps such as an additional purification step (e.g. column chromatography, further membrane separation steps, etc.).

In one or more embodiments, a force is provided to deliver the gas mixture into the feed side. For example, the gas mixture introduced into the feed side of the chamber has a pressure of 1-5 bar, preferably 1.1-4 bar, preferably 1.2-3 bar, preferably 1.3-2 bar, preferably 1.4-1.8 bar, preferably 1.5-1.7 bar. In one embodiment, the method also involves applying a reduced pressure (i.e. vacuum) to the permeate side of the chamber. In one or more embodiments, the gas mixture is introduced at a temperature of 20-60° C., 25-50° C., 30-40° C., or about 35° C.

Gases that may be separated by the membrane disclosed herein in any of its embodiments include, without limitation, hydrogen, carbon dioxide, carbon monoxide, oxygen, nitrogen, hydrocarbons having 1-4 carbon atoms (e.g. methane, ethane, ethylene, acetylene, propane, propylene, butane, iso-butane), and noble gases (e.g. helium, neon, argon, krypton, xenon). In a preferred embodiment, the first gas is hydrogen, carbon dioxide, or both, and the second gas is at least one selected from the group consisting of oxygen, nitrogen, methane, ethylene, ethane, propylene, and propane.

The membrane disclosed herein may have a permeability of at least 500 barrer, at least 1000 barrer, at least 2,000 barrer, at least 3,000 barrer, at least 3,500 barrer and up to 6,000 barrer, up to 5,000 barrer, up to 4,500 barrer, or up to 4,000 barrer, for hydrogen gas. The membrane may have a permeability of at least 100 barrer, at least 200 barrer, at least 400 barrer, at least 600 barrer, or at least 800 barrer, and up to 2,000 barrer, up to 1,500 barrer, or up to 1,000 barrer, for oxygen gas. The membrane may have a permeability of at least 100 barrer, at least 150 barrer, at least 200 barrer, at least 250 barrer, and up to 500 barrer, up to 400 barrer, or up to 300 barrer, for nitrogen gas. The membrane may have a permeability of at least 2,000 barrer, at least 3,000 barrer, at least 4,000 barrer, or at least 4,500 barrer, and up to 7,000 barrer, up to 6,000 barrer, or up to 5,000 barrer, for carbon dioxide gas. The membrane may have a permeability of at least 50 barrer, at least 100 barrer, at least 250 barrer, or at least 500 barrer, and up to 800 barrer, up to 700 barrer, or up to 600 barrer, for methane, ethane, ethylene, propane, and/or propylene. The permeability measurements may be taken at an upstream pressure of 1.1-5 bar, 1.5-4 bar, or 1.8-2.5 bar, and the membrane may be pre-evacuated at 20-50° C., 35-45° C., or 30-40° C.

Barrer is a non-SI unit of gas permeability used in the membrane technology.

$$1 \text{ barrer} = 10^{-10} \frac{cm_{STP}^3 \cdot cm}{cm^2 \cdot s \cdot cmHg}$$

Here, the term "$cm^3_{STP}$" is standard cubic centimeter, which is a unit of amount of gas rather than a unit of volume. It represents the amount of gas molecules or moles that would occupy one cubic centimeter at standard temperature and pressure, as calculated via the ideal gas law. The term "cm" corresponds, in the permeability equations, to the thickness of the material whose permeability is being evaluated, the term "$cm^3_{STP} cm^{-2} s^{-1}$" corresponds to the flux of gas through the material, and the term "cmHg" corresponds to the pressure drop across the material. Thus, "barrer" is a measure of the rate of fluid flow through an area of material with a thickness driven by a given pressure. In SI units, 1 barrer is equivalent to $3.34 \times 10^{-16}$ mol Pa$^{-1}$ s$^{-1}$ m$^{-1}$.

As used herein, the term "ideal selectivity" refers to a ratio between the permeability of the gases. The ideal selectivity of $H_2/N_2$ of the membrane disclosed herein may be at least 4, at least 8, or at least 10, and up to 20, up to 15, or up to 12. The ideal selectivity of $H_2/O_2$ of the membrane may be at least 5, at least 8, or at least 12, and up to 30, up to 20, or up to 15. The ideal selectivity of $H_2/CO_2$ of the membrane may be at least 2, at least 4, or at least 6, and up to 12, up to 10, or up to 8. The ideal selectivity of $H_2/CH_4$ of the membrane may be at least 5, at least 8, or at least 12, and up to 30, up to 20, or up to 15. The ideal selectivity of $H_2/C_2H_6$ of the membrane may be at least 4, at least 6, or at least 8, and up to 20, up to 16, or up to 12. The ideal selectivity of $H_2/C_2H_4$ of the membrane may be at least 5, at least 10, or at least 15, and up to 40, up to 30, or up to 20. The ideal selectivity of $H_2/C_3H_8$ of the membrane may be at least 40, at least 60, or at least 80, and up to 120, up to 100, or up to 90. The ideal selectivity of $H_2/C_3H_6$ of the membrane may be at least 80, at least 100, or at least 120, and up to 200, up to 175, or up to 150. The ideal selectivity of $CO_2/N_2$ of the membrane may be at least 4, at least 8, or at least 15, and up to 30, up to 25, or up to 20. The ideal selectivity of $CO_2/CH_4$ of the membrane may be at least 4, at least 8, or at least 15, and up to 30, up to 25, or up to 20. The ideal selectivity of $CO_2/C_2H_6$ of the membrane may be at least 3, at least 6, or at least 9, and up to 20, up to 15, or up to 12. The ideal selectivity of $CO_2/C_2H_4$ of the membrane may be at least 5, at least 10, or at least 15, and up to 35, up to 25, or up to 20. The ideal selectivity of $CO_2/C_3H_8$ of the membrane may be at least 50, at least 70, or at least 90, and up to 140, up to 120, or up to 100. The ideal selectivity of $CO_2/C_3H_6$ of the membrane may be at least 90, at least 120, or at least 140, and up to 200, up to 180, or up to 160.

Any given pair or group of gases that differ in molecular sizes, for example, hydrogen and nitrogen, hydrogen and oxygen, hydrogen and carbon dioxide, hydrogen and methane, hydrogen and ethane, hydrogen and ethylene, hydrogen and propane, hydrogen and propylene, carbon dioxide and nitrogen, carbon dioxide and methane, carbon dioxide and ethane, carbon dioxide and ethylene, carbon dioxide and propane, carbon dioxide and propylene, nitrogen and oxygen, helium and methane, can be separated using the membrane described herein. More than one gas may be removed from the gas mixture. For example, a stream enriched in the first gas compared to the gas mixture may be recovered from the permeate side by removing the second gas including oxygen, nitrogen, methane, ethylene, ethane, propylene, and/or propane.

In some embodiments, the method is useful in enriching hydrogen gas from a gas mixture comprising hydrogen gas and nitrogen gas, or hydrogen gas from a gas mixture comprising hydrogen gas and carbon dioxide gas, or hydrogen gas from a gas mixture comprising hydrogen gas and methane gas, or hydrogen gas from a gas mixture comprising hydrogen gas and ethane gas, or hydrogen gas from a gas mixture comprising hydrogen gas and ethylene gas, or hydrogen gas from a gas mixture comprising hydrogen gas and propane gas, or hydrogen gas from a gas mixture comprising hydrogen gas and propylene gas. In other embodiments, the method is useful in enriching carbon dioxide gas from a gas mixture comprising carbon dioxide gas and nitrogen gas, or carbon dioxide gas from a gas mixture comprising carbon dioxide gas and methane gas, or carbon dioxide gas from a gas mixture comprising carbon dioxide gas and ethane gas, or carbon dioxide gas from a gas mixture comprising carbon dioxide gas and ethylene gas, or carbon dioxide gas from a gas mixture comprising carbon dioxide gas and propane gas, or carbon dioxide gas from a gas mixture comprising carbon dioxide gas and propylene gas.

The chamber used for separating the gas mixture may be of any shape so long as the membrane can be securely housed and utilized inside the chamber to accomplish the gas mixture separation. For example, the chamber may be a cylindrical membrane module. The chamber may also include an inlet configured to accept feed material, a first outlet configured to expel a retentate, and a second outlet configured to expel a permeate. The chamber can be configured to be pressurized so as to push feed material though the inlet, retentate through the first outlet and permeate through the second outlet. The chamber may also include a vacuum pump to provide vacuum or a reduced pressure to the permeate side. Further, it is contemplated that at least 2, 3, 4 or more of the same or different membranes disclosed herein may be used in series with one another to further enrich or isolate a targeted gas from a gas mixture. Similarly, the membranes may be used in series with other currently known membranes to enrich or isolate a targeted gas from a gas mixture.

In addition to gas separation and enrichment, the membranes disclosed herein may be used in separation of liquid mixtures by pervaporation, water treatment, air purifiers, chemical filters, oil and gas refineries, fermenters, and bioreactors.

The examples below are intended to further illustrate protocols for preparing, characterizing and utilizing the membrane, and are not intended to limit the scope of the claims.

Example 1

Fabrication of Cylindrical Nanopores
Polymer Irradiation

The irradiation of polymer membranes was performed with swift heavy ions ($^{238}U$, $^{197}Au$ or $^{206}Pb$) having a kinetic energy of up to 11.4 MeV per nucleon. The irradiation of polyethylene terephthalate sheet was performed at a heavy ion accelerator UNILAC (Universal Linear Accelerator) at GSI Helmholtzzentrum für Schwerionenforschung GmbH, Darmstadt, Germany. This linear accelerator is 120 m long and has the ability to accelerate the heavy ions up to ~15% of the speed of light. During an irradiation process, the highly charged ions would penetrate into the material (sample) and lose their energy through different routes. All the irradiation experiments at UNILAC were performed at room temperature. Usually a fluence of $10^4$ to $5 \cdot 10^8$ ions/cm$^2$ was applied for nanopore fabrication.

Sensitization

In case of PET, polymer substrates were exposed to UV light (320 nm) for 60 minutes on each side, leading to photo-oxidative degradation.

Ion Track-Etching

Figure 2A:
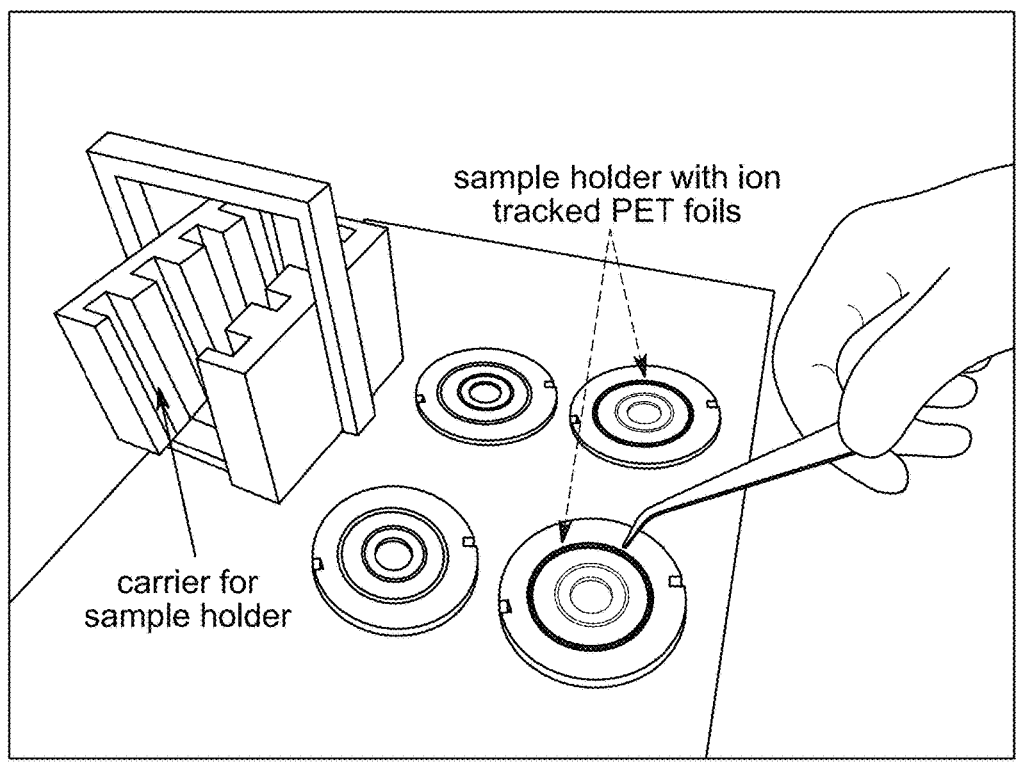
FIG. 2A is a photo illustrating the sample holder for polymer substrates used during nanopore preparation.
Figure 2B:
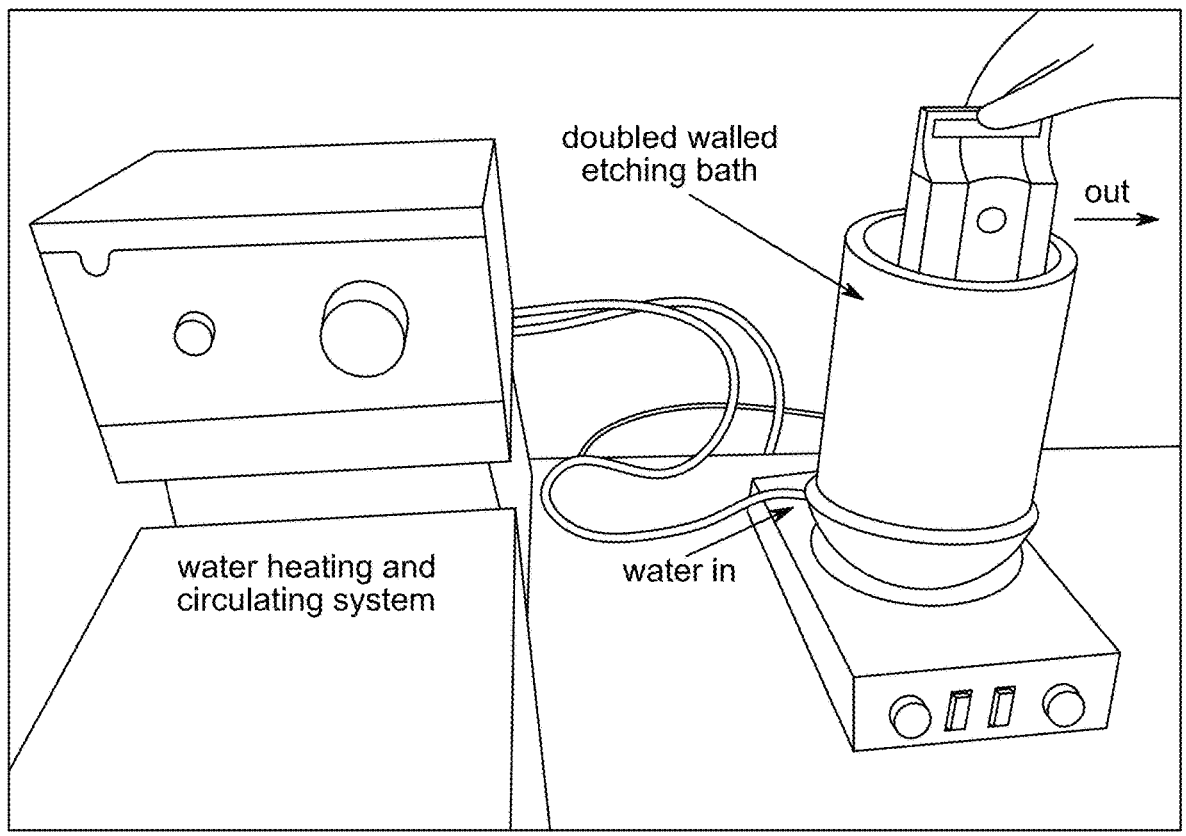
FIG. 2B is a photo illustrating the experimental setup of track etching.
Figure 2C:
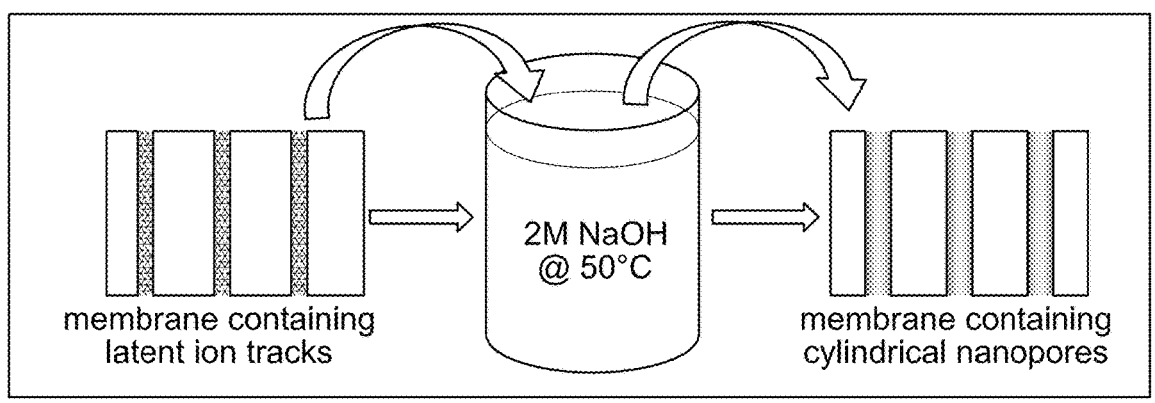
FIG. 2C is a schematic illustration of tracking etching process.

The fabrication of cylindrical nanopores in polymer substrates was conducted through symmetric chemical etching of latent ion tracks using alkali hydroxide solution. The track etching was carried out in a double walled isothermal bath, which is half-filled with 2M sodium hydroxide (NaOH) solution. The temperature of etching solution was maintained at 50° C. by circuits of heating and cooling water flowing through the double walls of the beaker. The ion tracked polymer substrates were first fixed in the sample holders as shown in FIG. 2A. Then this sample holder with substrates was immersed in the preheated etching bath (FIG. 2B). FIG. 2C shows a simplified scheme for the fabrication of cylindrical nanopores in the etching bath. Under these conditions the pore diameter scaled linearly with etching time at a rate of ~5.4 nm per minute. After the etching, the sample holders along with polymer substrates were taken out from the etching bath and rinsed several times with deionized water. In this setup the etchant can attack and dissolve the latent ion tracks in polymer membrane from both sides. Therefore, this etching process is considered as symmetrical etching.

Generation of Functional Groups

The heavy ion irradiation and subsequent chemical etching process employed for production of track-etched nanopores resulted in the cleavage of chemical bonds in the polymeric material. As a result, chemical groups were generated on the membrane surface and the channel.

Example 2

LPE Growth of HKUST-1 on Nanoporous Polymer

Figure 4:
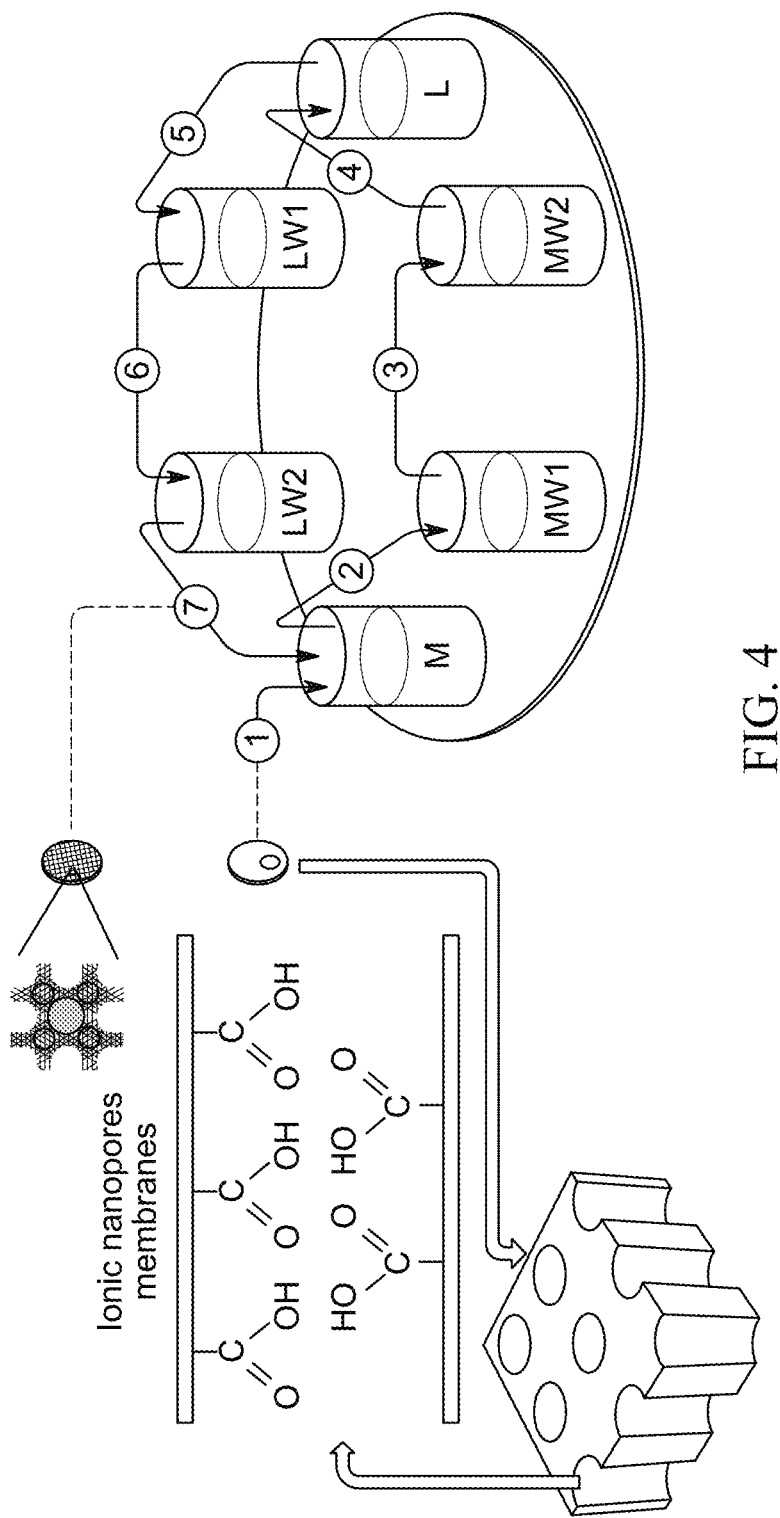
FIG. 4 is a graph illustrating MOF fabrication on a polymer substrate using liquid phase epitaxy (LPE) approach.
Figure 5A:
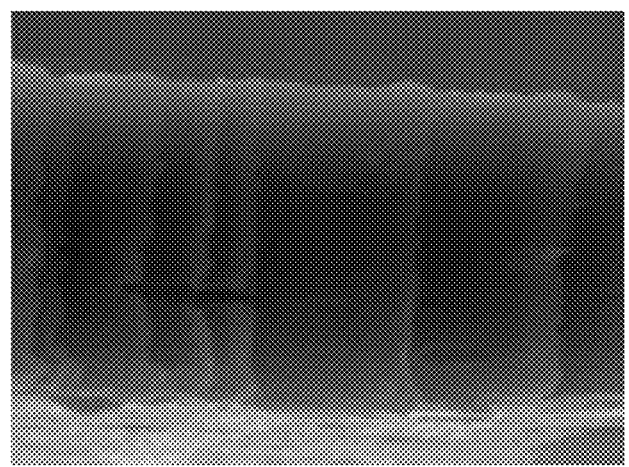
FIG. 5A is a scanning electron micrograph of a cross section of a polyethylene terephthalate (PET) substrate.
Figure 5B:
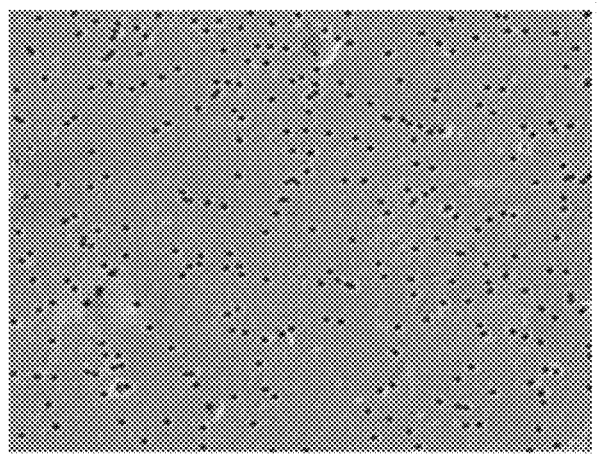
FIG. 5B is a scanning electron micrograph of a surface of a PET substrate.
Figure 5C:
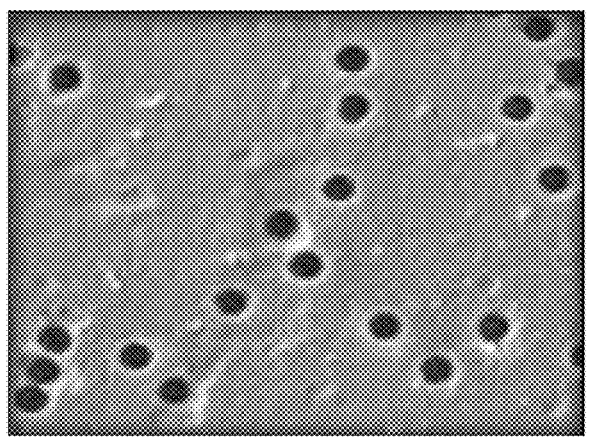
FIG. 5C shows a magnified view of the sample in FIG. 5B.
Figure 6A:
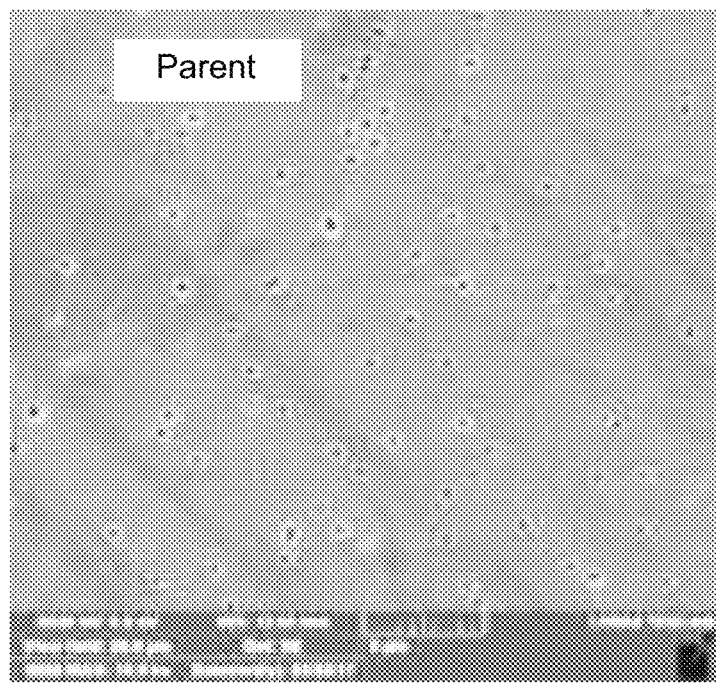
FIG. 6A is a scanning electron micrograph of a surface of a PET substrate before HKUST-1 fabrication.
Figure 6B:
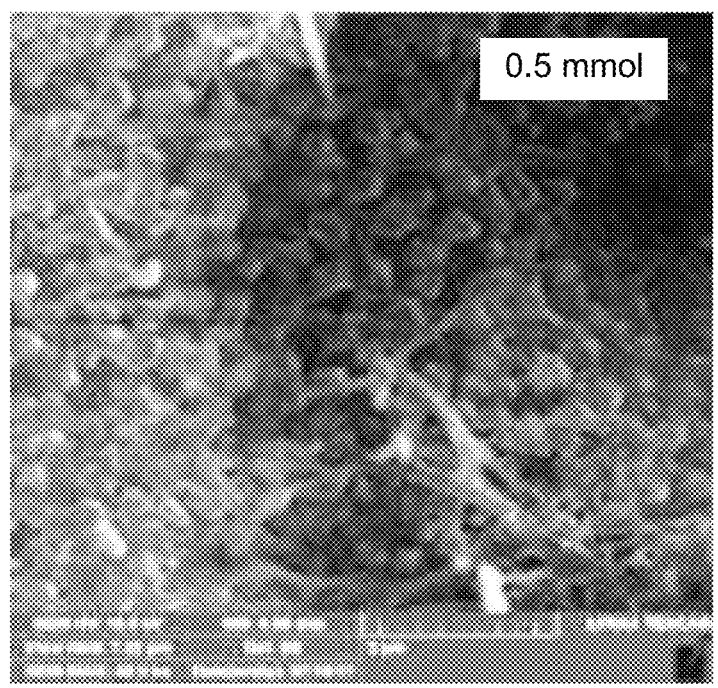
FIG. 6B is a scanning electron micrograph of a surface of a membrane fabricated using a 0.5 mmol solution of Cu(II) and a 0.5 mmol solution of benzene-1,3,5-tricarboxylate.
Figure 6C:
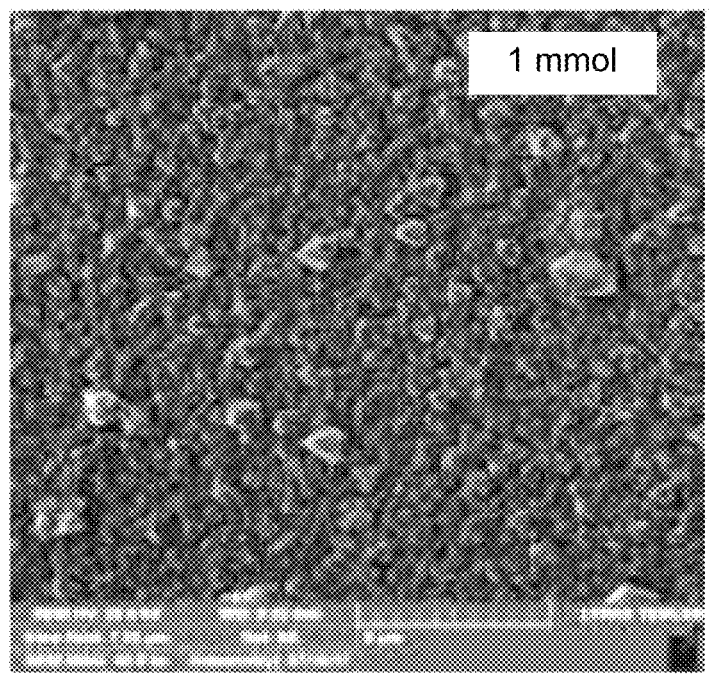
FIG. 6C is a scanning electron micrograph of a surface of a membrane fabricated using a 1 mmol solution of Cu(II) and a 1 mmol solution of benzene-1,3,5-tricarboxylate.
Figure 6D:
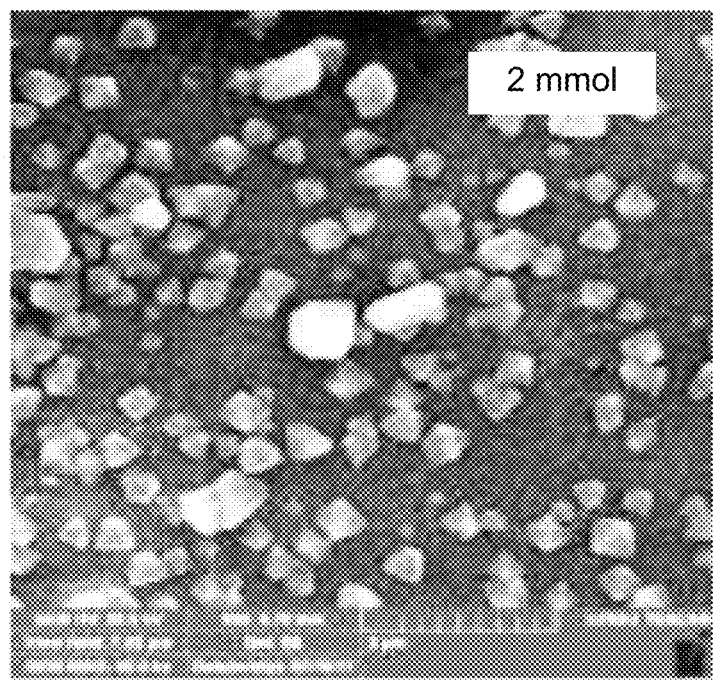
FIG. 6D is a scanning electron micrograph of a surface of a membrane fabricated using a 2 mmol solution of Cu(II) and a 2 mmol solution of benzene-1,3,5-tricarboxylate.
Figure 6E:
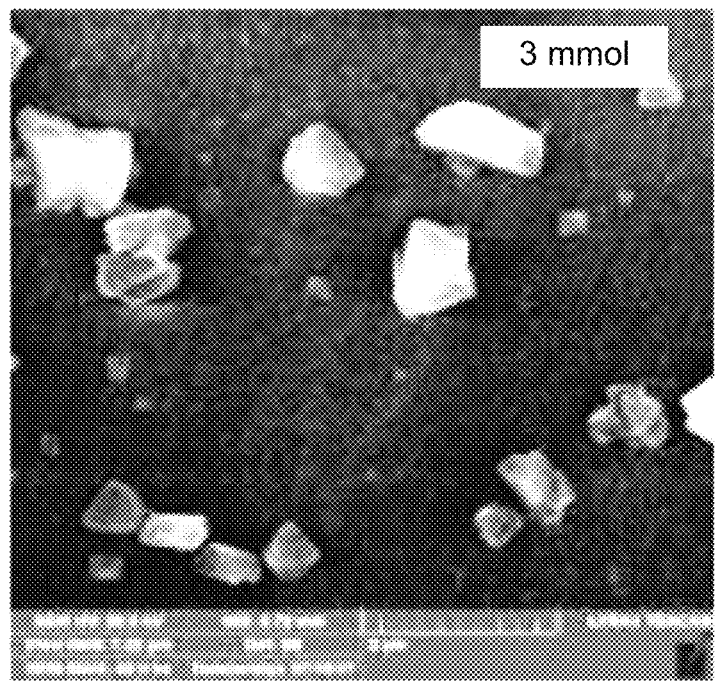
FIG. 6E is a scanning electron micrograph of a surface of a membrane fabricated using a 3 mmol solution of Cu(II) and a 3 mmol solution of benzene-1,3,5-tricarboxylate.
Figure 6F:
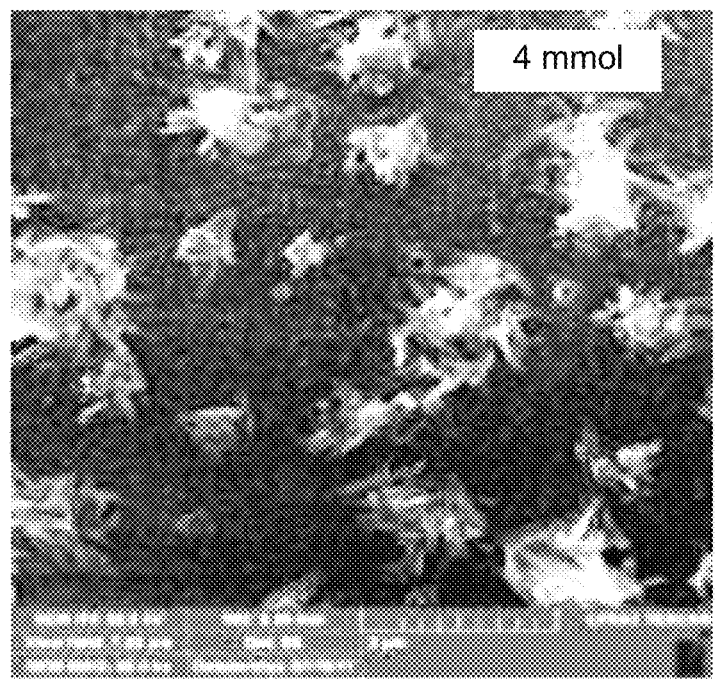
FIG. 6F is a scanning electron micrograph of a surface of a membrane fabricated using a 4 mmol solution of Cu(II) and a 4 mmol solution of benzene-1,3,5-tricarboxylate.
Figure 7A:
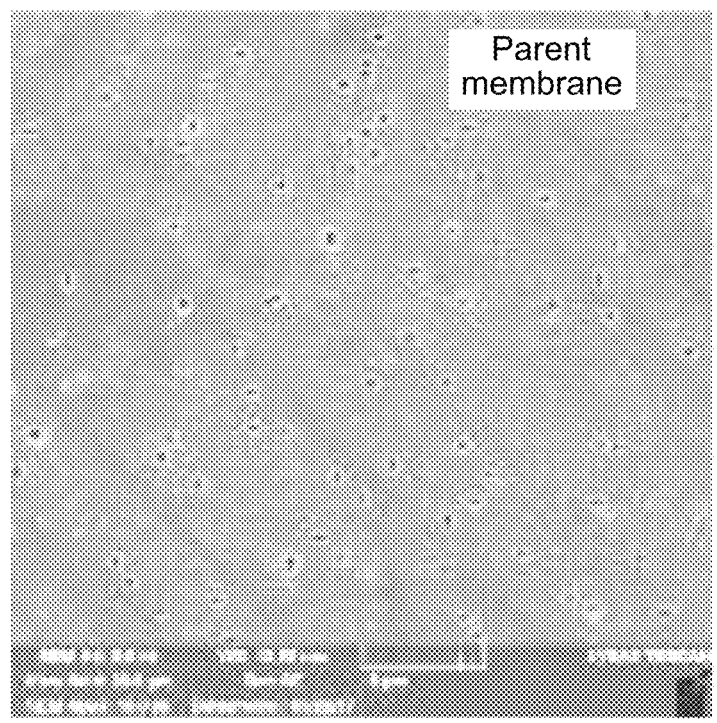
FIG. 7A is a scanning electron micrograph of a surface of a PET substrate before HKUST-1 fabrication.
Figure 7B:
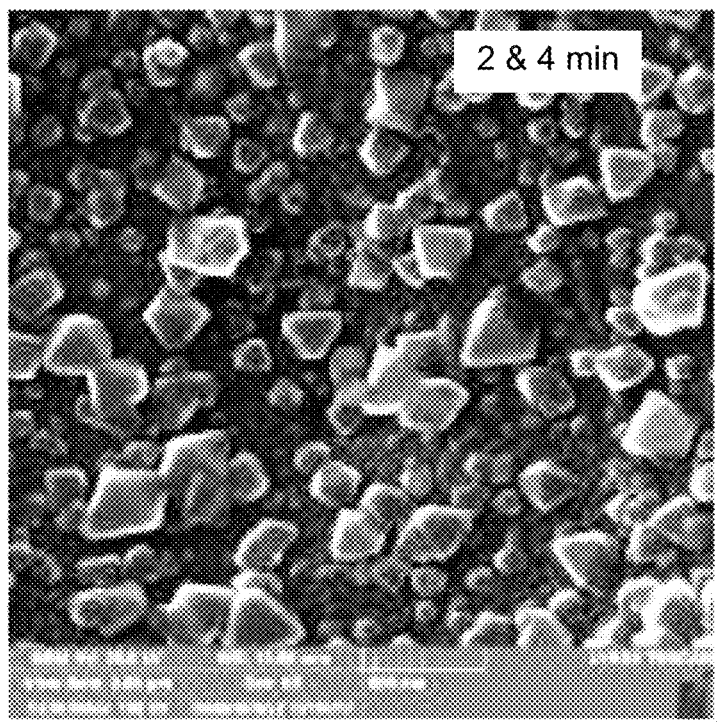
FIG. 7B is a scanning electron micrograph of a surface of a membrane fabricated by immersion in a solution of Cu(II) for 2 min and in a solution of benzene-1,3,5-tricarboxylate for 4 min after 10 cycles.
Figure 7C:
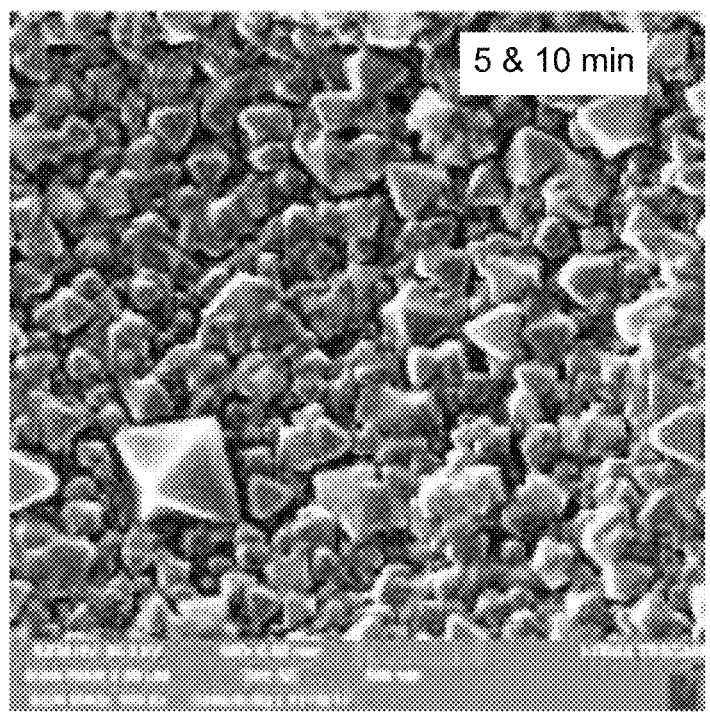
FIG. 7C is a scanning electron micrograph of a surface of a membrane fabricated by 10 cycles of immersion in a solution of Cu(II) for 5 min and in a solution of benzene-1,3,5-tricarboxylate for 10 min.
Figure 7D:
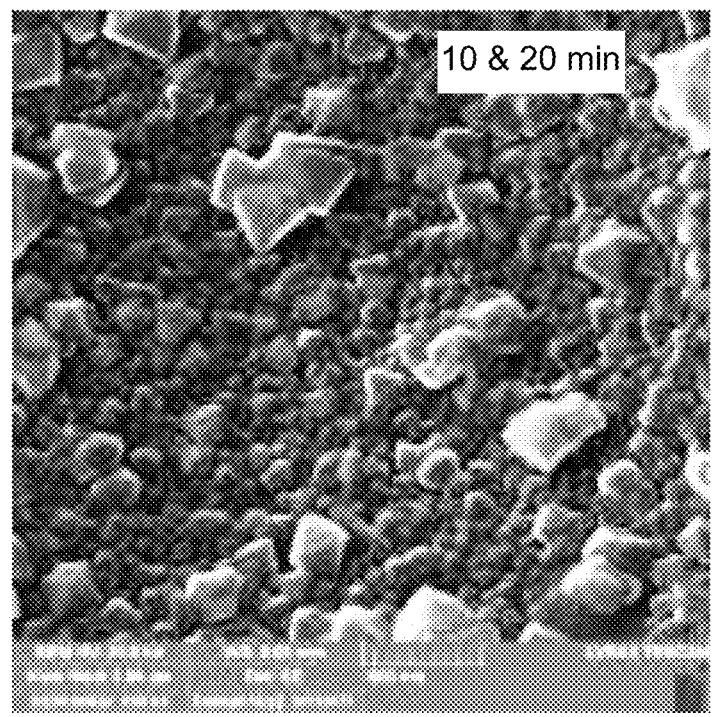
FIG. 7D is a scanning electron micrograph of a surface of a membrane fabricated by 10 cycles of immersion in a solution of Cu(II) for 10 min and in a solution of benzene-1,3,5-tricarboxylate for 20 min.
Figure 7E:
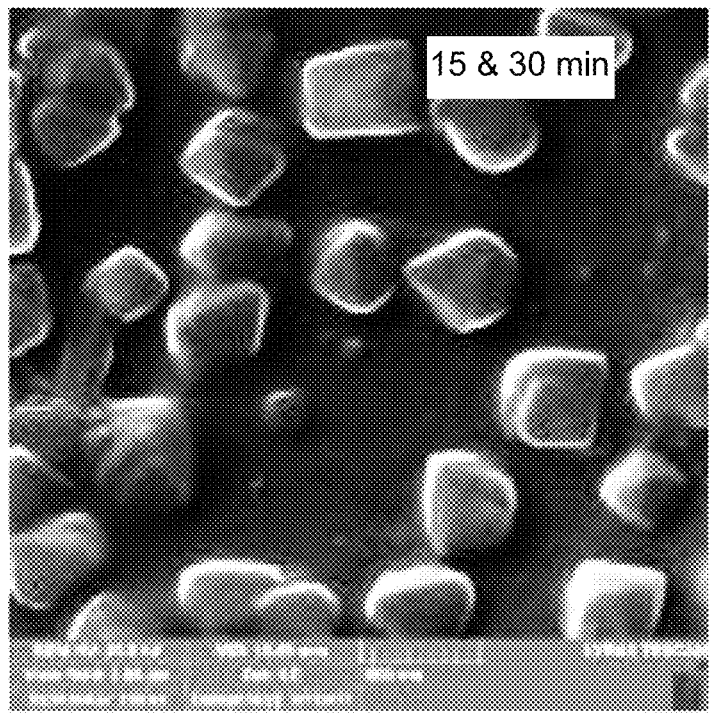
FIG. 7E is a scanning electron micrograph of a surface of a membrane fabricated by 10 cycles of immersion in a solution of Cu(II) for 15 min and in a solution of benzene-1,3,5-tricarboxylate for 30 min.
Figure 7F:
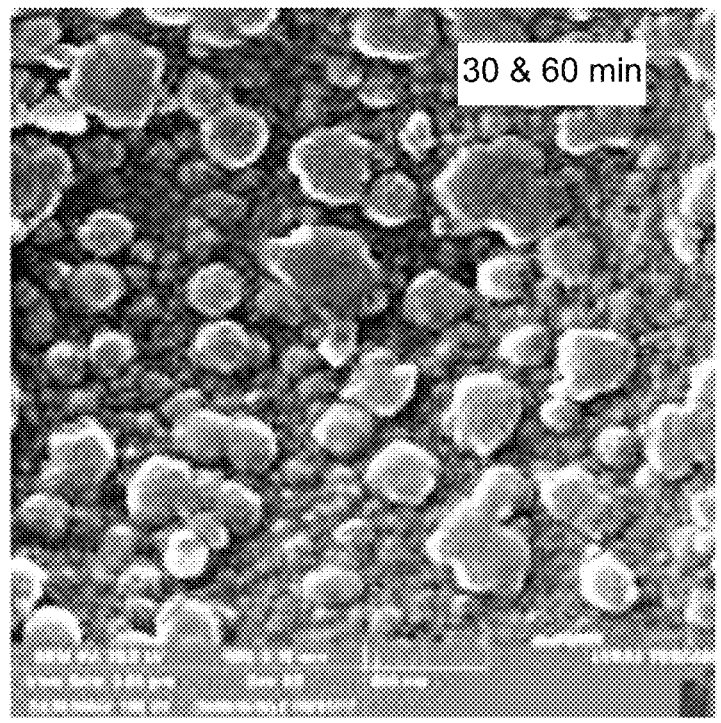
FIG. 7F is a scanning electron micrograph of a surface of a membrane fabricated by 10 cycles of immersion in a solution of Cu(II) for 30 min and in a solution of benzene-1,3,5-tricarboxylate for 60 min.
Figure 8A:
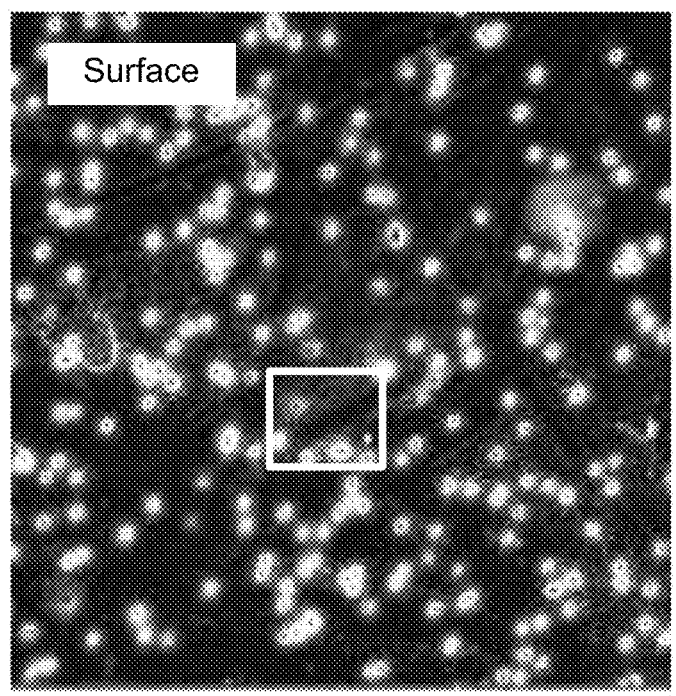
FIG. 8A is a scanning electron micrograph of a surface of a membrane fabricated via 12 cycles of the LPE process.
Figure 8B:
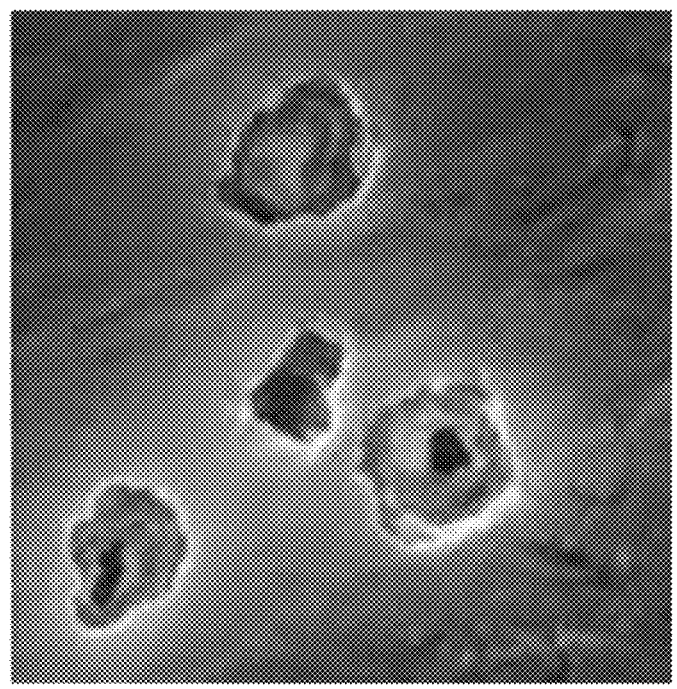
FIG. 8B shows a magnified view of the sample in FIG. 8A.
Figure 8C:
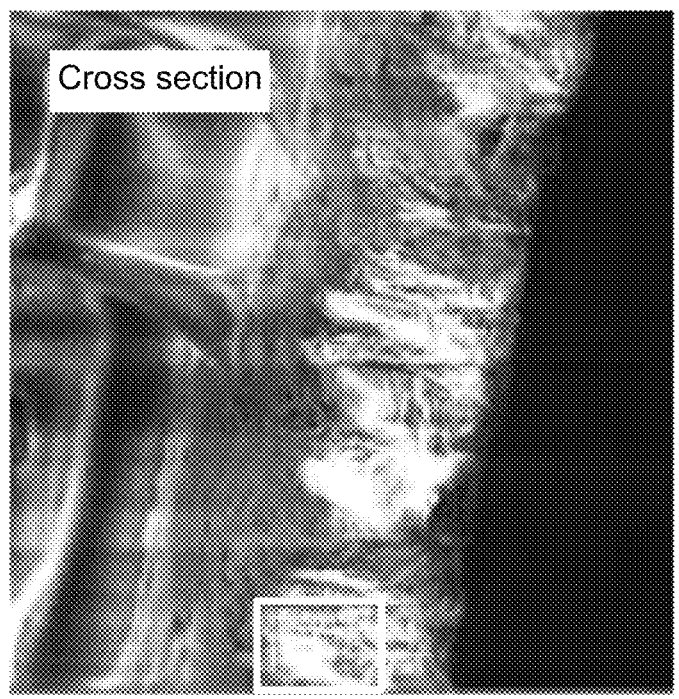
FIG. 8C is a scanning electron micrograph of a cross section of a membrane fabricated via 12 cycles of the LPE process.
Figure 8D:
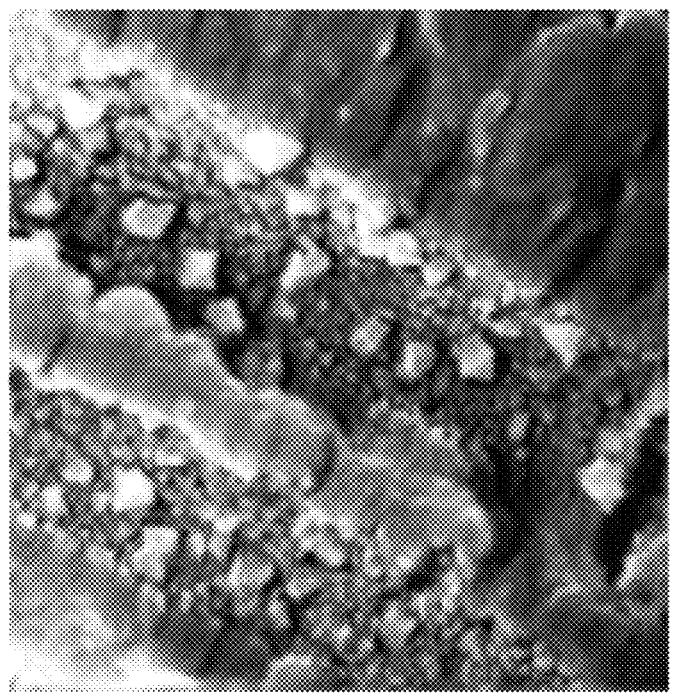
FIG. 8D shows a magnified view of the sample in FIG. 8C.
Figure 9A:
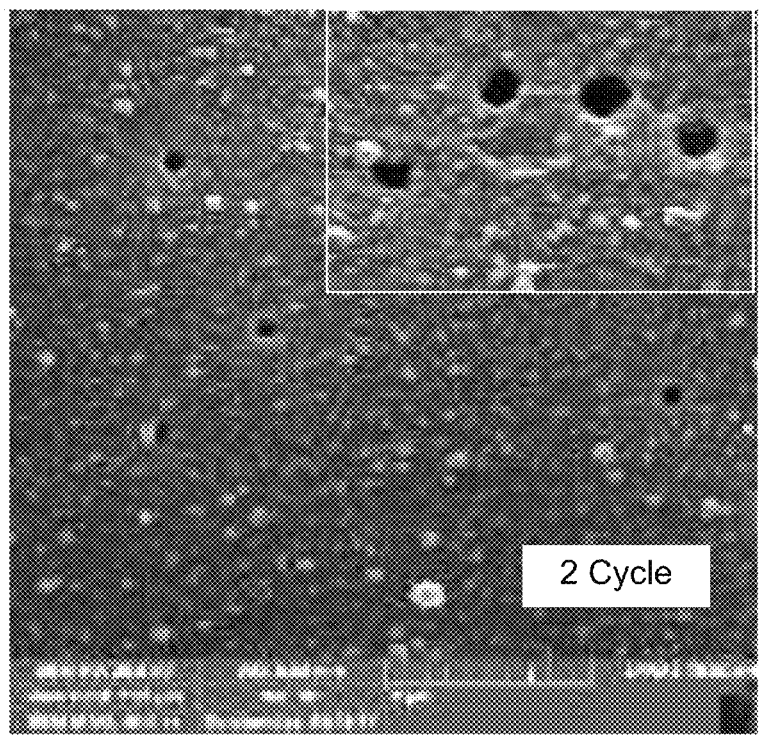
FIG. 9A is a scanning electron micrograph of a surface of a membrane fabricated via 2 cycles of the LPE process.
Figure 9B:
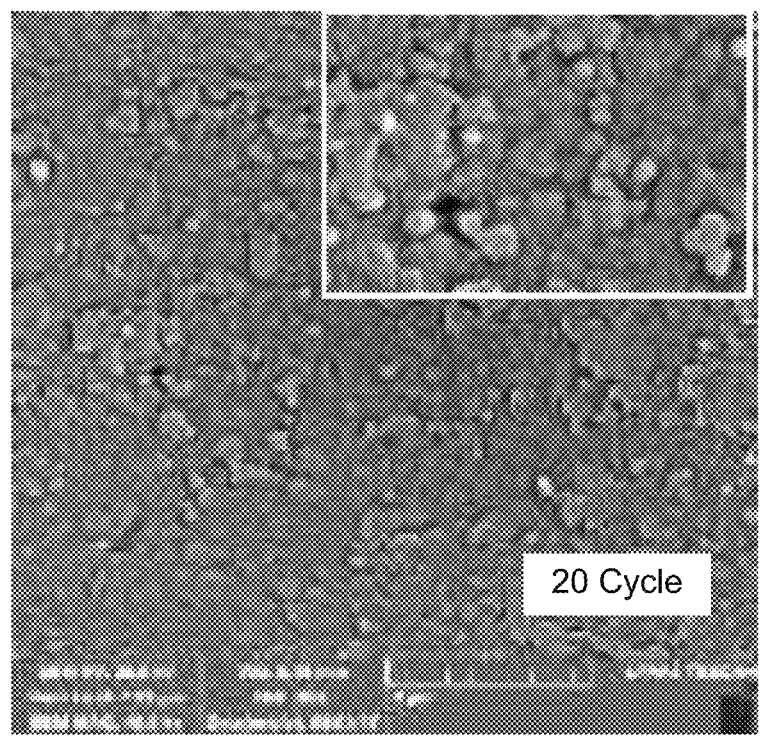
FIG. 9B is a scanning electron micrograph of a surface of a membrane fabricated via 20 cycles of the LPE process.
Figure 9C:
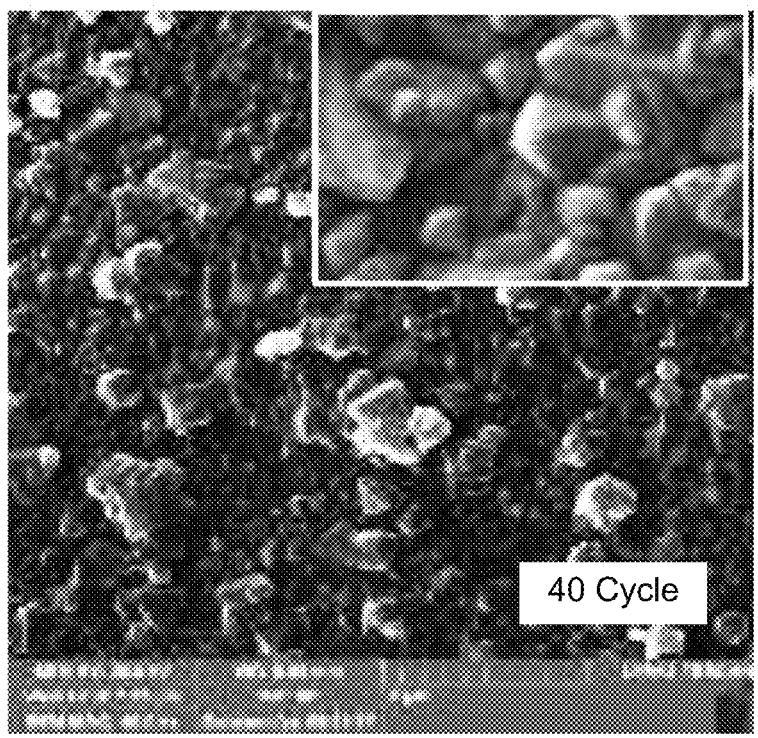
FIG. 9C is a scanning electron micrograph of a surface of a membrane fabricated via 40 cycles of the LPE process.
Figure 9D:
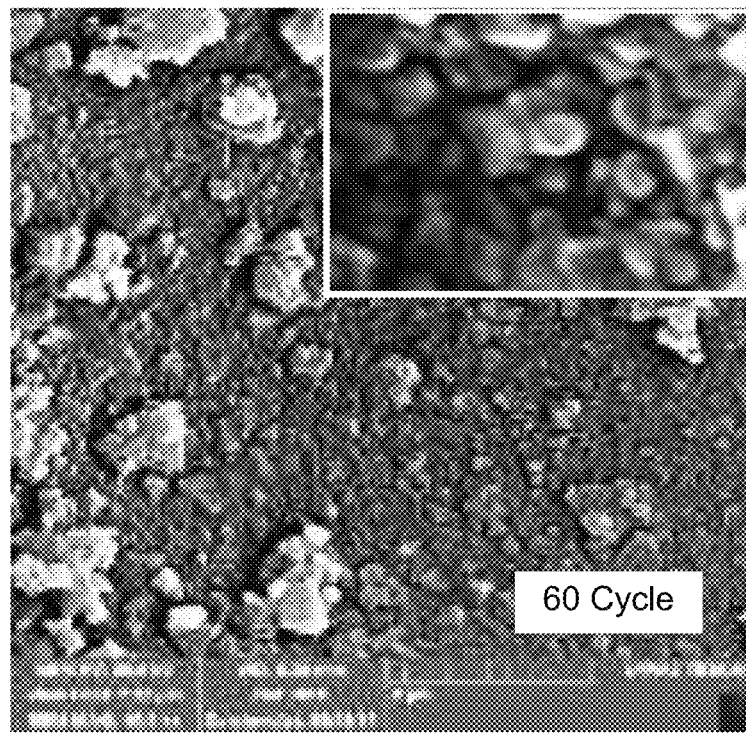
FIG. 9D is a scanning electron micrograph of a surface of a membrane fabricated via 60 cycles of the LPE process.
Figure 9E:
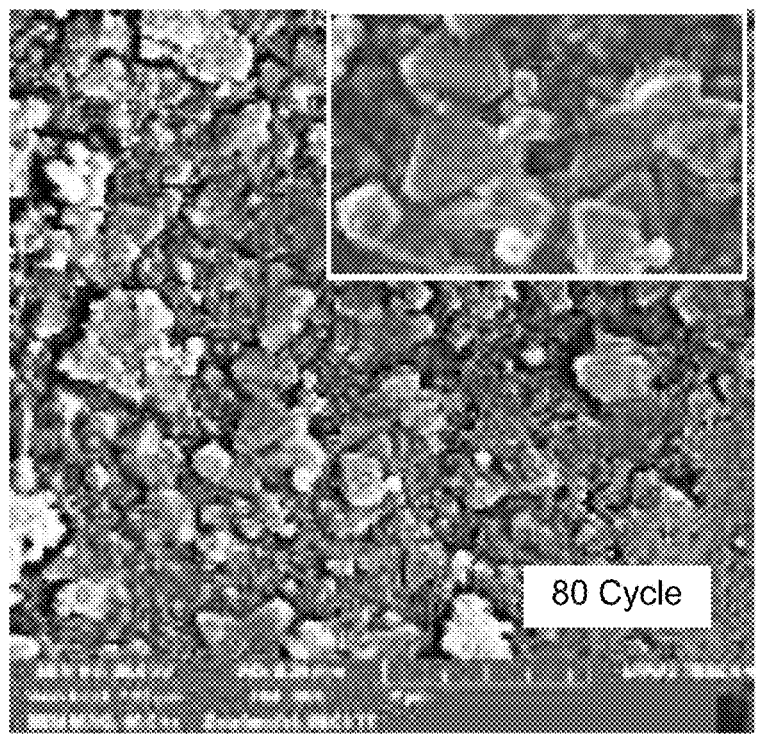
FIG. 9E is a scanning electron micrograph of a surface of a membrane fabricated via 80 cycles of the LPE process.
Figure 9F:
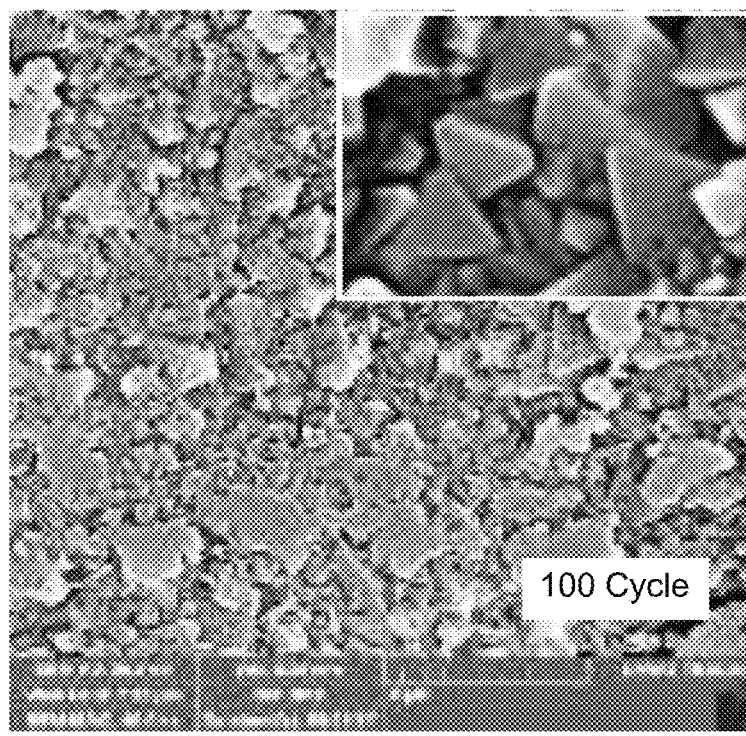
FIG. 9F is a scanning electron micrograph of a surface of a membrane fabricated via 100 cycles of the LPE process.
Figure 10A:
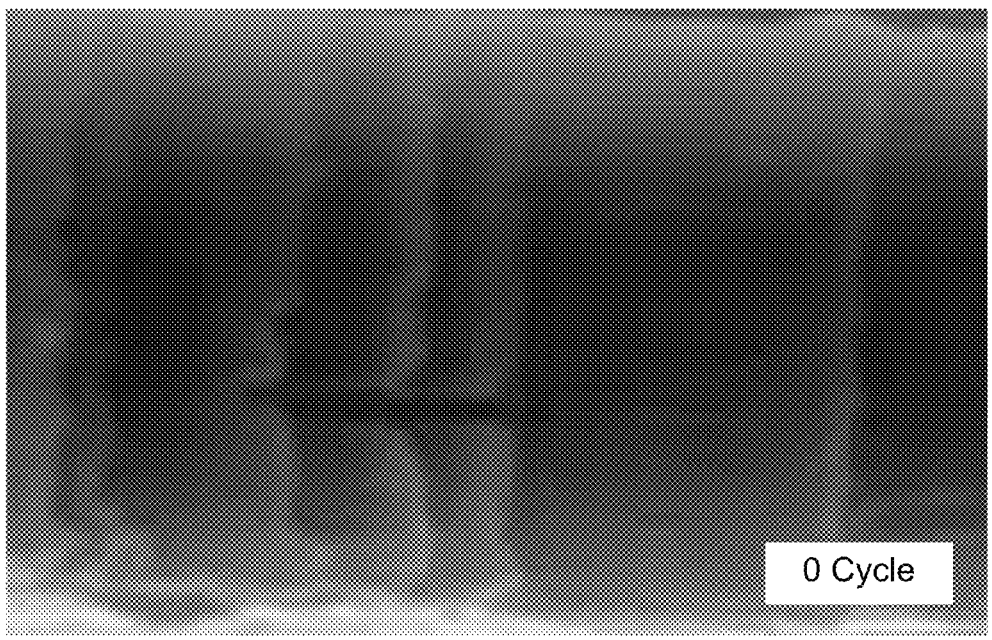
FIG. 10A is a scanning electron micrograph of a cross section of a PET substrate before the LPE process.
Figure 10B:
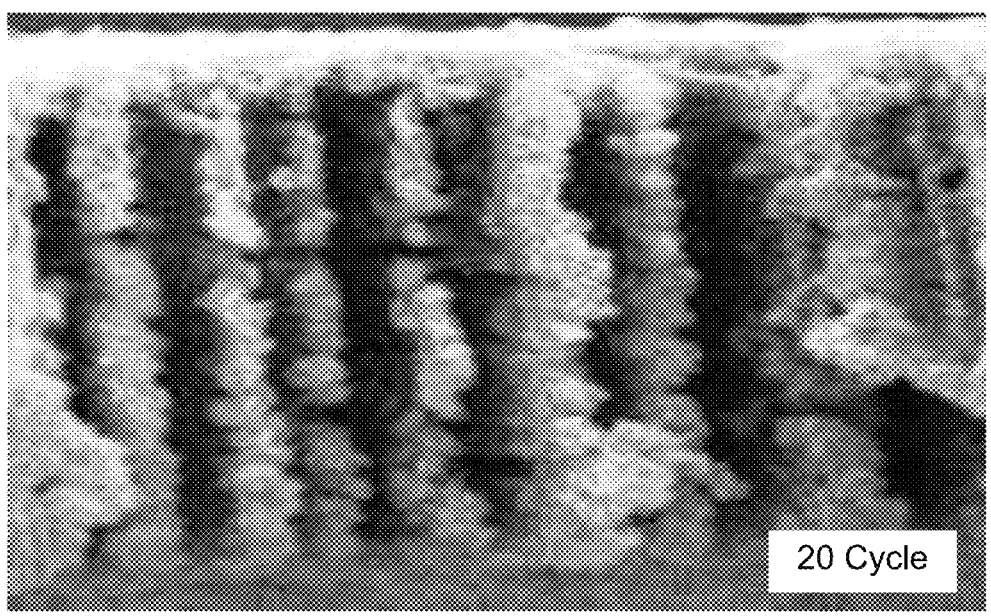
FIG. 10B is a scanning electron micrograph of a cross section of a membrane fabricated via 20 cycles of the LPE process.
Figure 10C:
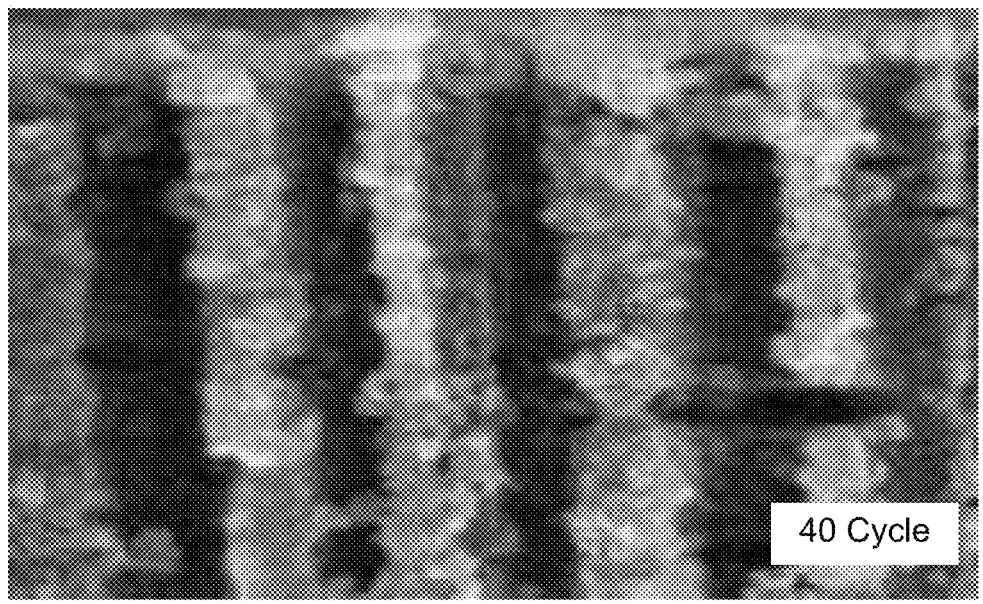
FIG. 10C is a scanning electron micrograph of a cross section of a membrane fabricated via 40 cycles of the LPE process.
Figure 10D:
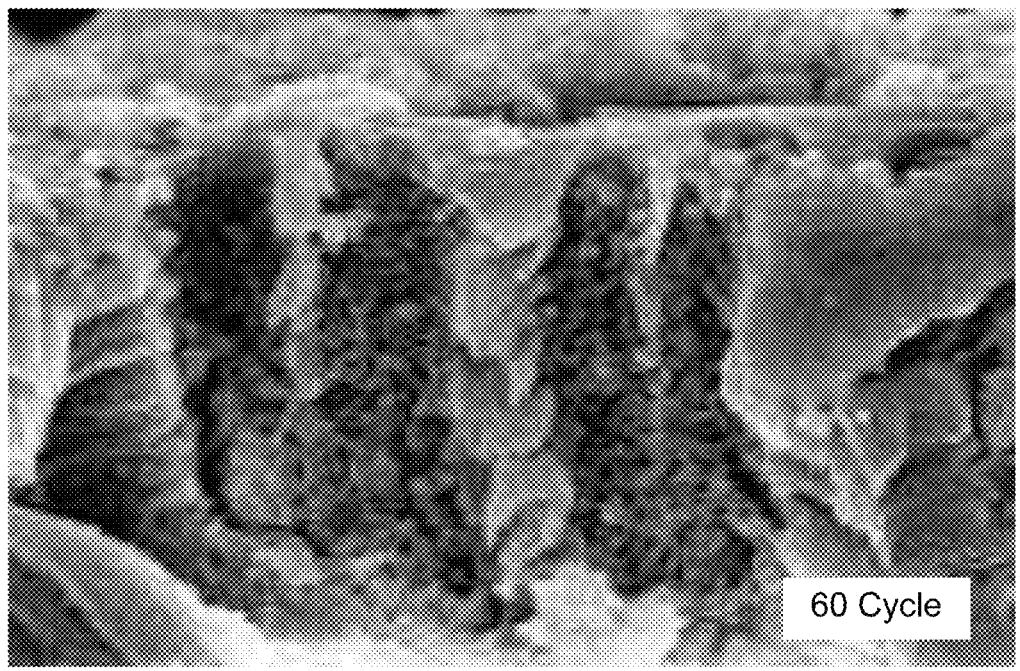
FIG. 10D is a scanning electron micrograph of a cross section of a membrane fabricated via 60 cycles of the LPE process.
Figure 10E:
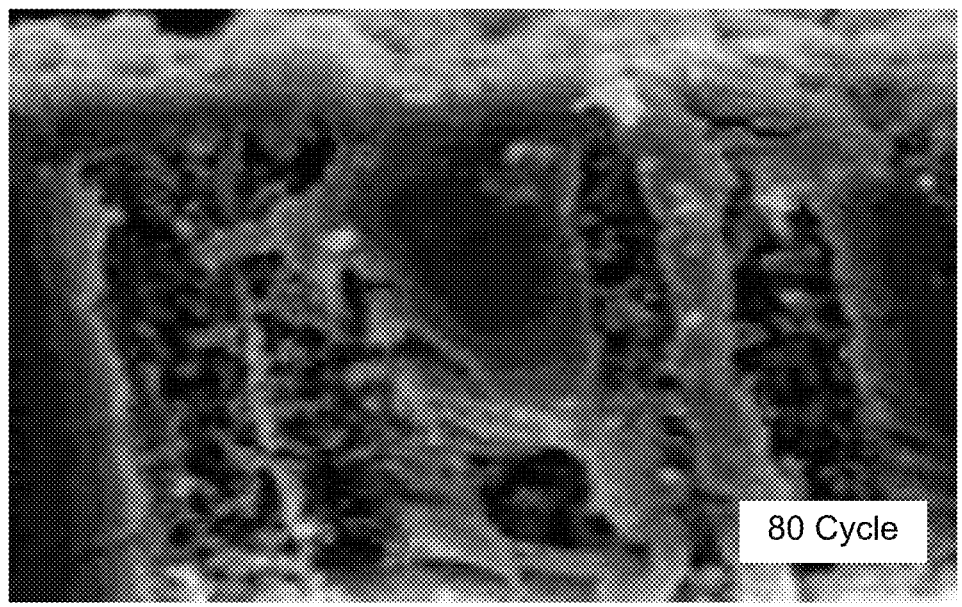
FIG. 10E is a scanning electron micrograph of a cross section of a membrane fabricated via 80 cycles of the LPE process.
Figure 10F:
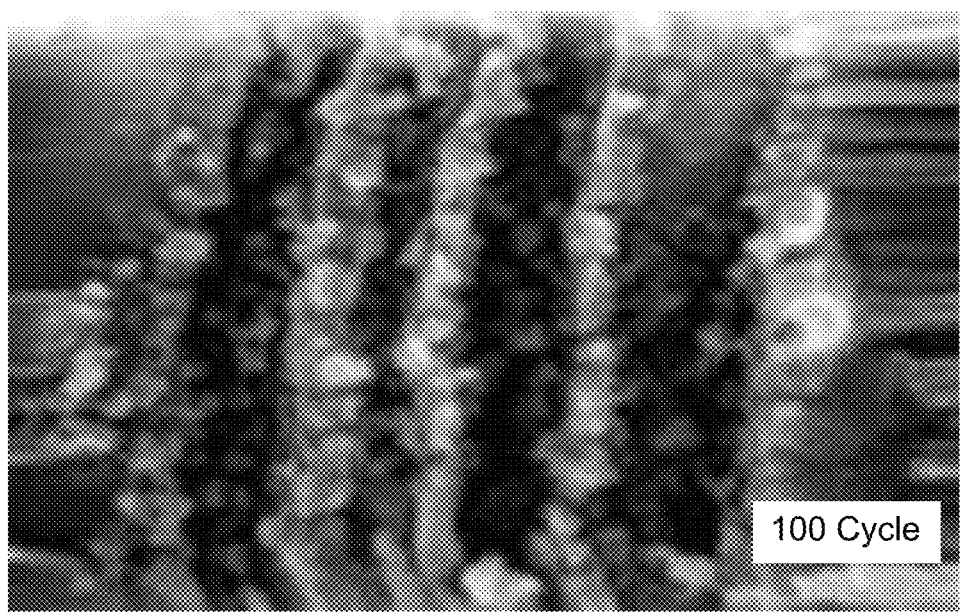
FIG. 10F is a scanning electron micrograph of a cross section of a membrane fabricated via 100 cycles of the LPE process.

HKUST-1 continuous thin film layer was grown on carboxylate functionalized nanoporous polymer (NPP) using liquid phase epitaxy (LPE) approach. A solution of 1 mM copper acetate, $Cu(COOCH_3)_2 \cdot H_2O$, Loba Chemie, 98%, was prepared by dissolving 19.9 mg of $Cu(COOCH_3)_2 \cdot H_2O$ in 100 mL ethanol, and 1 mM linker solution was prepared by dissolving 21.1 mg of the 1,3,5-benezene tricarboxylic acid (BTC, Acros Organics, 98%) in 100 mL ethanol. In a typical procedure, NPP was activated by washing with de-ionized water and ethanol 3 times at RT (22° C.). The activated NPP was attached to the tip of the glass slide using plastic tape. The substrate was then mounted in the sample holder of the robot (Silar Coating System, model HO-TH-03). The robot was programmed to carry out repeating cycles of HKUST-1 growth at room temperature on the NPP according to the following sequence (see FIG. 4): immersion of the NPP in the metal solution for 5 min followed by drying in air for 3 min, this followed by 2 times consecutive washings in fresh ethanol for 3 min. The resulting NPP with the metal attached (NPP-M) was immersed in the linker solution for 10 min followed by drying for 3 min and the resulting NPP-M with the linker attached (NPP-ML) was washed again with fresh ethanol for 2 times (3 min each) and dried in air for 3 min. This process was repeated according to the assigned cycle number.

PET polymer having 12 micron long and 300 nm wide ionic nanopore channels with —COOH groups were used to grow a robust, well-intergrown HKUST-1 coated flexible membrane via the LPE approach. The characteristic membrane is the first MOF flexible membrane having ionic nanopores with no defects.

Example 3

Characterization of LPE Growth of HKUST-1 on Nanoporous Polymer

The morphology of the ionic nanoporous polymer and $Cu_3(BTC)_2$ coated membrane was evaluated by optical microscopy and a field-emission scanning electron microscope (FE-SEM: JEOS JSM 6700F). X-ray diffraction (XRD) patterns of the MOF membrane was obtained on a Siemens D5005 diffractometer with Cu-Kα radiation (λ=1.5418 Å). A soap-film flow meter was used to measure the flux of the gas, and the gas that penetrated the membrane was analyzed by gas chromatograph (HP6890).

As shown in FIGS. 6A-6F, it was found that lower concentrations (0.5 and 1.0 mmol) of metal ion and organic linker favor continuous HKUST-1 growth. Increases in concentration produced bigger particles and decreased growth continuity. At a maximum concentration tested of 2.5 mmol, a distortion in the crystal structure was observed.

As shown in FIGS. 7A-7F, small crystal growth of the HKUST-1 layer was observed in shorter time periods of 2 and 4 min in metal and linker solutions, respectively. The sample prepared with 5 and 10 min was not much different in crystal growth except a small increase in crystal size. The sample prepared with 10 and 20 min showed good uniform growth, however many large particles were seen along with small crystal particles. Crystal growth and agglomeration of particle starts started to appear in samples prepared with even longer time.

According to FIGS. 8A-8D, the HKUST-1 MOFs particles can be seen inside the pores and the pores were filled by MOFs.

As shown in FIGS. 9A-9F, the HKUST-1 particles covered the pores and surface of the substrate in a successive fashion. The number of preferred oriented HKUST-1 crystals increased as the number of cycles increased. This reveals the orientation of —COOH groups in the pores and on the surface of the polymer substrate.

As shown in FIGS. 10A-10F, the surface growth the particles of HKUST could be seen consistent with the growth in the nanopore channels of substrate. After 60 cycles the pores started to get filled, while after 80 and 100 cycles the pores were even more obviously filled. The distortion and opening of the pores was caused by sample preparation (e.g. tearing) and by the high voltage (20 kv) of the FESEM beam.

Figure 11A:
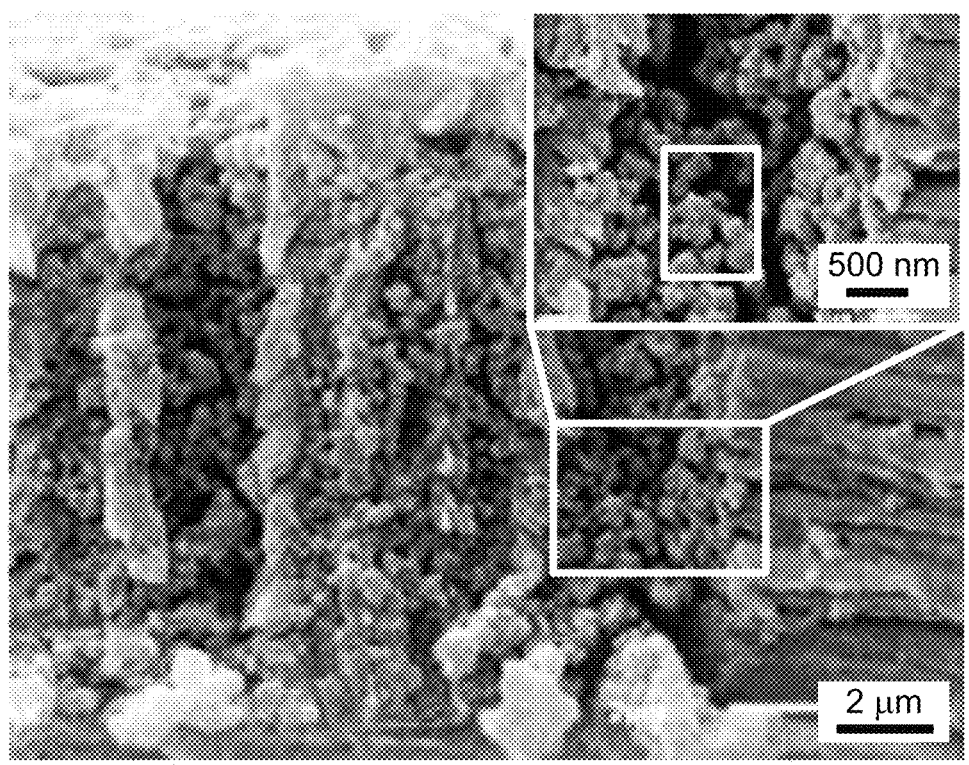
FIG. 11A is a scanning electron micrograph of a cross section of membrane fabricated via 80 cycles of the LPE process.
Figure 11B:
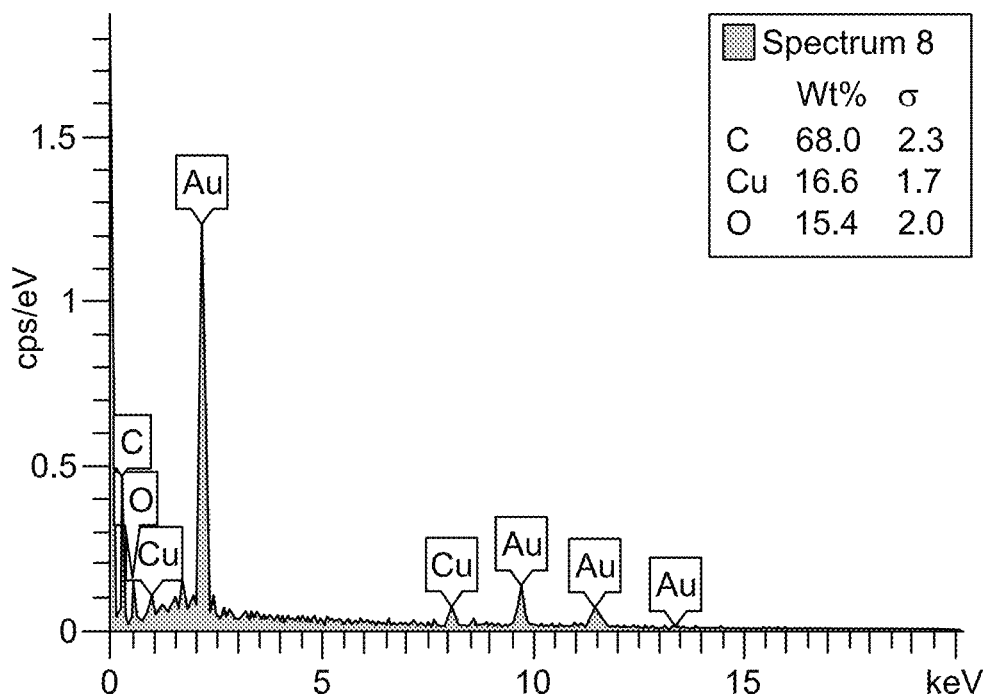
FIG. 11B is an energy dispersive X-ray spectroscopy (EDX) spectrum of the sample in FIG. 11A.

According to FIG. 11A, the HKUST-1 particles were shown in high magnification. The crystal structure and EDX results in FIG. 11B confirmed the growth of HKUST-1 in NPP.

Figure 12A:
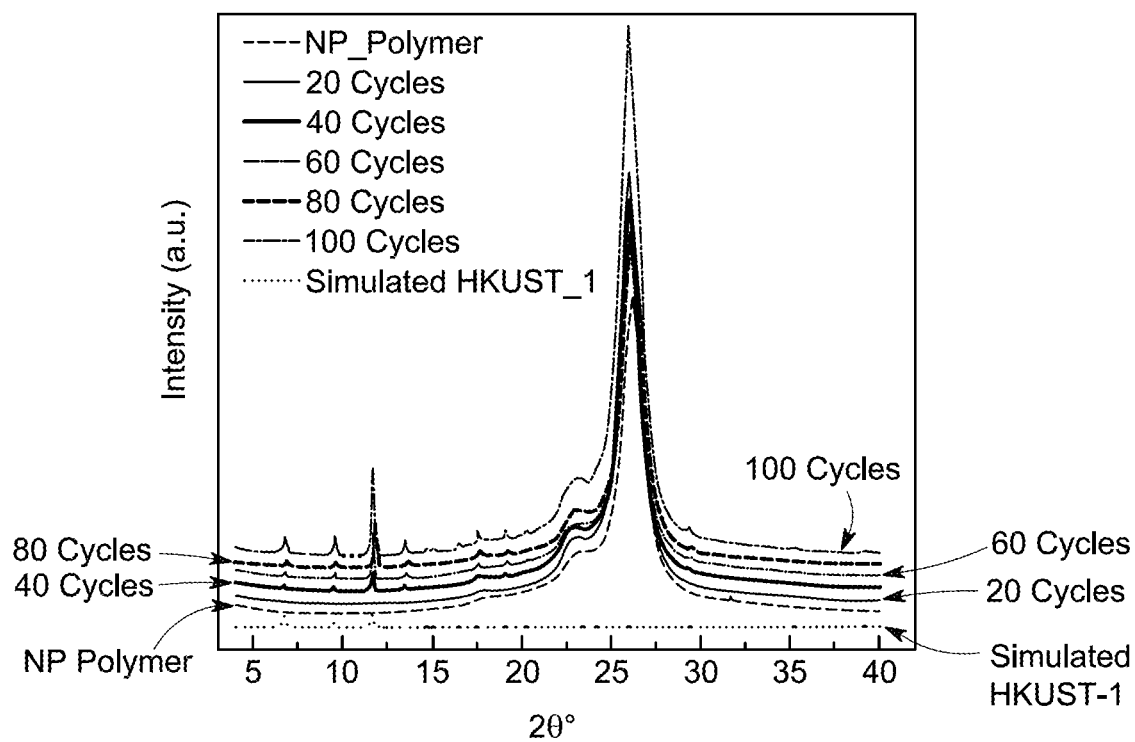
FIG. 12A is an overlay of powder X-ray diffraction (PXRD) patterns of a PET substrate, membranes fabricated via various (20, 40, 60, 80, 100) cycles of the LPE process and a simulated PXRD pattern of HKUST-1.
Figure 12B:
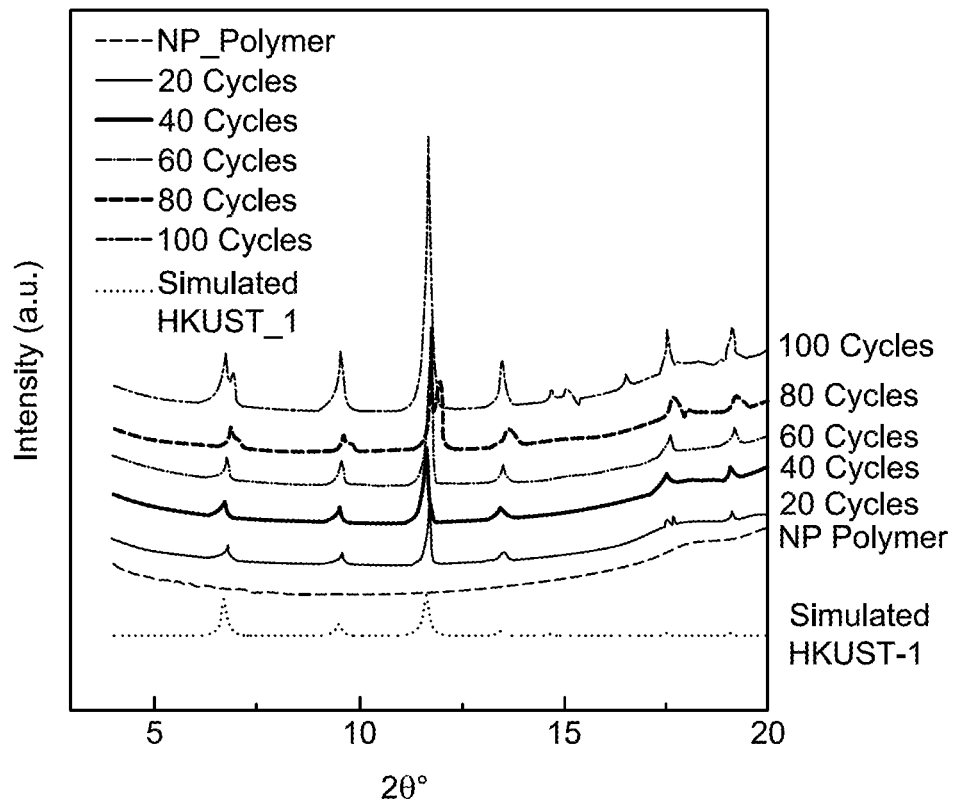
FIG. 12B is an expanded view of the overlay in FIG. 12A between 3 to 20 degrees 2-theta.

According to FIGS. 12A and 12B, the successive growth of HKUST-1 on NPP was demonstrated by their experimental XRD patterns in comparison to the bare NNP.

Figure 13A:
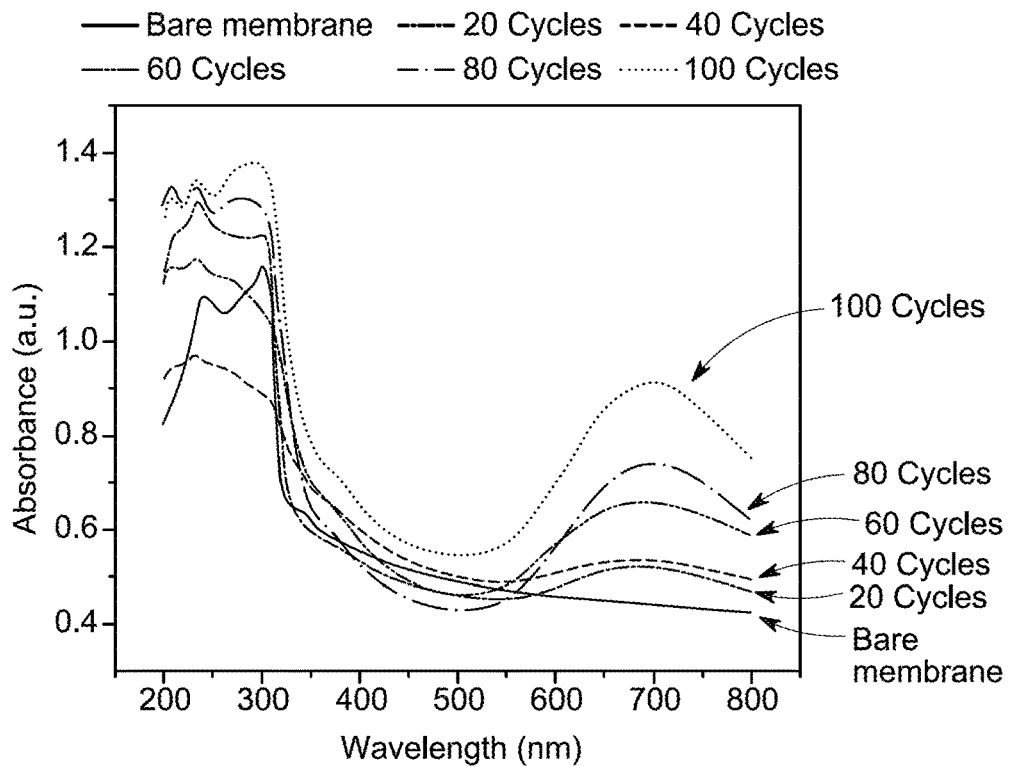
FIG. 13A is an overlay of ultraviolet-visible (UV-vis) absorbance spectra of a PET substrate and membranes fabricated via various (20, 40, 60, 80, 100) cycles of the LPE process.
Figure 13B:
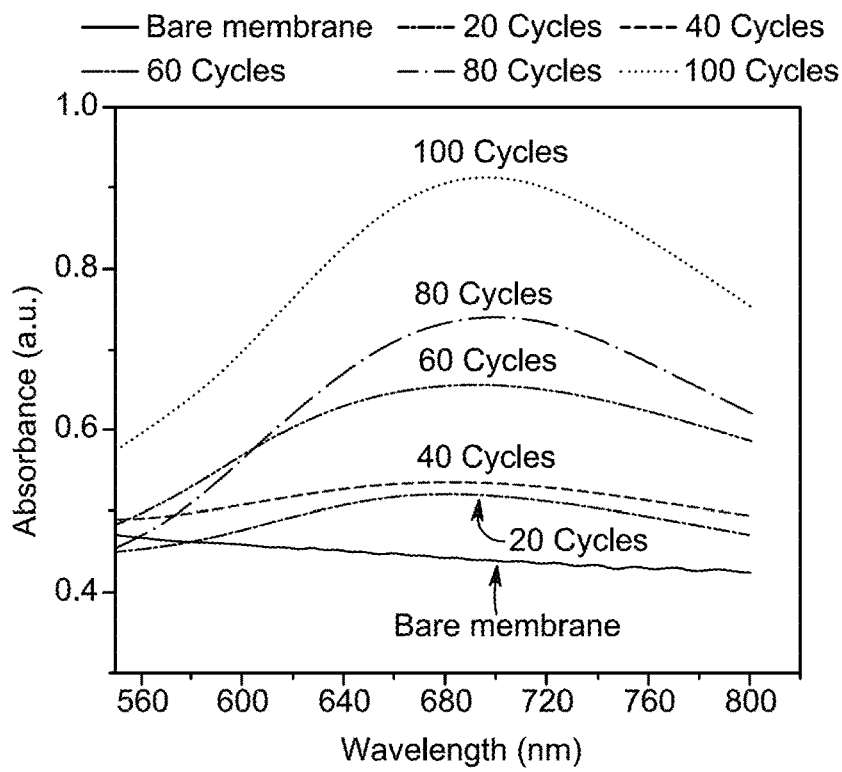
FIG. 13B is an expanded view of the overlay in FIG. 13A from 550 nm to 800 nm.

As shown in FIGS. 13A and 13B, it was revealed that pure NPP showed no absorption compared to the HKUST-1/NPP. As the growth thickness increased, the absorption band increased.

As shown in FIGS. 15A-15H, the strong adhesion of the MOF layer to the NPP was tested after preparation of the flexible MOF membrane. In this analysis four pieces of HKUST-NPP membrane (after 100 cycles growth) were soaked for 1 h in toluene and then sonicated for 5, 10, 60, and 300 seconds. The membranes then separated, washed with ethanol three times and examined by SEM. The physical appearance and FESEM analysis revealed that the MOF material was strongly bonded to the NPP substrate. Such a strong bonding between the small particles of HKUST to the polymer substrate might be the reason for absence of defects during rolling, which suggests a highly anchored, continuous and flexible MOF membrane.

Figure 16A:
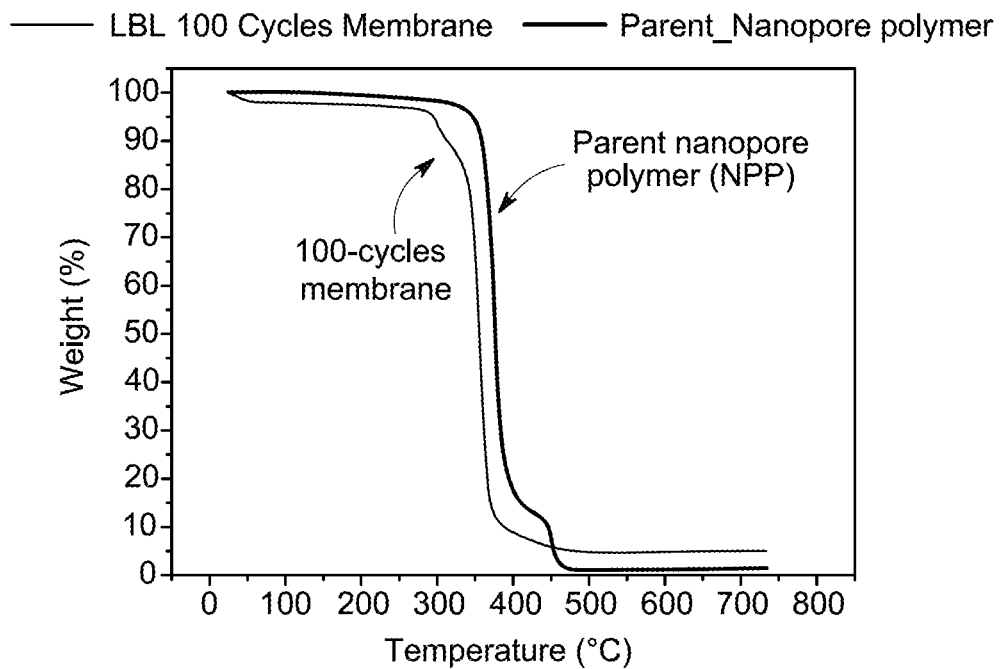
FIG. 16A is an overlay of thermogravimetric curves of a PET substrate and a membrane fabricated via 100 cycles of the LPE process.
Figure 16B:
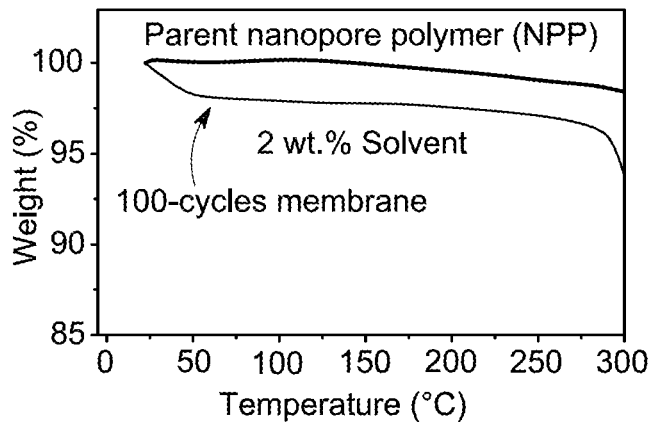
FIG. 16B is an expanded view of the overlay in FIG. 16A between 0-300° C.
Figure 16C:
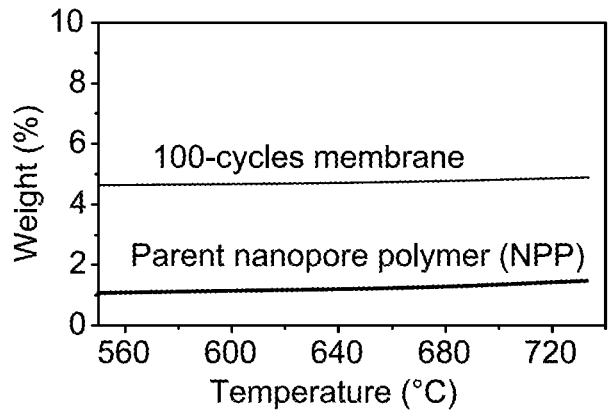
FIG. 16C is an expanded view of the overlay in FIG. 16A between 550-740° C.

As shown in FIGS. 16A-16C, the PET NPP polymer showed thermal stability at up to 400° C. HKUST-1/NPP membrane started to show weight loss at 100° C. which was due to the adsorbed moisture and ethanol during layer by layer (LBL) process. At 300° C. the degree of weight loss was high which reflected the thermal stability of MOF/NPP. The residue of the parent NPP was zero, while the residue of the HKUST-NPP was around 5% which reflected the formation of CuO as a result of oxidation of HKUST-1 in air.

Figure 17A:
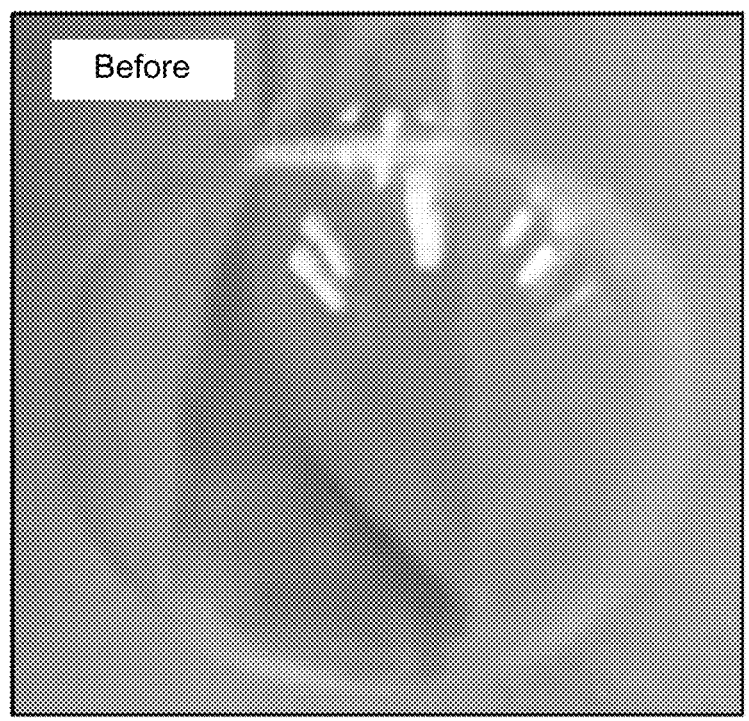
FIG. 17A is a photo of a membrane before activation.
Figure 17B:
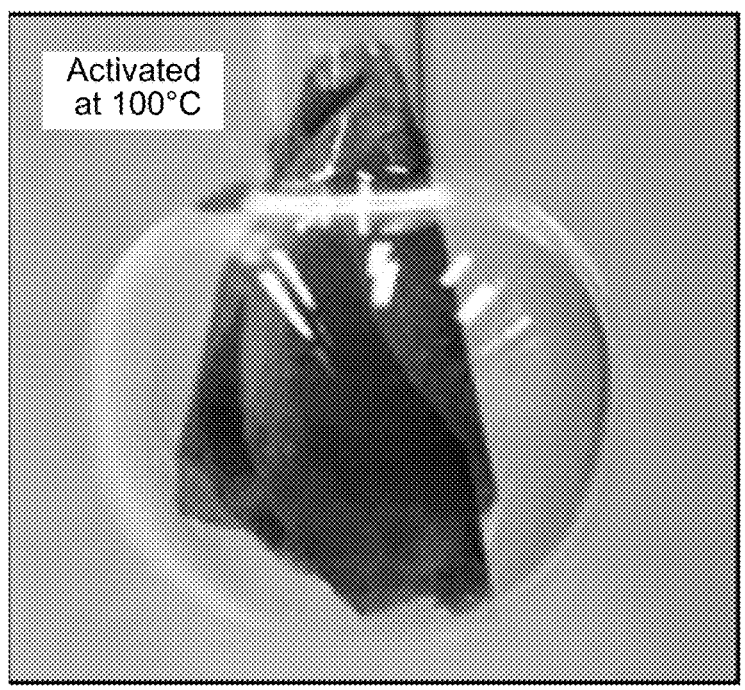
FIG. 17B is a photo of the membrane in FIG. 17A after activation at 100° C.
Figure 18:
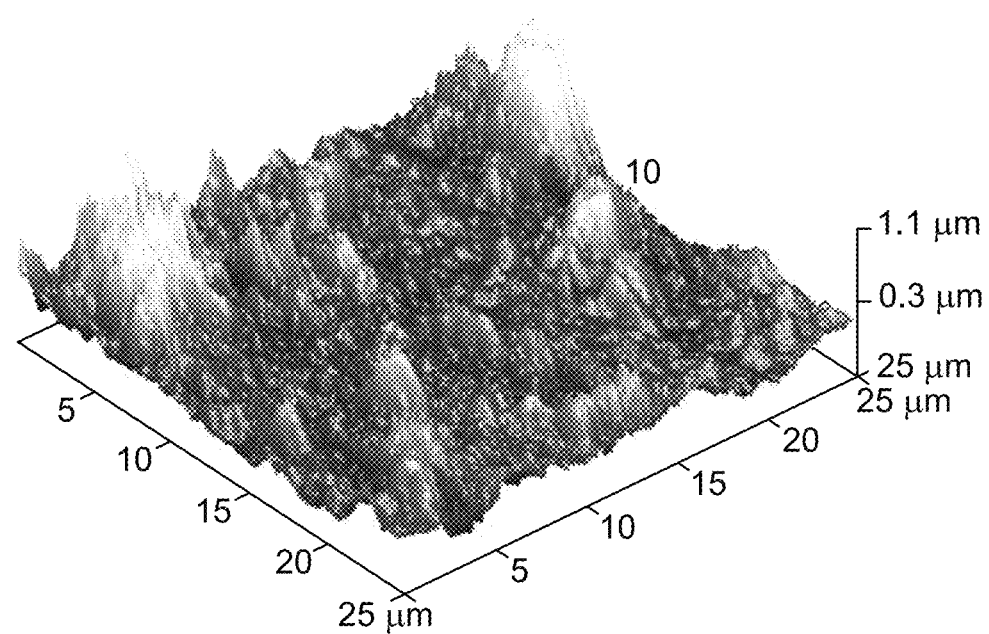
FIG. 18 is an atomic force microscopy (AFM) analysis of a membrane fabricated via 100 cycles of the LPE process.

As shown in FIGS. 17A-17B, the color of the membranes changed from green to blue which is consistent with literature reported properties of HKUST-1 under temperature change.

Figure 19:
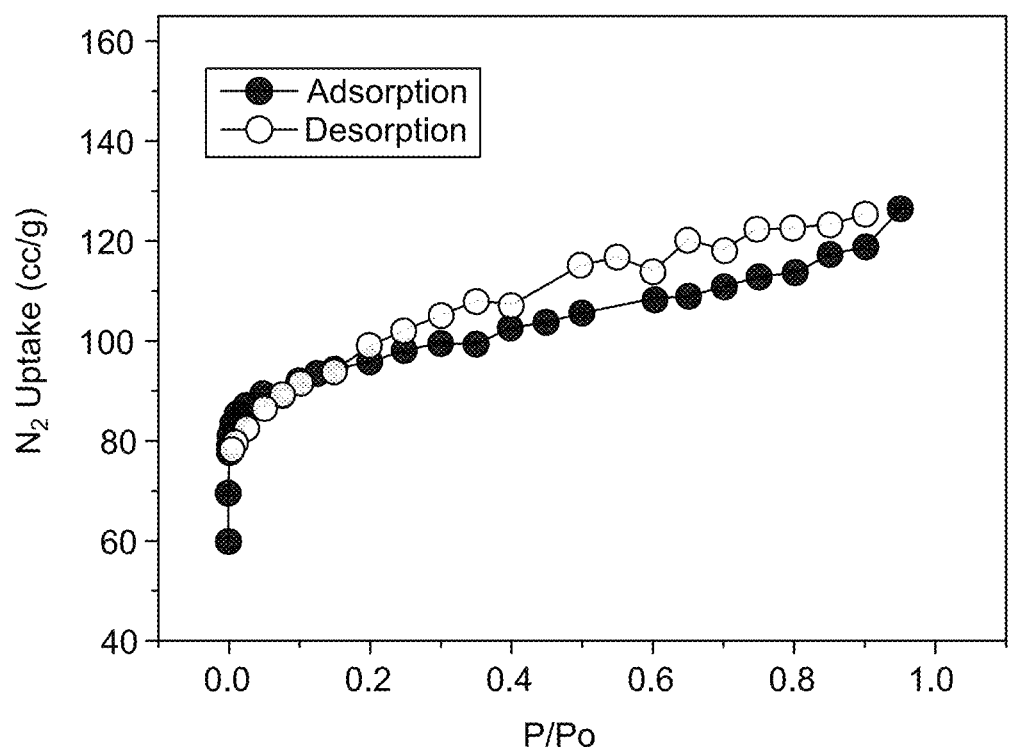
FIG. 19 is a graph illustrating $N_2$ adsorption/desorption isotherms of a membrane fabricated via 100 cycles of the LPE process at 77 K.
Figure 20:
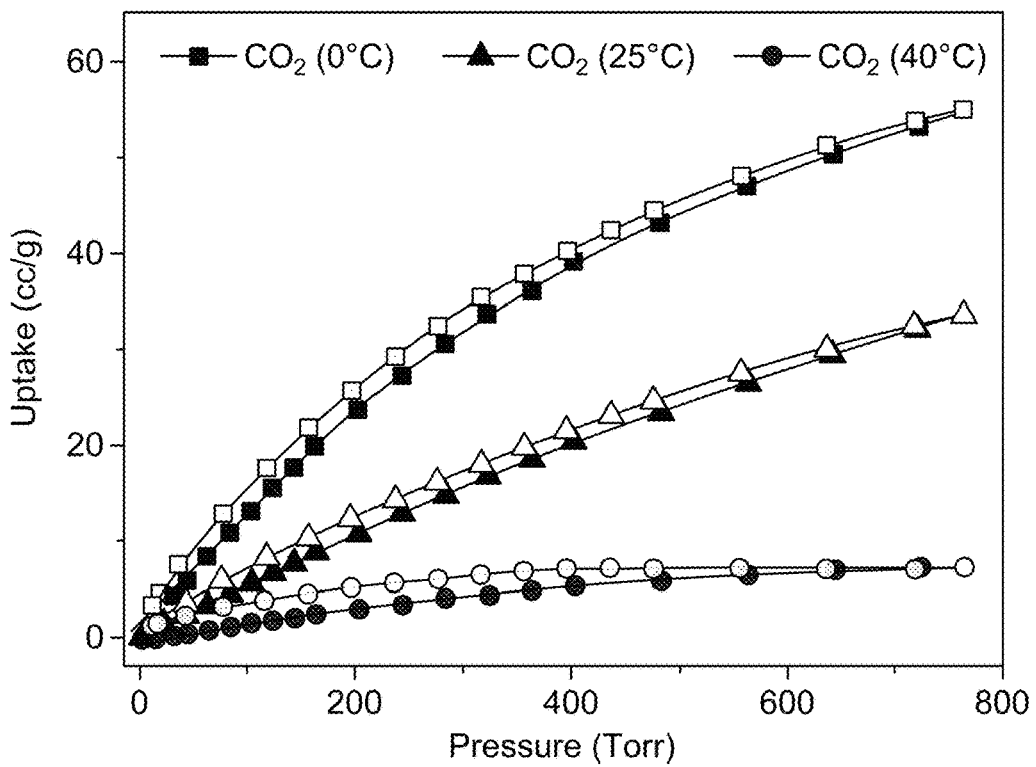
FIG. 20 is an overlay of $CO_2$ adsorption/desorption isotherms of a membrane at 273 K, 298 K, and 308 K.
Figure 21:
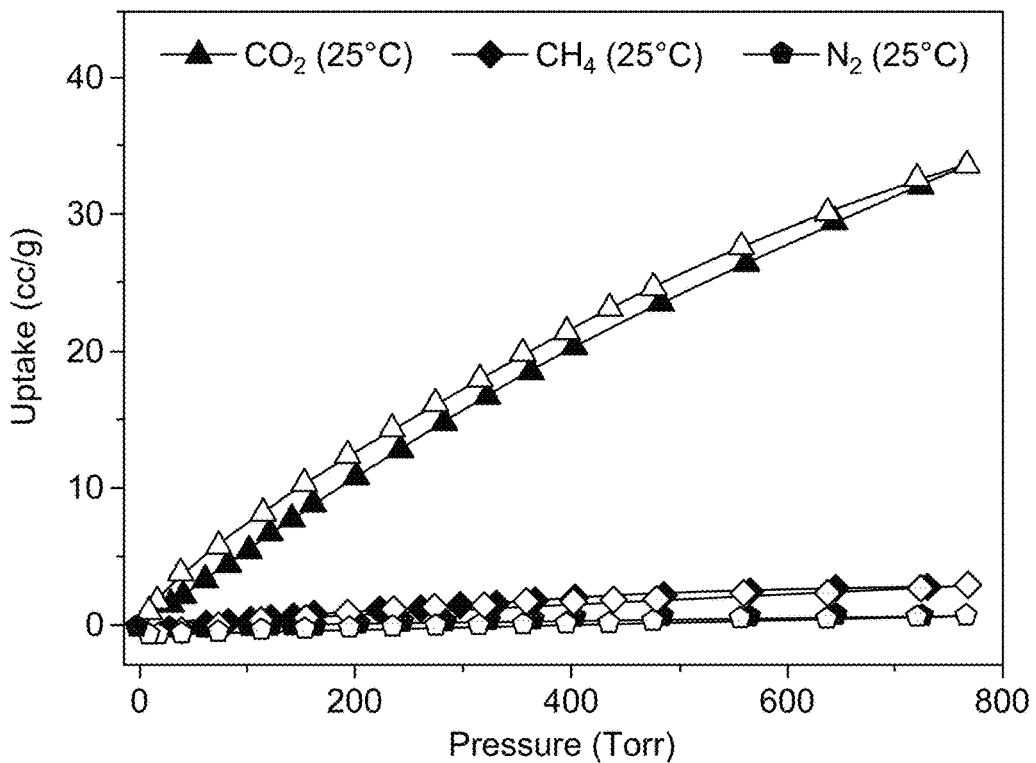
FIG. 21 is an overlay of $CO_2$, $CH_4$, and $N_2$ adsorption/desorption isotherms of a membrane at 298 K.
Figure 22:
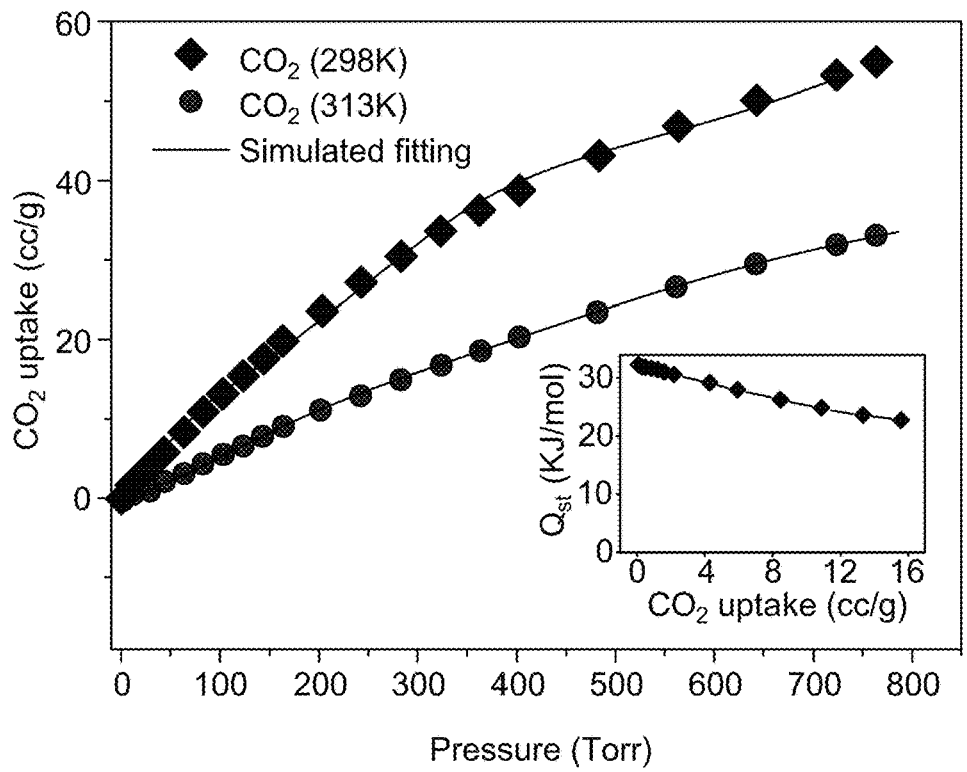
FIG. 22 is a graph illustrating the calculation of isosteric heat of adsorption ($Q_{st}$).

As shown in FIG. 19, the BET isotherm was measured at liquid nitrogen temperature (77 K). Filled and open symbols represent adsorption and desorption branches, respectively. The connecting curves are guides for the eye. The resulting isotherm of type II with a BET surface area of 220 $m^2 \cdot g^{-1}$ revealed the porosity of HKUST-1 in NPP.

Example 4

Nano Indentation of Membranes

In order to ensure the physical stability and flexibility, the investigation of nano-mechanical properties of membranes were characterized by nano-indentation technique.

Example 5

Gas Separation Analysis

Figure 23:
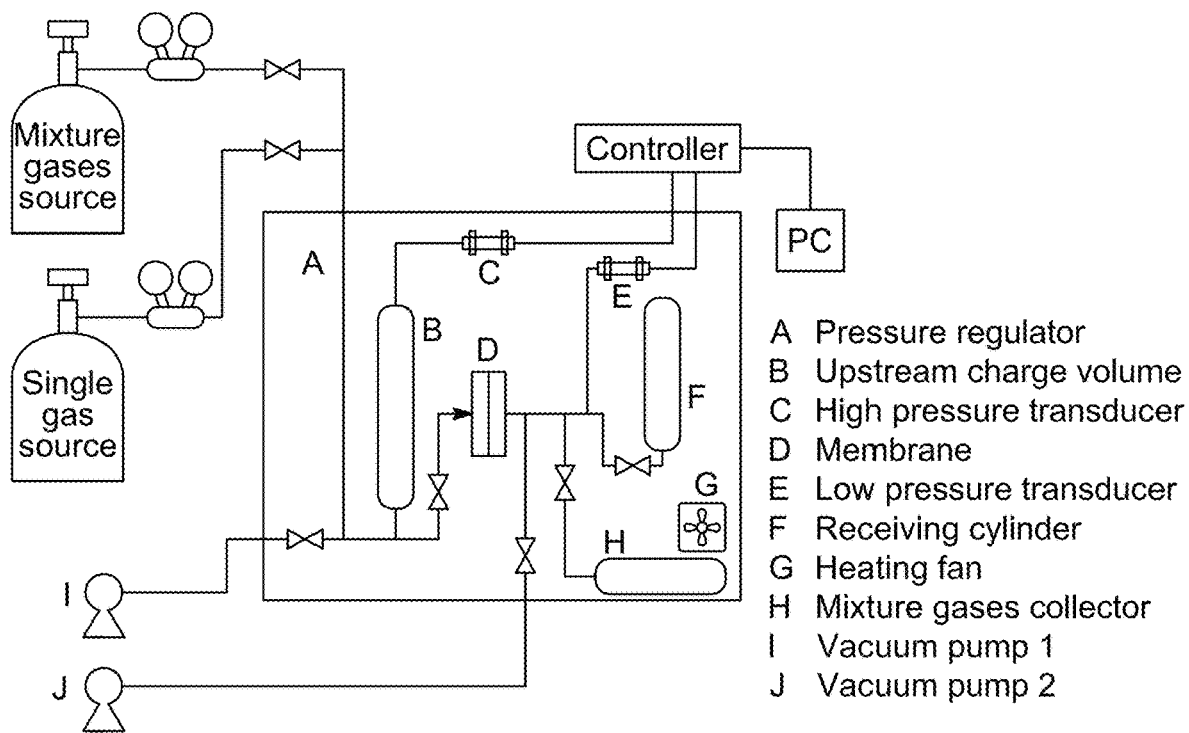
FIG. 23 is a schematic illustration of a constant-volume/variable-pressure (CV/VP) gas permeation setup.
Figure 24:
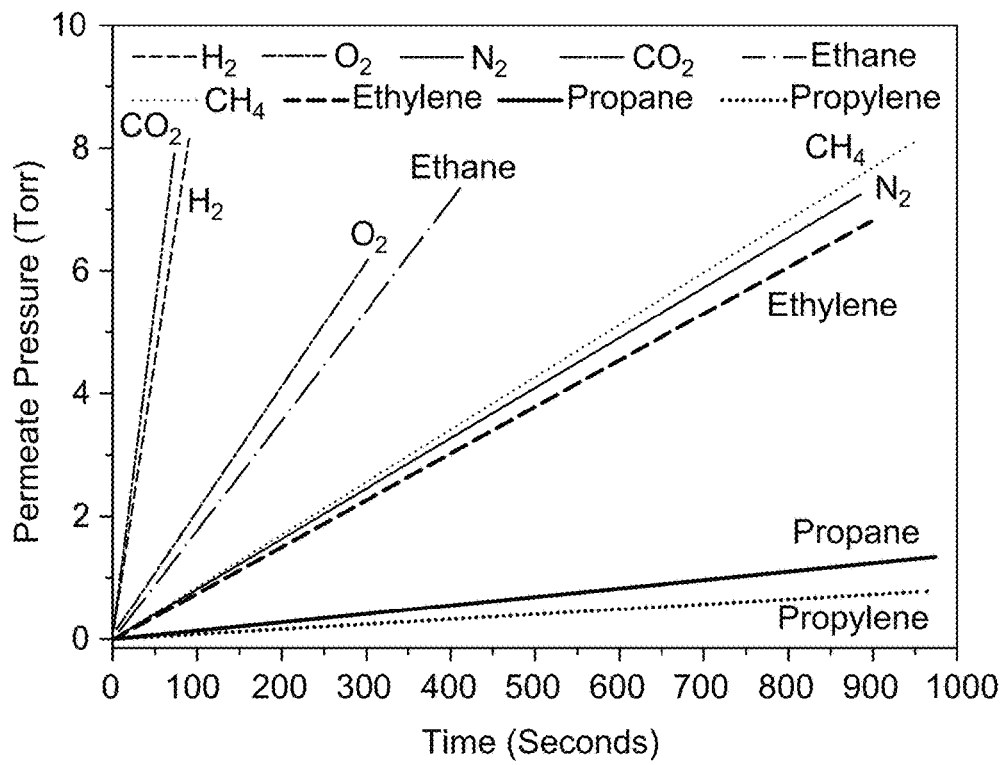
FIG. 24 is an overlay of single gases ($H_2$, $O_2$, $N_2$, $CO_2$, $CH_4$, $C_2H_6$, $C_2H_4$, $C_3H_8$, $C_3H_6$) permeation against time for a membrane at 308 K and 1.0 bar.
Figure 25:
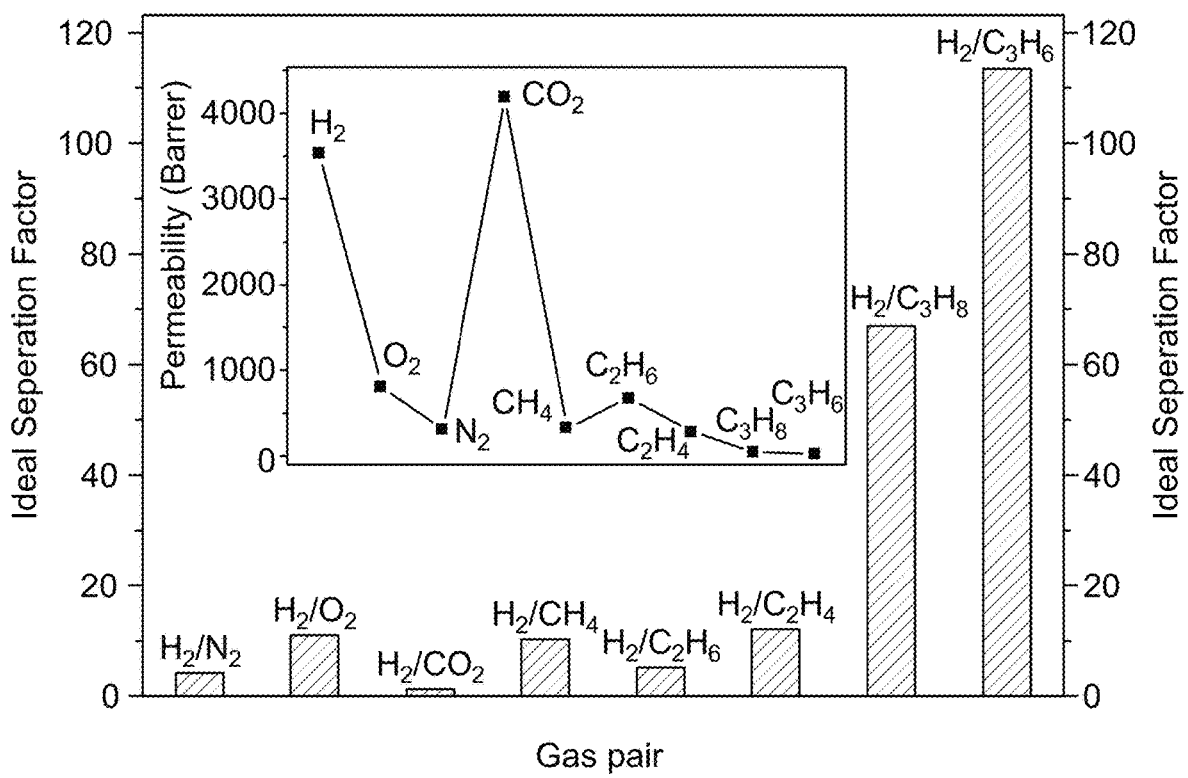
FIG. 25 is a bar graph illustrating ideal separation factors of $H_2$ against different gases ($O_2$, $N_2$, $CO_2$, $CH_4$, $C_2H_6$, $C_2H_4$, $C_3H_8$, $C_3H_6$) for a membrane at 308 K and 1.0 bar.
Figure 26:
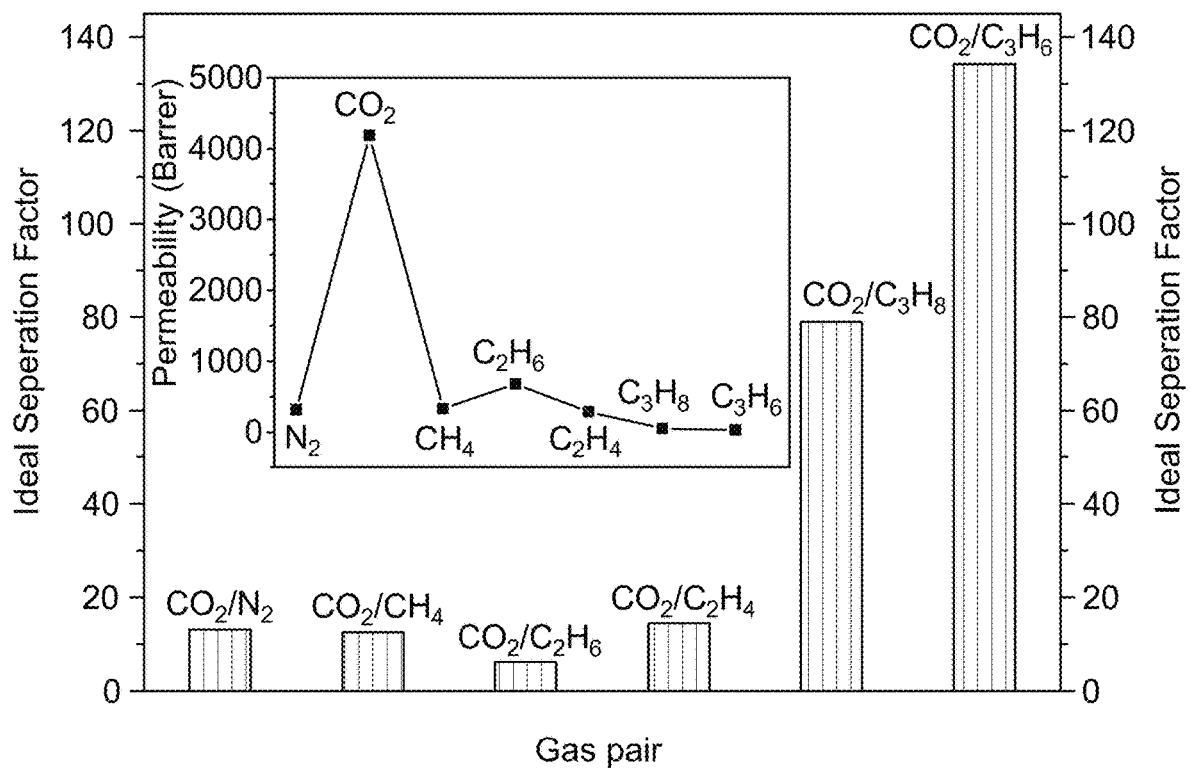
FIG. 26 is a bar graph illustrating ideal separation factors of $CO_2$ against different gases ($N_2$, $CH_4$, $C_2H_6$, $C_2H_4$, $C_3H_8$, $C_3H_6$) for a membrane at 308 K and 1.0 bar.
Figure 27:
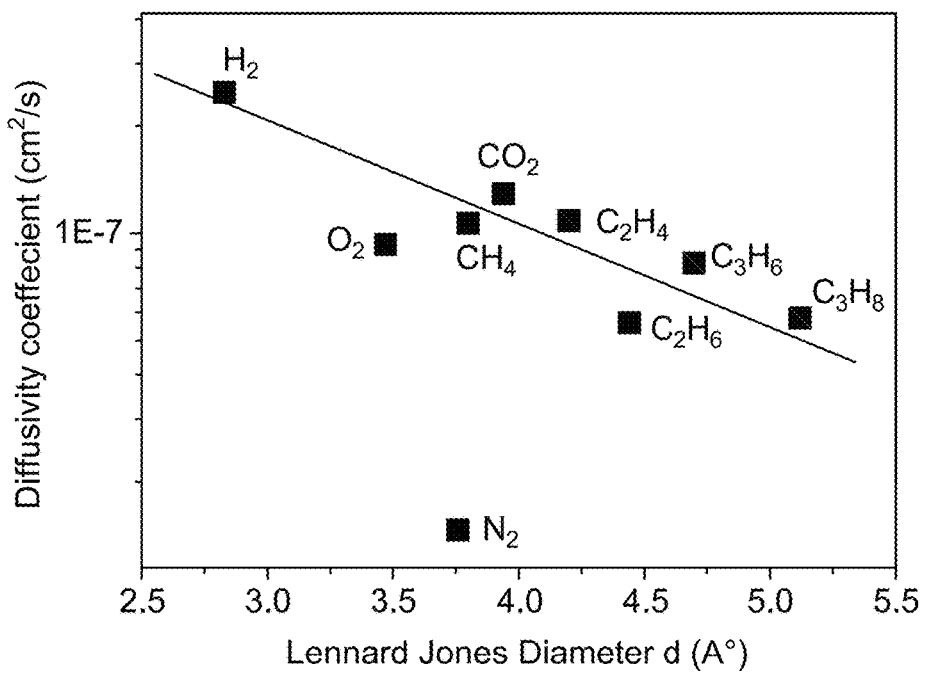
FIG. 27 is a graph illustrating the relationship between the diffusion coefficients of single gases ($H_2$, $O_2$, $N_2$, $CO_2$, $CH_4$, $C_2H_6$, $C_2H_4$, $C_3H_8$, $C_3H_6$) for a membrane at 308 K and the Lennard-Jones diameter of the respective gases.
Figure 28:
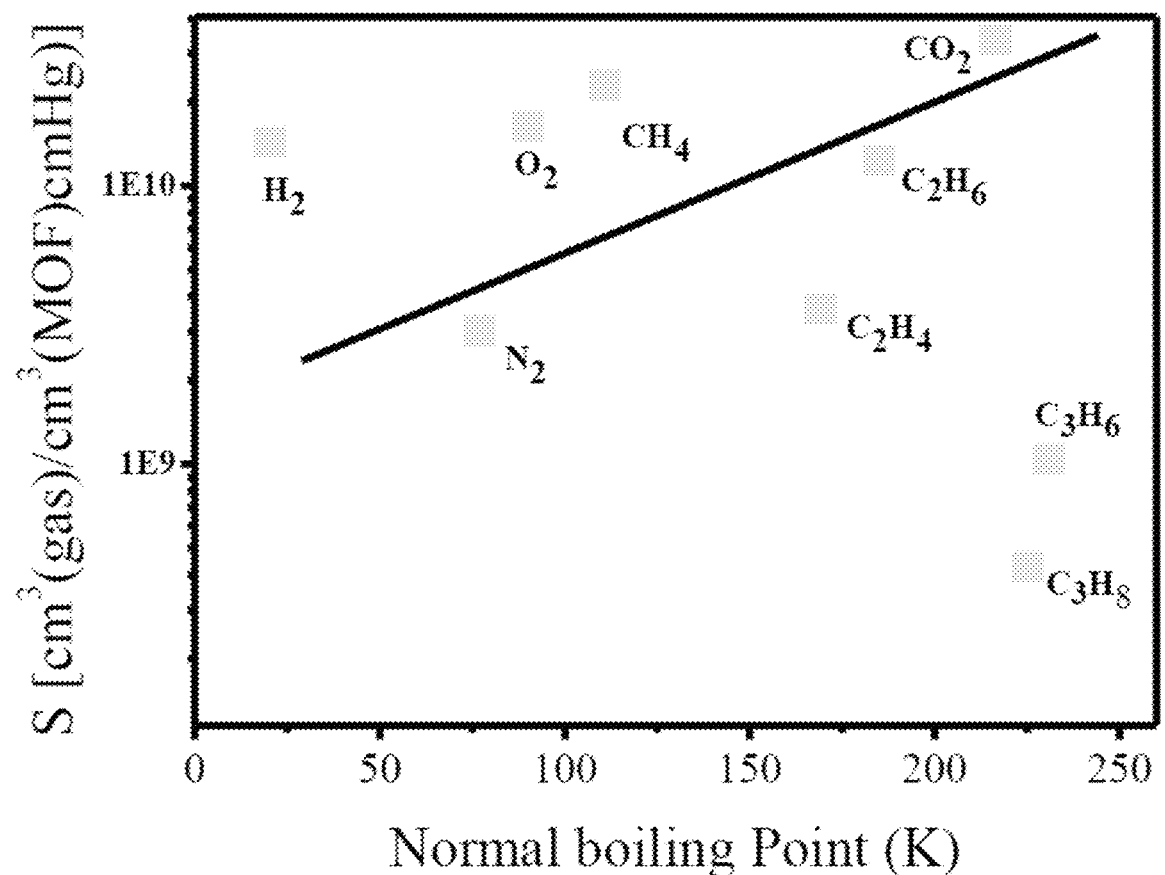
FIG. 28 is a graph illustrating the relationship between the sorption coefficients (S) of single gases ($H_2$, $O_2$, $N_2$, $CO_2$, $CH_4$, $C_2H_6$, $C_2H_4$, $C_3H_8$, $C_3H_6$) for a membrane at 308 K and the normal boiling points of the respective gases.
Figure 29:
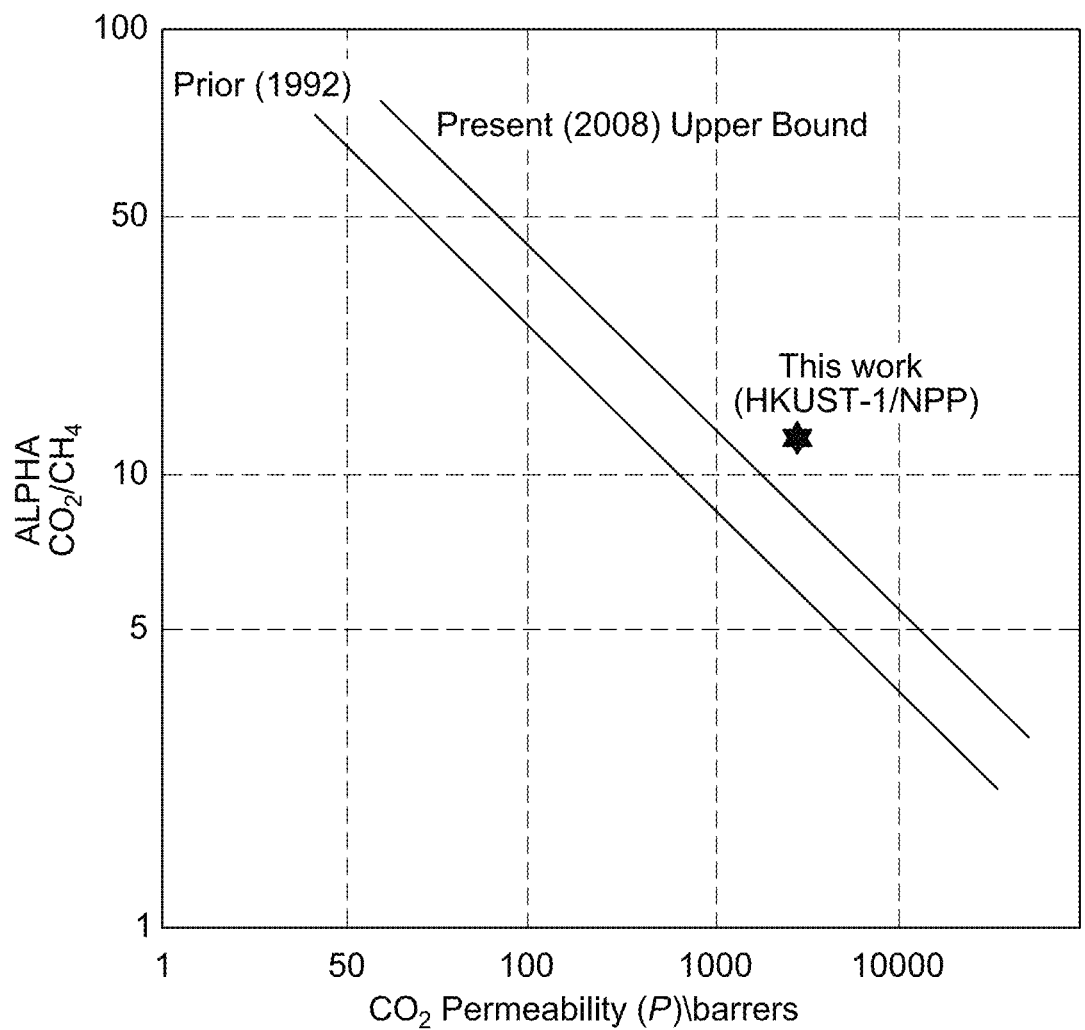
FIG. 29 is a graph illustrating $CO_2/CH_4$ relationship by plotting gas pair selectivity (a) against $CO_2$ permeability (P) in comparison with the Robeson upper bound curve [Robeson L M. (2008) Journal of Membrane Science 320:390-400, incorporated herein by reference in its entirety].
Figure 30:
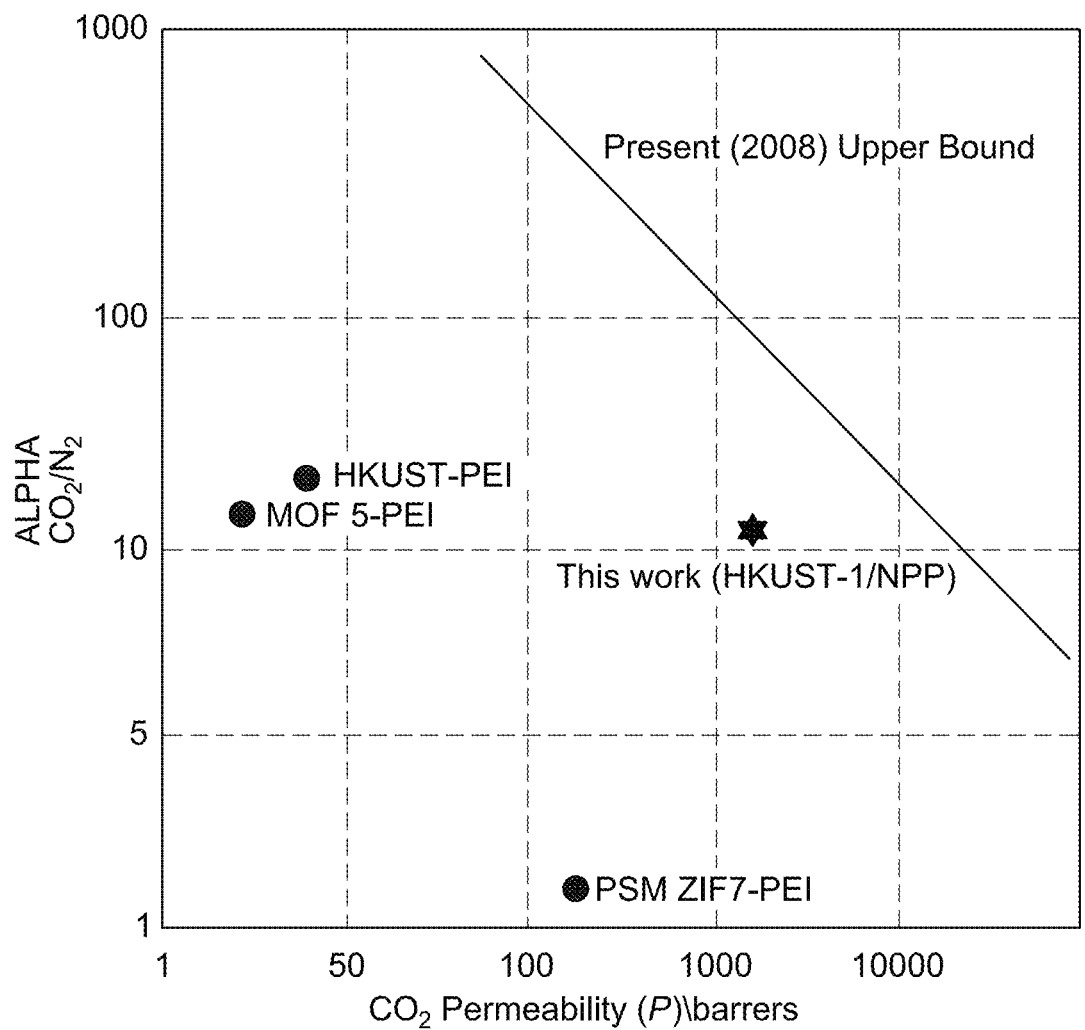
FIG. 30 is a graph illustrating $CO_2/N_2$ relationship by plotting gas pair selectivity (a) against $CO_2$ permeability (P) in comparison with the Robeson upper bound curve [Robeson L M. (2008) Journal of Membrane Science 320:390-400, incorporated herein by reference in its entirety].
Figure 31:
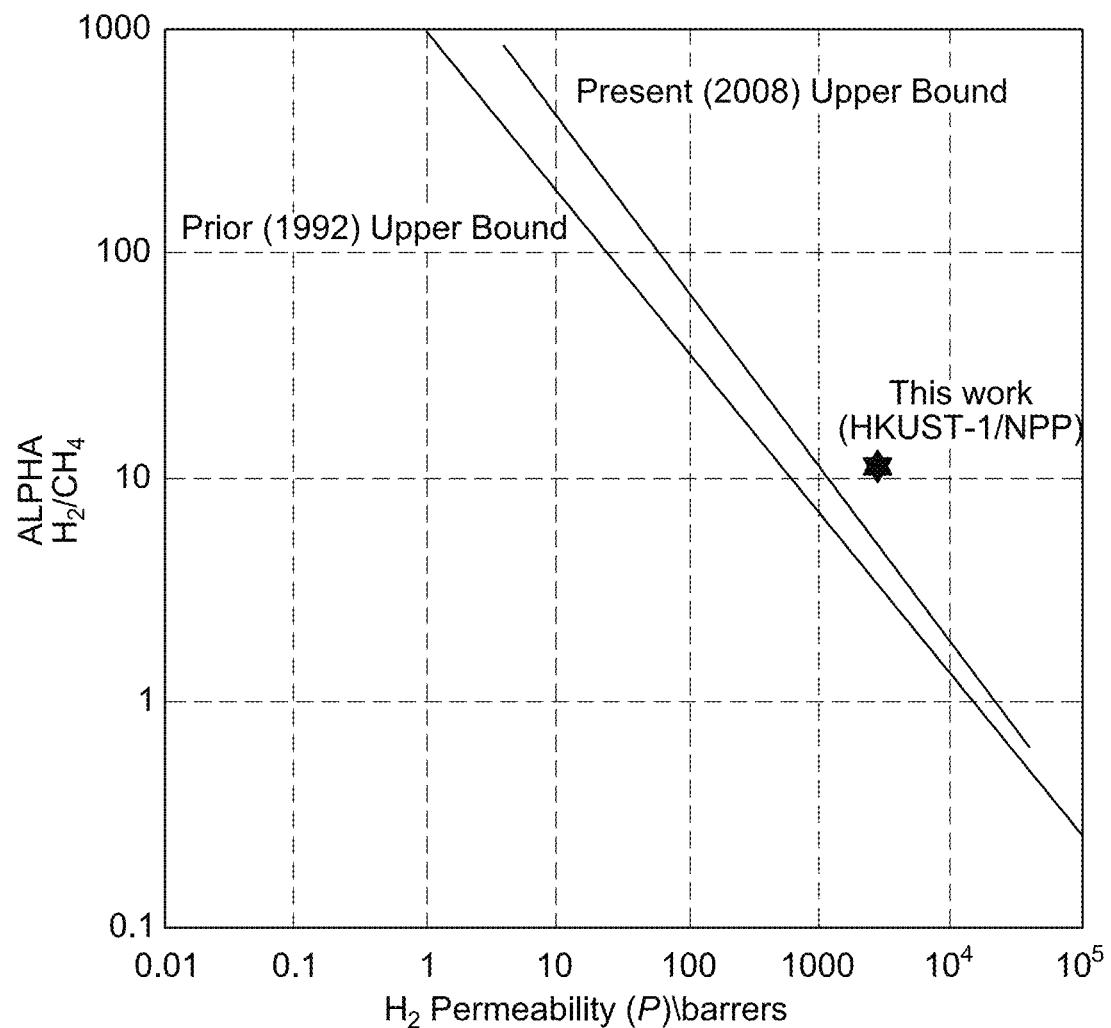
FIG. 31 is a graph illustrating $H_2/CH_4$ relationship by plotting gas pair selectivity (a) against $H_2$ permeability (P) in comparison with the Robeson upper bound curve [Robeson L M. (2008) Journal of Membrane Science 320:390-400, incorporated herein by reference in its entirety].
Figure 32:
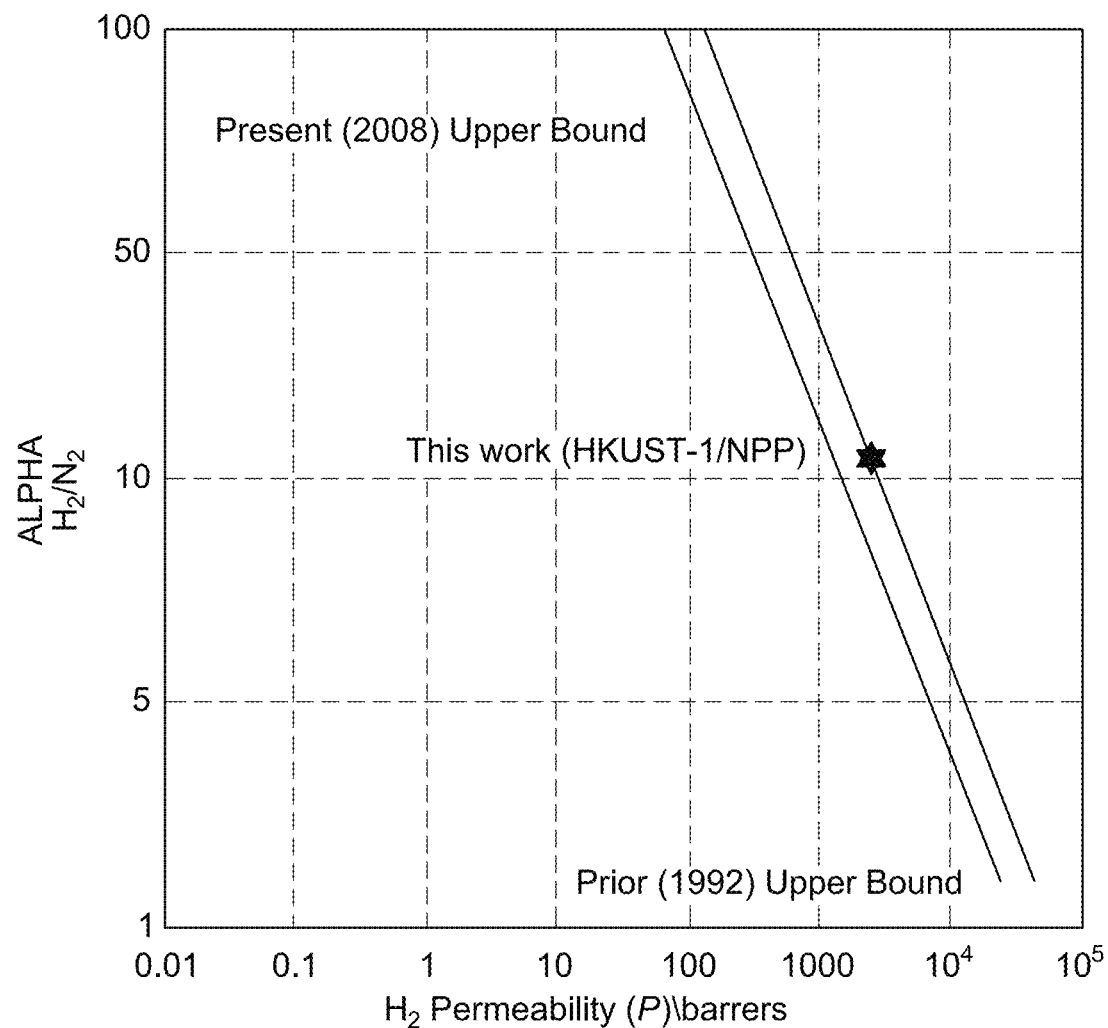
FIG. 32 is a graph illustrating $H_2/N_2$ relationship by plotting gas pair selectivity (a) against $H_2$ permeability (P) in comparison with the Robeson upper bound curve [Robeson L M. (2008) Journal of Membrane Science 320:390-400, incorporated herein by reference in its entirety].

For the assessment of different membranes effectiveness for gas separation applications, dense and spongy membranes were subjected to gas permeation experiments using constant volume/variable pressure CV/VP apparatus (FIG. 23). Each membrane was separately loaded into the membrane cell by fixing the membrane on a stainless-steel mesh from the permeate side and by a rubber O-ring from the feed side. The membrane holder was assembled in the CV/VP apparatus and subjected to vacuum from both sides for 24 hrs at 35° C. to ensure the complete removal of residual solvent molecules from the membrane. The sample was considered completely activated, when a baseline pressure (25-35 mTorr) was obtained and no further loss in pressure was noticed. And when the leak rate and the built-in pressure became ≤1×10⁻⁷ mTorr, the sample became ready for the permeation measurements. After the confirmation of the accepted leak rate, single gas permeation measurement was carried out by pressurizing the membrane from the feed side with different gases, separately, adjusted at 2 bar ($p_{up}$). The change of the pressure in the permeate side ($dp_{down}$) was monitored versus time (dt) and graphed for each gas. Permeation curves for different gases and membranes are presented in FIGS. 25-26. The time-lag (θ) was calculated from the graph and the steady state permeation rate ($dp^{SS}/dt$) was quested after 7-10 times θ that is used in the calculation of the gas permeability (Equation 1).

$$P = 10^{10} \left( \frac{dp_d^{SS}}{dt} - \frac{dp_d^{LR}}{dt} \right) \frac{V_d l}{(p_{up} - p_d)ART} \quad \text{(Equation 1)}$$

Single gas permeability was measured for $H_2$, $O_2$, $N_2$, $CO_2$ and $CH_4$. Ideal selectivities ($\alpha_j^i$) of the more permeable gas (i) versus gas (j) were calculated from the obtained single gas data. Defect-free membrane quality was confirmed from the obtained time-lag and the resulting $O_2/N_2$ selectivity, which is higher than Knudsen diffusion selectivity (1.1)².

TABLE 1

Comparison of the single gas permeance and selectivities values measured on pure HKUST-1 membranes found in literature

| | | | | | Separation factor | | | | | | | | | |
|---|---|---|---|---|---|---|---|---|---|---|---|---|---|---|
| Synthesis | | Perm | | | $H_2/$ | $H_2/$ | $H_2/$ | $H_2/$ | $H_2/$ | $H_2/$ | $H_2/$ | $H_2/$ | | |
| MOF | Support | Method | Temp | $H_2$ | $O_2$ | $N_2$ | $CO_2$ | $CH_4$ | $C_2H_4$ | $C_2H_6$ | $C_3H_8$ | $C_3H_6$ | Year | Ref |
| HKUST-1 | Copper net | | | | | 4.60 | 4.52 | 7.8 | | | | | 2009 | [11] |
| HKUST-1 | Alumina | Seed | | | | 7.5 | 5.1 | 5.7 | | | | | 2010 | [8] |
| HKUST-1 | Alumina | Hydro-thermal | | | | 3.7 | 3.5 | 2.4 | | | | | 2011 | [9] |
| HKUST-1 | Hollow ceramic fibers (HCFs) | Secondary growth | | | | 8.66 | 13.56 | 6.19 | | | | | 2012 | [12] |
| | | | | | | 8.91 | 9.24 | 11.20 | | | | | 2012 | [32] |
| HKUST-1 | Anodic aluminum oxide (AAO) | Seed | | 1.8 1.8E⁻⁷ | 4.4 | 4.2 | 4.8 | 3.0 | | | | | 2013 | [13] |
| HKUST-1 | Copper hydroxide nano strand CHN | | | 1.58 | 3.3 | 3.4 | 4.2 | 2.5 | | | | | 2013 | [14] |
| HKUST-1 | PVDF | | | 2.01 | | | 6.5 | 8.1 | 3.4 | | | | 2014 | [15] |
| HKUST-1 | Stainless steel | EPD | | | | | 3.9 | 4.6 | | | | | 2015 | [16] |
| HKUST-1 | CuO | | | 1.76 | | 3.6 (6.7) | 4.2 (5.6) | 2.9 (7.7) | | | | | 2016 | [17] |
| HKUST-1 | IL_CS | | | | | | | | | | | | 2017 | [18] |
| HKUST-1 | Alumina, Au | | | | | | 4.5-8.4 | | | | | | 2013 | [10] |
| HKUST-1 | Nanoporous polymer (NPP) | LPE | 22 | | 4.2 | 11.1 | 1.2 | 10.6 | 5.21 | 12.28 | 66.9 | 113.6 | 2018 | This work |

Refs

[11]: Guo H, Zhu G, Hewitt I J, Qiu S. (2009) Journal of the American Chemical Society 131:1646-1647;

[8]: Guerrero V V, Yoo Y, McCarthy M C, Jeong H-K. (2010) Journal of Materials Chemistry 20:3938-3943;

[9]: Nan J, Dong X, Wang W, Jin W, Xu N. (2011) Langmuir 27:4309-4312;

[12]: Zhou S, Zou X, Sun F, Zhang F, Fan S, Zhao H, Schiestel T, Zhu G. (2012) Journal of Materials Chemistry 22:10322-10328;

[32]: Ben T, Lu C, Pei C, Xu S, Qiu S. (2012) Chemistry—A European Journal 18:10250-10253;

[13]: Mao Y, Cao W, Li J, Sun L, Peng X. (2013) Chemistry—A European Journal 19:11883-11886;

[14]: Mao Y, shi L, Huang H, Cao W, Li J, Sun L, Jin X, Peng X. (2013) Chemical Communications 49:5666-5668;

[15]: Mao Y, Li J, Cao W, Ying Y, Sun L, Peng X. (2014) ACS Applied Materials & Interfaces 6:4473-4479;

[16]: Zhu H, Liu H, Zhitomirsky I, Zhu S. (2015) Materials Letters 142:19-22;

[17]: Guo Y, Mao Y, Hu P, Ying Y, Peng X. (2016) Chemistry Select 1:108-113;

[18]: Fernández-Barquín A, Casado-Coterillo C, Etxeberria-Benavides M, Zuñiga J, Irabien A. (2017) Chemical Engineering & Technology 40:997-1007; and

[10]: Hurrie S, Friebe S, Wohlgemuth J, Wöll C, Caro J, Heinke L. (2017) Chemistry—A European Journal 23:2294-2298, each incorporated herein by reference in their entirety.

TABLE 2

Comparison of the $CO_2$ gas separation from hydrocarbons found in literature

| MOF | Synthesis Support | Perm Method | Temp | $CO_2$ | $CO_2$/Ethane | $CO_2$/Ethylene | $CO_2$/Propane | $CO_2$/Propylene | Year | Ref |
|---|---|---|---|---|---|---|---|---|---|---|
| ZIF-8 | CPI | Mixed matrix | | 779 | | | | 10.48 | 2013 | [33] |
| Pristine PU | Alumina | Thin Film membrane | | 111 | 2.5 | | | | | [34] |
| XPU-HDA | | | | 76.9 | 3.9 | | | | | [34] |
| XPU-ODA | | | | 57.9 | 4.4 | | | | | [34] |
| HKUST-1 | NPP | LPE | 22 | 4190 | 6.16 | 14.51 | 79.05 | 134.25 | 2018 | This work |

Refs
[33]: Askari M, Chung T-S. (2013) Journal of Membrane Science 444:173-183; and
[34]: Isfahani A P, Ghalei B, Wakimoto K, Bagheri R, Sivaniah E, Sadeghi M. (2016) Journal of Materials Chemistry A 4:17431-17439, each incorporated herein by reference in their entirety.

TABLE 3

Comparison of the $CO_2$ gas separation from nitrogen and natural gas

| MOF | Polymer | Wt % | $P(CO_2)$ | $CO_2/CH_4$ | $CO_2/N_2$ | Year | Ref |
|---|---|---|---|---|---|---|---|
| IRMOF-1 | Ultem | 10 | 2.8 | 27.8 | | 2009 | [35] |
| | | 20 | 3 | 26.3 | | 2009 | [35] |
| HKUST-1 | pdms | 10 | 3000 | 34 | 8.9 | 2006 | [36] |
| | | 40 | 2900 | 3.6 | 8.9 | 2006 | [36] |
| | psf | 5 | 6.5 | 18 | 20 | 2006 | [36] |
| | | 10 | 7.5 | 21.5 | 25 | 2006 | [36] |
| ZIF-8 | PPEEs | 10 | 5.4 | 22.9 | 30.1 | 2011 | [37] |
| | | 30 | 50 | 20.8 | 24.5 | 2011 | [37] |
| MIL-53(A1) | PMDA-ODA | 5 | 0.3 | 72.1 | 34.8 | 2012 | [38] |
| ZIF-8 | PIM-1 | 10 | | | | 2012 | [39] |
| | | 29 | | | | 2012 | [39] |
| ZIF-8 | PBI/PI | 10 | | | | 2012 | [39] |
| ZIF-8 | | 10 | | | | 2012 | [39] |
| ZIF-8 | | 10 | | | | 2012 | [39] |
| ZIF-8 | PBI | 30 | | | | 2013 | [40] |
| ZIF-8 | PIM-1 | 11 | 4815 | 15 | 19.3 | 2013 | [41] |
| | | 28 | 4270 | 18.6 | 21.9 | 2013 | [41] |
| | | 36 | 6820 | 13.4 | 17.9 | 2013 | [41] |
| | | 43 | 6300 | 14.7 | 18.0 | 2013 | [41] |
| ZIF-90 | PBI | 10 | | | | 2013 | [42] |
| HKUST-1 | PPO | 10 | 68.7 | 16.4 | 16 | 2013 | [43] |
| ZIF-8 | 6FDA-durene | 33.3 | 486.5 | 15.6 | 13.4 | 2013 | [44] |
| MIL-68 | psf | 4 | 4.7 | 32 | | 2013 | [45] |
| ZIF-8 | PBI-BuI | 10 | 2.3 | 57 | 26.8 | 2014 | [46] |
| | | 30 | 5.2 | 43.6 | 16 | 2014 | [46] |
| | DMPBI-BuI | 10 | 3.8 | 47.2 | 21.7 | 2014 | [46] |
| | | 30 | 53.9 | 15.7 | 11.3 | 2014 | [46] |
| | DBzPBI-BuI | 10 | 25.8 | 15.9 | 12.9 | 2014 | [46] |
| | | 20 | 89.8 | 11.6 | 14.3 | 2014 | [46] |
| c-MOF-5 | PEI | 25 | 5.4 | 23.4 | 28.4 | 2014 | [47] |
| ZIF-71 | 6FDA-durene | 10 | 1805 | 16.1 | 14.9 | 2014 | [48] |
| | | 20 | 4006 | 12.8 | 12.9 | 2014 | [48] |
| | | 30 | 7750 | 9.53 | 11.5 | 2014 | [48] |
| ZIF-8 | PI/PSF | 30 | 19 | 42 | | 2017 | [49] |
| UiO-66 | PIM-1 | 30 | 4500 | 22 | 28 | 2017 | [50] |
| ZIF-11 | 6FDA-DAM | 10 | 109 | 31 | | 2017 | [51] |
| | | 30 | 73 | 30 | | 2017 | |
| UiO-66 | graphite oxide | | | | | 2017 | [52] |
| ZIF-90 | 6FDA-TP | 10 | 26 | 42 | 24 | 2017 | |
| | | 50 | 63 | 36 | 20 | 2017 | |
| NH$_2$-MIL-53 | VTEC | 1 | | | | 2017 | |
| FeBTC | PEBAX | 5 | 80 | 19.3 | | 2018 | [53] |
| | | 30 | 402 | 18 | | 2018 | |
| NH$_2$-MIL-53(A1) | Cellulose Acetate | 15 | 52 | 28 | | 2018 | [54] |
| ZIF-94 | 6FDA-DAM | 10 | 780 | | 24.7 | 2018 | [55] |
| | | 20 | 960 | | 23.6 | 2018 | |
| | | 30 | 1000 | | 17.8 | 2018 | |
| | | 40 | 2000 | | 22.9 | 2018 | |
| UiO-66 | 6FDA-Bisp | 17 | 57 | 48 | | 2018 | [56] |
| | 6FDA-ODA | 17 | 43 | 57 | | 2018 | |
| | 6FDA-DAM | 8 | 1728 | 32 | | 2018 | |
| HKUST-1 | NPP | 100 | 4190 | 13.16 | 12.51 | This work | |

Refs
[35] Liu C, McCulloch B, Wilson S T, Benin A I, Schott M E. (2009). Metal organic framework—polymer mixed matrix membranes, U.S. Pat. No. 7,637,983;
[36]: Car A, Stropnik C, Peinemann K-V. (2006) Desalination 200:424-426;
[37]: Diaz K, López-González M, del Castillo L F, Riande E. (2011) Journal of Membrane Science 383:206- 213;
[38]: Ren H, Jin J, Hu J, Liu H. (2012) Industrial & Engineering Chemistry Research 51:10156-10164;
[39]: Yang T, Shi G M, Chung T-S. (2012) Advanced Energy Materials 2:1358-1367;
[40]: Yang T, Chung T-S. (2013) International Journal of Hydrogen Energy 38:229-239;
[41]: Bushell A F, Attfield M P, Mason C R, Budd P M, Yampolskii Y, Starannikova L, Rebrov A, Bazzarelli F, Bernardo P, Carolus Jansen J, Lanč M, Friess K, Shantarovich V, Gustov V, Isaeva V. (2013) Journal of Membrane Science 427:48-62;
[42]: Yang T, Chung T-S. (2013) Journal of Materials Chemistry A 1:6081-6090;
[43]: Ge L, Zhou W, Rudolph V, Zhu Z. (2013) Journal of Materials Chemistry A 1:6350-6358;
[44]: Wijenayake S N, Panapitiya N P, Versteeg S H, Nguyen C N, Goel S, Balkus K J, Musselman I H, Ferraris J P. (2013) Industrial & Engineering Chemistry Research 52:6991-7001;
[45]: Seoane B, Sebastian V, Tellez C, Coronas J. (2013) CrystEngComm 15:9483-9490;
[46]: Bhaskar A, Banerjee R, Kharul U. (2014) Journal of Materials Chemistry A 2:12962-12967;
[47]: Arjmandi M, Pakizeh M. (2014) Journal of Industrial and Engineering Chemistry 20:3857-3868;
[48]: Japip S, Wang H, Xiao Y, Shung Chung T. (2014) Journal of Membrane Science 467:162-174;
[49]: Shahid S, NijmeijerK. (2017) Separation and Purification Technology 189:90-100;
[50]: Khdhayyer M R, Esposito E, Fuoco A, Monteleone M, Giorno L, Jansen J C, Attfield M P, Budd P M. (2017) Separation and Purification Technology 173:304-313;
[51]: Safak Boroglu M, Yumru A B. (2017) Separation and Purification Technology 173:269-279;
[52]: Castarlenas S, Téllez C, Coronas J. (2017) Journal of Membrane Science 526:205-211;
[53]: Dorosti F, Alizadehdakhel A. (2018) Chemical Engineering Research and Design;
[54]: Mubashir M, Yeong Y F, Lau K K, Chew T L, Norwahyu J. (2018) Separation and Purification Technology 199:140-151;
[55]: Etxeberria-Benavides M, David O, Johnson T, Łozińska M M, Orsi A, Wright P A, Mastel S, Hillenbrand R, Kapteijn F, Gascon J. (2018) Journal of Membrane Science 550:198-207;
[56]: Zamidi Ahmad M, Navarro M, Lhotka M, Zornoza B, Téllez C, Fila V, Coronas J. (2018) Separation and Purification Technology 192:465-474; and
[57]: Robeson L M. (2008) Journal of Membrane Science 320:390-400, each incorporated herein by reference in their entirety.

The invention claimed is:

1. A method of recovering a first gas from a gas mixture comprising a first gas and a second gas, the method comprising:

delivering the gas mixture into a feed side of a chamber comprising a membrane that divides a chamber into a feed side and a permeate side, such that at least a portion of the first gas permeates the membrane; and recovering from the permeate side a stream enriched in the first gas compared to the gas mixture, wherein the membrane, comprises:

a polymer substrate comprising a polyester having pore channels; and particles of a metal-organic framework comprising a metal ion and an organic ligand coordinated to the metal ion;

wherein the pore channels have an average diameter of 0.1-2 μm and an average length of 2-100 μm;

the metal-organic framework particles are disposed on and bonded to carboxylate groups of the polymer substrate on a wall surface of the pore channels and disposed on and bonded to carboxylate groups of the polymer substrate on an outer surface of the polymer substrate; and the metal-organic framework is present at an amount of 0.1-50 wt % relative to a total weight of the membrane.

2. The method of claim 1, wherein the metal-organic framework has an average thickness of 100-2,000 nm.

3. The method of claim 1, wherein the metal ion is an ion of at least one metal selected from the group consisting of a transition metal, a post-transition metal, and an alkaline earth metal.

4. The method of claim 3, wherein the metal ion is an ion of at least one metal selected from the group consisting of Cu, Zn, Fe, Ni, Co, Mn, Cr, Cd, Mg, Ca, and Zr.

5. The method of claim 1, wherein the polymer substrate comprises at least one polyester selected from the group consisting of poly(ethylene terephthalate), poly(trimethylene terephthalate), polybutylene terephthalate), poly(ethylene naphthalate), and poly(cyclohexylenedimethylene terephthalate).

6. The method of claim 5, wherein the polymer substrate comprises poly(ethylene terephthalate).

7. The method of claim 1, wherein the organic ligand has at least two carboxylate groups.

8. The method of claim 7, wherein the organic ligand is benzene-1,3,5-tricarboxylate.

9. The method of claim 1, wherein the metal-organic framework comprises HKUST-1.

10. The method of claim 1, wherein the membrane has an ultraviolet visible absorption with an absorption peak of 500-800 nm.

11. The method of claim 1, which wherein the membrane has a BET surface area of 100-500 $m^2/g$.

12. The method of claim 1, wherein the first gas is hydrogen, carbon dioxide, or both, and the second gas is at least one selected from the group consisting of oxygen, nitrogen, methane, ethylene, ethane, propylene, and propane.

* * * * *

UNITED STATES PATENT AND TRADEMARK OFFICE
CERTIFICATE OF CORRECTION

| | |
|---|---|
| PATENT NO. | : 11,731,077 B2 |
| APPLICATION NO. | : 17/857244 |
| DATED | : August 22, 2023 |
| INVENTOR(S) | : Muhammad Usman et al. |

It is certified that error appears in the above-identified patent and that said Letters Patent is hereby corrected as shown below:

On the Title Page

Item (73), should read:
--King Fahd University of Petroleum and Minerals., Dhahran (SA)
King Abdulaziz City for Science and Technology, Riyadh (SA)--

Signed and Sealed this
Thirteenth Day of February, 2024

Katherine Kelly Vidal
*Director of the United States Patent and Trademark Office*